US006157403A

United States Patent [19]

Nagata

[11] Patent Number: 6,157,403

[45] Date of Patent: Dec. 5, 2000

[54] APPARATUS FOR DETECTING POSITION OF OBJECT CAPABLE OF SIMULTANEOUSLY DETECTING PLURAL OBJECTS AND DETECTION METHOD THEREFOR

[75] Inventor: Yoshifumi Nagata, Kobe, Japan

[73] Assignee: Kabushiki Kaisha Toshiba, Kawasaki, Japan

[21] Appl. No.: 08/905,387

[22] Filed: Aug. 4, 1997

[30] Foreign Application Priority Data

| | | | |
|---|---|---|---|
| Aug. 5, 1996 | [JP] | Japan | 8-206151 |
| Aug. 5, 1996 | [JP] | Japan | 8-206152 |
| Aug. 5, 1996 | [JP] | Japan | 8-206210 |

[51] Int. Cl.[7] .......... H04N 5/225

[52] U.S. Cl. .......... 348/171; 348/172

[58] Field of Search .......... 348/1, 2, 13, 14, 348/15, 20, 61, 143, 169–172; 704/219, 229, 236, 243; H04N 5/225

[56] References Cited

U.S. PATENT DOCUMENTS

| | | | |
|---|---|---|---|
| 5,091,945 | 2/1992 | Kleijn | 704/219 |
| 5,222,189 | 6/1993 | Fielder | 704/229 |
| 6,003,003 | 12/1999 | Asghar et al. | 704/243 |
| 6,044,343 | 3/2000 | Cong et al. | 704/236 |

FOREIGN PATENT DOCUMENTS

| | | | |
|---|---|---|---|
| 5-227531 | 9/1993 | Japan | H04N 7/18 |
| 7-146366 | 6/1995 | Japan . | |

OTHER PUBLICATIONS

Haykin, Simon, "Adaptive Filter Theory", 3rd Ed. Prentice Hall, 1996.

Frost, III, O. L., "An Algorithm for Linearly Constrained Adaptive Array Processing", Proceeding of the IEEE, vol. 60, No. 8, pp. 926–935, Aug. 1972.

Kazuaki Takao et al, "An Adaptive Antenna Array Under Directional Constraint", IEEE Transactions on Antennas and Propagation, vol. AP–24, No. 5, pp. 662–669, Sep. 1976.

Buckley, K. M. "Spatial Spectral Filtering with Linearly Constrained Minimum Variance Beamformers", IEEE Transactions on Acoustics, Speech, and Signal Processing, vol. ASSP–35, No. 3, pp. 249–266, Mar. 1987.

Proceedings of ICASSP '95, Udo Bub, et al., "Knowing Who To Listen To In Speech Recognition: Visually Guided Beamforming", IEEE, 1995, pp. 848–851.

*Primary Examiner*—Young Lee
*Attorney, Agent, or Firm*—Oblon, Spivak, McClelland, Maier & Neustadt, P.C.

[57] ABSTRACT

An apparatus for detecting a position of an object, including a signal output portion for generating a predetermined signal to radiate the signal into a space toward an arbitrary object, a signal input portion having a plurality of sensors for individually receiving signals reflected from the object, an impulse response calculating portion for obtaining an impulse response for each sensor in accordance with the signal radiated from the signal output portion and the signals received by the plural sensors, and an object position estimating portion for calculating the weight of a virtual position determined at an arbitrary point on the assumption that the signal radiated to the space by the signal output portion is reflected by the virtual position in such a manner that transmission time required for the signal to reach the signal input portion is measured and the components of each impulse response calculated in accordance with the transmission time are used to calculate the weight and calculating the weight while shifting the virtual position to estimate a virtual position, at which the weight exceeds a predetermined threshold value, to be the position of the object.

3 Claims, 40 Drawing Sheets

| NUMBER | DIRECTION OF PERSON | | A<br>AREA OF FACE PORTION OF PERSON (NUMBER OF PIXELS) | B<br>DIFFERENCE BETWEEN DIRECTION OF CENTRAL LINE OF CAMERA AND DIRECTION OF PERSON ($\sqrt{X^2+Y^2}$) | A/B |
|---|---|---|---|---|---|
| | HORIZONTAL (X) | VERTICAL (Y) | | | |
| 1 | -25° | 0° | 80 | 25 | 3.2 |
| 2 | -7° | 10° | 65 | 12.2 | 5.3 |
| 3 | -10° | -12° | 300 | 15.6 | 19.2 |
| 4 | 5° | 5° | 400 | 7.1 | 56.3 |
| 5 | 15° | 3° | 120 | 15.3 | 7.8 |
| 6 | 25° | -15° | 500 | 29.2 | 17.1 |

FIG. 23

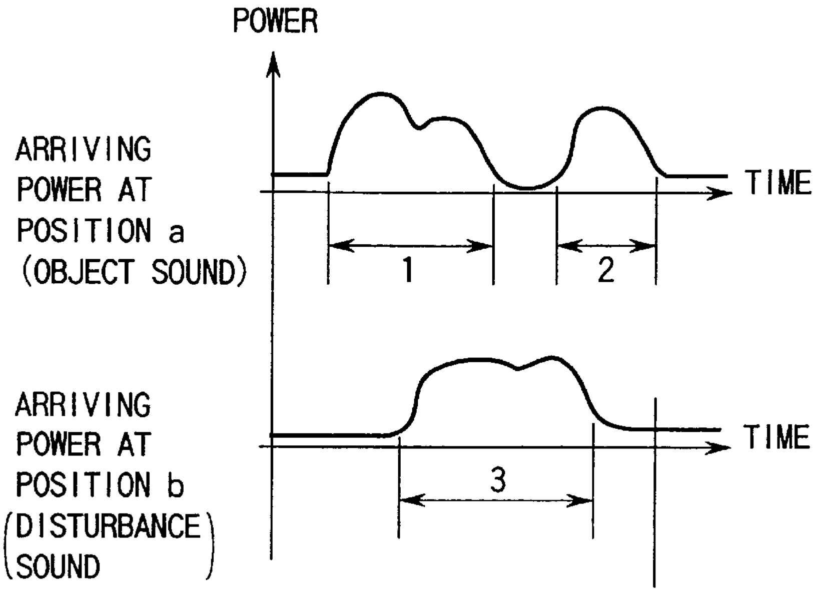
FIG. 31A
FIG. 31B
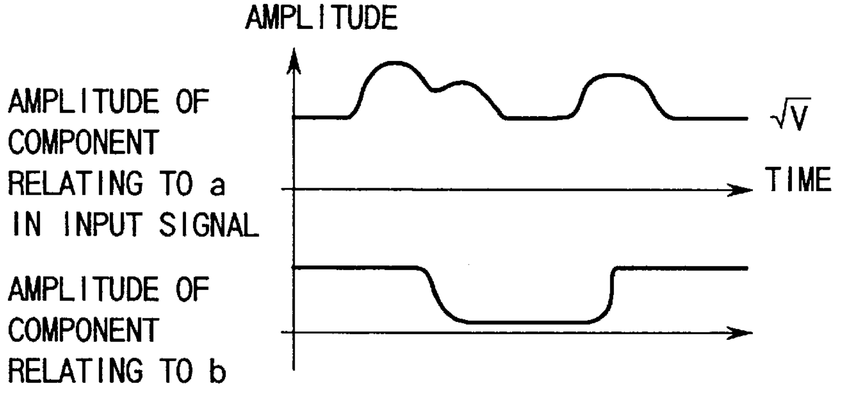
FIG. 31C
FIG. 31D
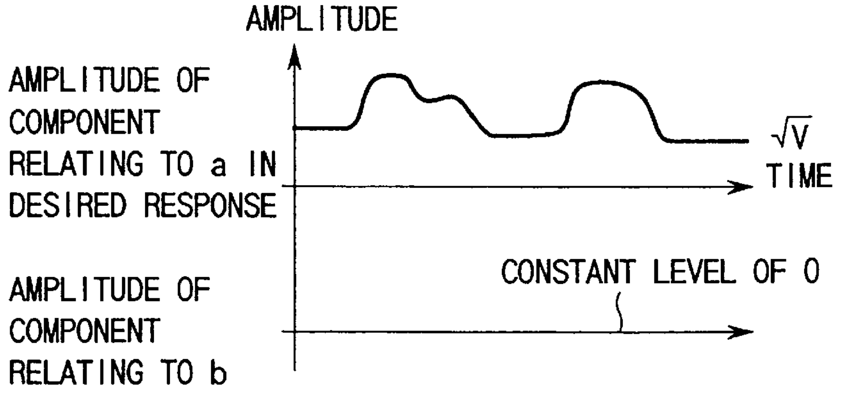
FIG. 31E
FIG. 31F
FIG. 31A ARRIVING POWER AT POSITION a (OBJECT SOUND)
FIG. 31B ARRIVING POWER AT POSITION b (DISTURBANCE SOUND)
FIG. 31C AMPLITUDE OF COMPONENT RELATING TO a IN INPUT SIGNAL
FIG. 31D AMPLITUDE OF COMPONENT RELATING TO b
FIG. 31E AMPLITUDE OF COMPONENT RELATING TO a IN DESIRED RESPONSE
FIG. 31F AMPLITUDE OF COMPONENT RELATING TO b

APPARATUS FOR DETECTING POSITION OF OBJECT CAPABLE OF SIMULTANEOUSLY DETECTING PLURAL OBJECTS AND DETECTION METHOD THEREFOR

BACKGROUND OF THE INVENTION

The present invention relates to an apparatus for detecting a position of an object, a method therefor, a voice collecting apparatus, a method therefor, a filter calculation apparatus and a method therefor.

Hitherto, the position of an object at a doorway of a house or indoor has been detected by using a video camera such that obtained image information is processed or by detecting change in the applied radio waves or light by a sensor. However, the above-mentioned methods cannot detect an object if the object is located at a shadowed position or an object is out of the visual field of the camera. Accordingly, a method has been disclosed in Jpn. Pat. KOKAI Publication No. 7-146366 which uses a diffraction effect of sound waves to detect an object located at a shadowed position. The foregoing method is structured such that sound waves are radiated to obtain an acoustic transmission characteristic by detecting the echo of the sound waves so that the position of an object is detected in accordance with the difference in the transmission characteristic occurring attributable to the existence of the object. At this time, one sound source and a plurality of sensors or a plurality of sound sources for transmitting the same signal and one sensor are used to measure impulse response which is expression of a time region of the acoustic transmission characteristic so as to detect the position of the object.

In order to be adapted to a voice recognition apparatus or a television conference system, a noise suppression technique using a directional microphone or a microphone array and capable of collecting voice having an excellent quality has been suggested. To automatically obtain voice and the image of a speaker from a plurality of attendants of the conference using the television conference system, a method has been disclosed in, for example, Jpn. Pat. KOKAI Publication No. 5-227531 which has a structure such that signals from a plurality of microphones are processed in accordance with the position of a mobile object obtained by processing an image picked up by a video camera.

However, the above-mentioned method, having the structure such that the signals from the microphone array are processed by a delay sum method for aligning the phases of the signals with respect to the voice from the position of a required person, suffers from a problem in that the effect of suppressing noise arrived from another direction is unsatisfactory.

As a technique for effectively suppressing noise by processing outputs from a microphone array by using an adaptive filter to control the directionality has been known as disclosed in, for example, a document "Acoustic System and Digital Processing", edited by Electronic Information Communication Society, pp. 171–218. Although the adaptive microphone array process is not required to detect the noise direction of arrival, the direction, in which the required sound wave is transmitted, is processed as a known factor. Although the direction of arrival, can be estimated by processing signals from the microphone array, detection can be performed only in the period in which speech is uttered. Therefore, the stability of the process has a problem.

Another method has been known in which the position of a person obtained by processing the image is used as the arriving direction of the object sound. In this case, the process can be performed stably because the position can be estimated even if no speech is uttered as disclosed in, for example, a document ICASSP '95 "Knowing Who to Listen to in Special Recognition Visually Guided Beamforming", pp. 848–851.

A process of signals obtained by an antenna array or a microphone array formed by using a plurality of antennas or microphones mainly uses an adaptive filter in order to automatically eliminate noise arrived from unknown directions. In particular, an adaptive filter having a constraint condition is a convenient filter because an adaptive process for eliminating noise from a unknown direction can be performed in a state where the response of the array with respect to the objective direction is maintained. Therefore, the adaptive filter is widely employed.

As described in a document "Adaptive Filter Theory", PRENTICE HALL, written by Haykin, the adaptive filter having a constraint condition is structured to minimize the output from a delay-line tap filter under a constraint condition expressed by a linear equation so as to obtain an optimum filter coefficient. Since the constraint condition determines the response of a filter with respect to a certain direction or a frequency and it must generally be expressed with a complex number, also the filter coefficient is expressed with a complex number. However, there arises a problem in that the filter in the form of a complex number results in enlargement of the amount of calculations as compared with a filter in the form of a real number if the number of taps is the same.

When input signals X for plural channels are supplied to filter W provided with a delay-line tap of each channel (corresponding to sensors 1, . . . , sensor i, . . . , sensor M) as shown in FIG. 47, the minimum dispersion filter having a constraint condition can be obtained by minimizing an expected value of the following output power from the filter under condition that the response with respect to an object direction is retained to be constant:

$$E[y^2]=E[W^HXX^HW]=W^HRW \tag{1"}$$

where E [ ] is an expected value.

Assuming that the filter coefficient at the j-th tap of the i-channel is $w_{ij}$, filter W is expressed as follows:

$$\text{Filter } W=(w_{11}, w_{12}, \ldots, w_{ij-1}, w_{ij}, w_{ij+1}, \ldots, w_{ML})^T.$$

Assuming that the signal to be supplied to the j-th tap of the i-channel is $x_{ij}$, the input signal X is expressed as follows:

$$X=(x_{11}, x_{12}, \ldots, x_{ij-1}, x_{ij}, x_{ij+1}, \ldots x_{ML})^T$$

where $R=E[XX^H]$ is an autocorrelation matrix of x, M is the number of channels and L is the number of taps.

The constraint condition is expressed as follows:

$$A^HW=G \tag{2"}$$

where G is a column vector of a constant value, the magnitude of which is the number K of the constraint condition and is, for example, [1, 1, . . . , 1], and A is a matrix having a steering vector $a_k$ with respect to a different frequency as the column vector thereof and is expressed as follows:

$$A=[a_1, \ldots, a_k] \tag{3"}$$

Each vector $a_k$ (k=1, . . . , K) is expressed as follows:

$$a_k=(1, e^{-j\omega_k\tau_2}, \ldots, e^{-j\omega_k\tau_M})^T \tag{4"}$$

where $\tau_2, \ldots, \tau_N$ are differences in the propagation time of signals which are supplied to respective channels when the first channel is made to be a reference, and wk is an angular frequency. The difference in the propagation time is determined in accordance with the position of an antenna or a sensor on which a signal is made incident and the spatial angle of the incident signal.

Although the minimizing issue expressed in Equations (1") and (2") may directly be solved by a method of Lagrange multipliers, the solution is usually iteratively obtained by using, for example, a Least Mean Square (LMS) adaptive filter in order to process the signals which are supplied sequentially. In this case, the filter coefficient $W_n$ updated owning to n times of repetition is expressed by the following equation in accordance with a projection type LMS algorithm which has been described in, for example, O. L. Frost, III, "Algorithm for Linearly Constrained Adaptive Array Processing", Proceeding of the IEEE, Vol. 60, No. 8, pp. 926–935 (1972):

$$W_n = P[w_{n-1} - \mu y_n X] + F \quad (5")$$

where $W_n$ is the filter coefficient updated n times, P is a projection matrix onto a subspace which is determined in accordance with the constraint condition, F is a parallel translation vector from the subspace to a space which satisfies the constraint condition and $\mu$ is the step size, P and F being calculated as follows:

$$P = I - A(A^H A)^{-1} A^H \quad (6")$$

$$F = A(A^H A)^{-1} G \quad (7")$$

If Equation (4") is expressed with a complex number, the foregoing calculations must be performed in the form of complex numbers.

However, the foregoing methods, having the structure such that the time delay is performed to make the phases of the signals transmitted from an object direction to be the same and then the constraint condition for the object is set, an assumption can be performed that no time difference exists among the input channels. Therefore, the constraint condition can be expressed in the form of real numbers. Under the real number constraint condition, the optimum filter is calculated by using real numbers.

However, the above-mentioned method of detecting the position of an object, having the structure such that information of one object nearest the measuring point is extracted, is able to detect only one object. Therefore, there arises a problem in that the method cannot be employed when a plurality of objects are required to simultaneously be detected.

Since the above-mentioned voice collecting apparatus cannot be used when a plurality of positions of persons are detected as a result of a process of an image, an adaptive process has been performed to remove speech of a person which is not the object person if the speech has been performed. However, if interference sound is mixed before the adaptation process is completed or if a plurality of speakers simultaneously speech, there arises a problem in that voices except for the remarked person cannot clearly be input.

The above-mentioned method of calculating a filter is adapted to a case where a plurality of object directions exist by determining the constraint condition in the plural directions. Although the constraint condition with respect to one direction can be expressed with a real number by performing the process for delaying the input signal, the constraint condition with respect to other directions must be expressed by complex numbers in order to express the time difference between the channels for the input signals. Therefore, also the calculation for obtaining the filter coefficient must be performed by using the complex number. In this case, there arises a problem in that the quantity of calculation cannot be reduced.

In document A (K. Takao et. al., "An adaptive antenna array under directional constraint", IEEE Trans. Antennas Propagat., vol. AP-24, pp. 662–669, September 1976), a method has been disclosed in which the constraint condition is determined for each frequency and the calculations are performed by using real numbers. However, there arises a problem in that the number of the constraint conditions must be enlarged sufficiently to prevent occurrence of a ripple in the frequency characteristic in the object direction.

In document B (K. M. Buckley, "Spatial Spectral Filtering with Linearly Constrained Minimum Variance Beamformers", IEEE Trans. acoustics, speech, and signal processing, Vol. ASSP-35, No. 3, March 1987), the constraint condition is determined in accordance with eigenvalue decomposition of a correlation matrix of an input signal. However, the eigenvalue decomposition must perform a large quantity of calculations. Thus, there arises a problem when the object direction is frequently changed.

BRIEF SUMMARY OF THE INVENTION

Accordingly, a first object of the present invention is to provide an apparatus for detecting the positions of objects capable of accurately detecting the positions of objects even if a plurality of objects exist and a method of detecting the positions of objects.

A second object of the present invention is to provide an apparatus for collecting voices capable of simultaneously extracting all voices from a plurality of positions of persons while suppressing background noise or extracting only voice from the position of a specific person and a method of collecting voices.

A third object of the present invention is to provide an apparatus for calculating filters such that constraint conditions in plural directions are set in the form of a real number by using vectors composed of filter coefficients indicating delays and the vector containing large amplitude of the filter coefficients are selected with priority so that calculations of filters are performed accurately without a necessity of developing specific values with small quantity of calculation and constraint conditions and a method of calculating filters.

In order to achieve the foregoing objects, according to one aspect of the present invention, there is provided an apparatus for detecting a position of an object, comprising:

signal output means for generating a predetermined signal to radiate the signal into a space toward an arbitrary object;

signal input means having a plurality of sensors for individually receiving signals reflected from the object;

impulse response calculating means for obtaining an impulse response for each sensor in accordance with the signal radiated from the signal output means and the signals received by the plural sensors;

weight calculating means for calculating the weight of a virtual position determined at an arbitrary point on the assumption that the signal radiated to the space by the signal output means is reflected by the virtual position in such a manner that transmission time required for the signal to reach the signal input means is measured and the components of each impulse response calculated in accordance with the transmission time are used to calculate the weight; and object position estimating means for causing the weight calculating means to calculate the weight while shifting the virtual position to estimate a virtual position, at which the weight exceeds a predetermined threshold value, to be the position of the object.

According to another aspect of the present invention, there is provided a method of detecting the position of an object comprising the steps of:

generating a predetermined signal to radiate the signal into a space toward an arbitrary object;

causing a plurality of sensors to individually receive signals reflected from the object;

obtaining an impulse response for each sensor in accordance with the signal radiated in the step of radiating the signal and the signals received by the plural sensors;

calculating the weight of a virtual position determined at an arbitrary point on the assumption that the signal radiated to the space is reflected by the virtual position in such a manner that transmission time required for the signal to reach a position at which the signal is received is measured and the components of each impulse response calculated in accordance with the transmission time are used to calculate the weight; and calculating the weight while shifting the virtual position to estimate a virtual position, at which the weight exceeds a predetermined threshold value, to be the position of the object.

In order to achieve the second object, according to another aspect of the present invention, there is provided an apparatus for collecting voices, comprising:

image input means for inputting an image obtained by photographing at least portions of a plurality of persons;

voice input means for individually inputting voices through a plurality of channels;

person position detection means for processing image information supplied from the image input means to obtain the positions of a plurality of persons;

person position selection means for selecting the position of at least one person which is a subject to be processed from the positions of the plural persons detected by the person position detection means;

filter coefficient determining means for determining a filter coefficient in accordance with a first signal which can be obtained owning to an observation performed on the assumption that a sound source signal, which has been generated arbitrarily, is disposed at the position of the person selected by the person position selection means and a second signal which is generated from the sound source signal in accordance with a mode selected from two modes consisting of a mode in which the sensitivities with respect to all voices from the selected person positions are simultaneously raised as compared with the sensitivities with respect to voices from person positions which have not been selected and a mode in which the sensitivity of only a voice from a specified object position among the selected person positions is raised as compared with the sensitivities with respect to voices from person positions which have not been selected; and voice extracting means for extracting only the voices corresponding to the selected mode from voices input by the voice input means, the extracting means using the filter coefficient determined by the filter coefficient determining means to perform the extracting operation.

According to another aspect of the present invention, there is provided a method of collecting voices, comprising the steps of:

inputting an image obtained by photographing at least portions of a plurality of persons;

individually inputting voices through a plurality of channels;

processing image information supplied in the step of inputting the image to obtain the positions of a plurality of persons;

selecting the position of at least one person which is a subject to be processed from the positions of the plural persons detected in the step of detecting the person position;

determining a filter coefficient in accordance with a first signal which can be obtained owning to an observation performed on the assumption that a sound source signal, which has been generated arbitrarily, is disposed at the position of the person selected by the person position selection means and a second signal which is generated from the sound source signal in accordance with a mode selected from two modes consisting of a mode in which the sensitivities with respect to all voices from the selected person positions are simultaneously raised as compared with the sensitivities with respect to voices from person positions which have not been selected and a mode in which the sensitivity of only a voice from a specified object position among the selected person positions is raised as compared with the sensitivities with respect to voices from person positions which have not been selected; and extracting only the voices corresponding to the selected mode from voices input by the voice input means, the extraction being performed by using the filter coefficient determined in the step of determining the filter coefficient.

To achieve the third object, according to another aspect of the present invention, there is provided an apparatus for calculating filters, comprising:

time difference calculating means for calculating, for each channel, at least one of time difference between input signals supplied respectively to a plurality of channels and amplitude;

delay filter calculating means for respectively calculating first filters each having a filter coefficient corresponding to at least one of the time difference between input signals and the amplitude calculated by the time difference calculating means;

constraint condition calculating means for generating vectors which are generated by combining coefficients of respective delay filters calculated by the delay filter calculating means by the number which is smaller than the product of the length of the second filters connected to channels and the number of the channels to make the vectors to be elements of a matrix and determining, as a constraint condition, a linear equation including the matrix composed of the generated elements as the coefficient matrix; and filter coefficient calculating means for calculating an optimum filter coefficient for each of the second filters connected to the channels in accordance with the constraint conditions in the form of the coefficient matrix generated by the constraint condition calculating means.

According to another aspect of the present invention, there is provided a method of calculating filters, comprising the steps of:

calculating, for each channel, at least one of time difference between input signals supplied respectively to a plurality of channels and amplitude;

respectively calculating first filters each having a filter coefficient corresponding to at least one of the time difference between input signals and the amplitude calculated in the step of calculating the time difference;

generating vectors which are generated by combining coefficients of respective delay filters calculated in the step of calculating the delay filters by the number which is smaller than the product of the length of the second filters connected to each channel and the number of the channels to make the vectors to be elements of a matrix and determining, as a constraint condition, a linear equation including the matrix composed of the generated elements as the coefficient matrix; and calculating an optimum filter coefficient for each of the second filters connected to the channels in accordance with the constraint conditions in the form of the coefficient matrix.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 23 is a diagram showing an example of data about the position of a person;

FIGS. 31A to 31F are diagrams showing generation of a learning signal in accordance with power transmitted from each position;

DETAILED DESCRIPTION OF THE INVENTION

First to fifth embodiments of the present invention will schematically be described. In the first to fifth embodiments, components of a plurality of impulse response obtained from respective signals input to a plurality of sensors are used to calculate the weight of a virtual position determined arbitrarily in a seeking range. A position, at which the weight is enlarged is employed as the position of the reflecting object. Thus, even if a plurality of objects exist, their positions can be estimated. The weight of the virtual position is calculated in accordance with the component of an impulse response calculated in accordance with period of time taken for a signal output to a space from a signal source to measure the impulse response to reach the sensor through the above-mentioned virtual position.

Figure 1:
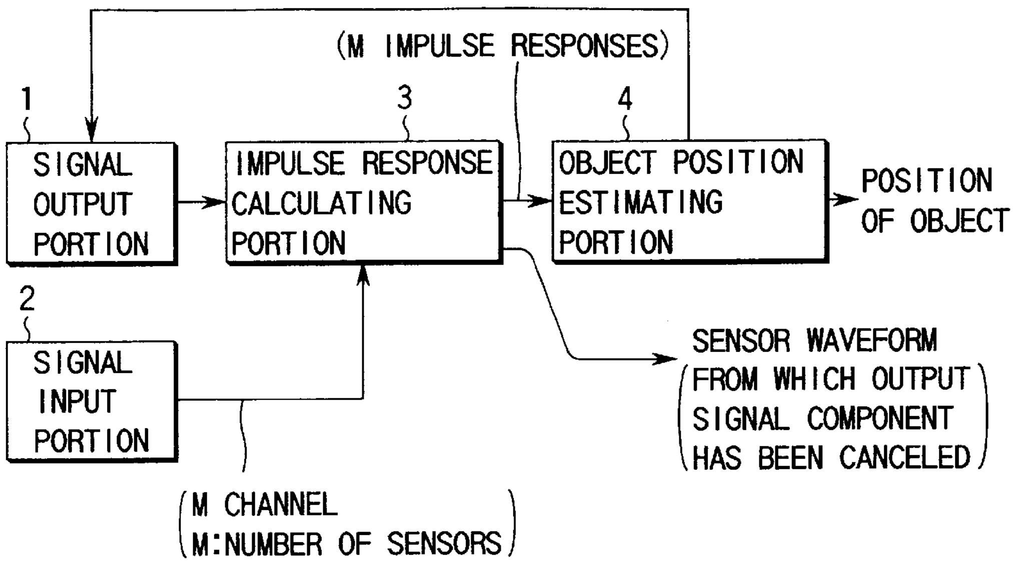
FIG. 1 is a diagram showing the structure of an apparatus for detecting the position of an object according to a first embodiment of the present invention.

Referring to the drawings, the first embodiment of the present invention will now be described. Referring to FIG. 1, the first embodiment will schematically be described. Referring to FIG. 1, an apparatus for detecting the position of an object according to this embodiment comprises a signal output portion 1 for generating a signal for estimating impulse response to transmit the signal to a space, such as indoors, a signal input portion 2 having a plurality of sensors for receiving signals output to the space and reflected from an object, an impulse response calculating portion 3 for estimating impulse response in accordance with the output signal and the input signal and an object position estimating portion 4 for determining the position of an object in accordance with the estimated impulse response.

With the above-mentioned structure, a signal is radiated from the signal output portion 1 into a space. The radiated signal is allowed to directly reach the sensor of the signal input portion 2 or after it has been reflected by a surround object. As a result, signals reflecting the surrounding states are received by the plurality of the sensors disposed at individual positions. The impulse response calculating portion 3 calculates the impulse response for each sensor between the signal received by each sensor and the signal radiated from the signal output portion 1. The object position estimating portion 4 including a weight calculating means detects the weight at each virtual position determined in the seeking space in accordance with the plurality of the obtained impulse responses. The position, at which the value of the weight is large, is obtained as the position of the object.

With the above-mentioned method, the number of objects which can be detected is not limited to one and the positions of a plurality of objects can be estimated.

Figure 2:
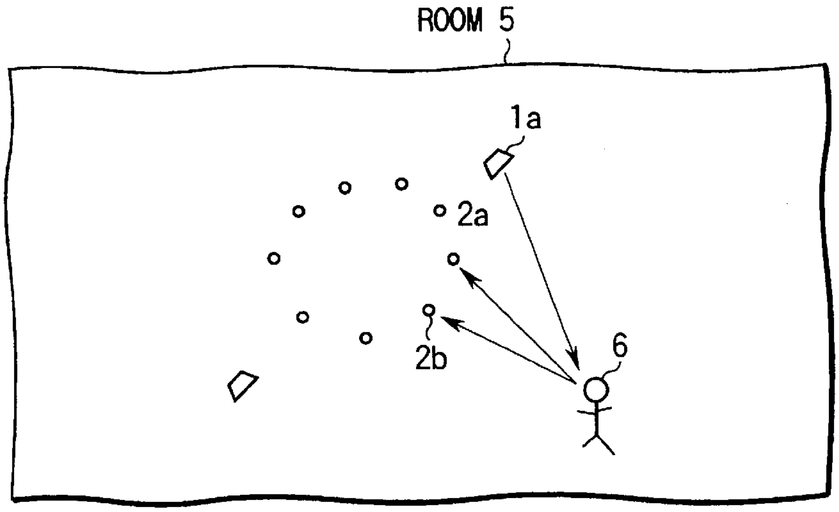
FIG. 2 is a diagram showing an example of the positions of a signal radiating means, such as loud speaker units and sensor for receiving signals.

The signal radiating means, such as the loud speaker unit or the antenna and the sensors for receiving the signals are disposed, for example, in the room, as shown in FIG. 2 (a signal radiating means 1*a* and sensors 2*a* and 2*b*). Reference numeral 6 represents an object which must be detected. The signal, which is radiated from the signal radiating means 1*a*, is, for example, white noise, impulses, sweep sine wave or band noise. If the signal is a sound wave, its frequency may be in an audible range or a frequency range higher than the audible range. Although the signal which is radiated to the space can be sound wave or radio wave, the description will be performed about the sound wave for convenience. It is preferable that the signal radiating means 1*a* has a nondirectional radiation characteristic or a characteristic having moderate directinality with which radiation is performed uniformly in the range in which the object, which must be detected, exists.

The calculations which are performed by the impulse response calculating portion 3 to obtain the impulse response may be performed by using an adaptive filter as disclosed in a document (D-II vol. J77-D-II No. 6, pp. 1037–1047 (June 1994) of a thesis magazine of Electronic Information Communication Society or by a cross spectrum method using fast Fourier transform. In order to sequentially perform calculations, it is preferable that the method using the adaptive filter be employed. As an alternative to this, impulses may be radiated into the space to employ the waveforms obtained through the sensors as the impulse response.

Figure 3:
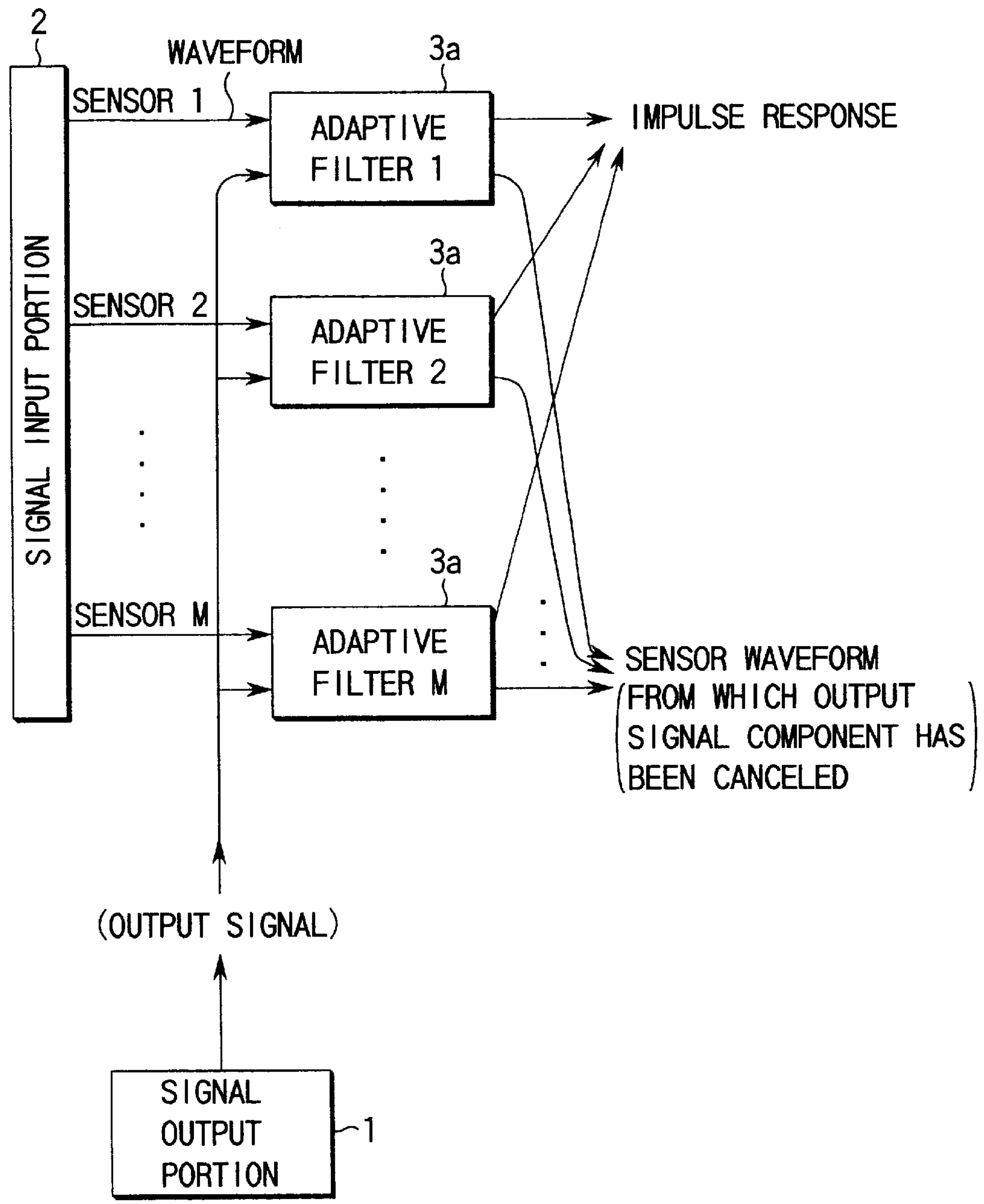
FIG. 3 is a diagram showing the structure of an impulse response calculating portion.

FIG. 3 shows the structure of the impulse response calculating portion 3 structured to comprise the adaptive filter. The impulse response calculating portion 3 comprises adaptive filters corresponding to plural (1 to M) sensors. In this case, signals received by the signal input portion 2 are read for each channel of the sensor to supply the same to each of the adaptive filters 3*a* (1 to M). Then, a signal radiated from the signal output portion 1 is injected as an input signal for each adaptive filter 3*a*.

In accordance with the above-mentioned two inputs, new impulse response for the sample of the signal is calculated by each adaptive filter 3*a*. Simultaneously, signals from which the output signal components in the input signals are canceled are calculated. The adaptive filter may be a filter adapted to a known Least Mean Square (LMS) method or that adapted to a Recursive Least Square (RLS) method. The detailed structure of the adaptive filter has been described in a document ("Guidance to Adaptive Filter" written by Heikyn). Then, measurement of the impulse response by using the Normalized LMS (NLMS) which is one of LMS adaptive filters.

Figure 4:
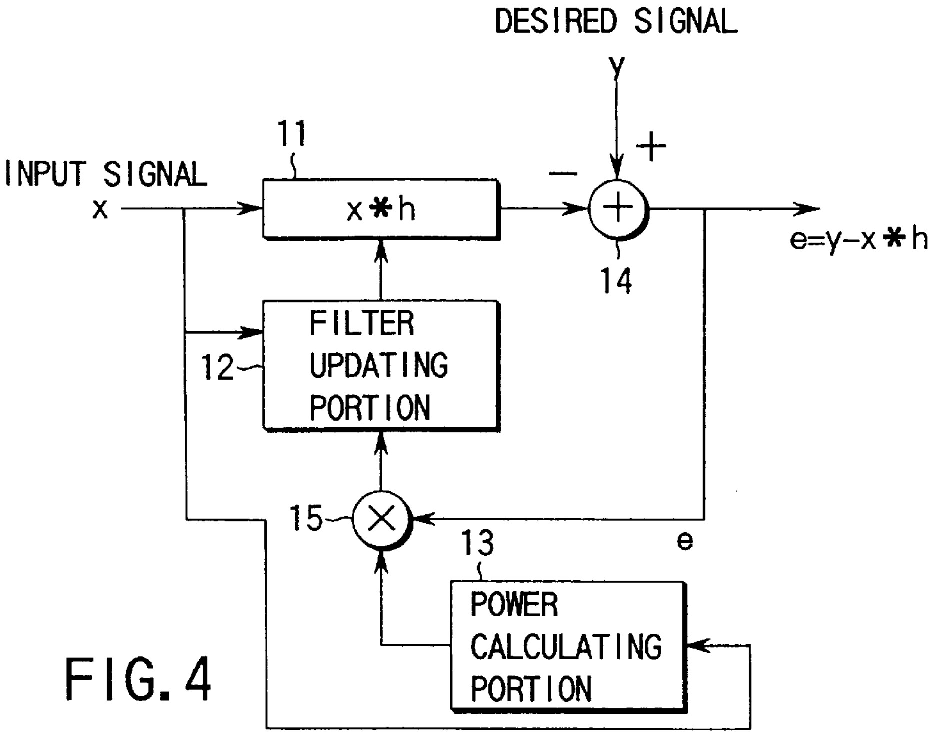
FIG. 4 is a diagram showing the structure of an adaptive filter.

FIG. 4 shows the structure for estimating the impulse response of the transmission system by using the NLMS adaptive filter. Referring to FIG. 4, the estimating structure comprises a convolution calculation portion 11 for calculating convolution x*h of an FIR filter h indicating the impulse response and input x, a filter updating portion 12 for updating the filter coefficient in accordance with error e=y−x*h, a power calculating portion 13 for calculating power p of an input signal, an adder 14 and a multiplier 15, wherein x is the input signal and y is a desired signal.

The impulse response h is updated by the following equation:

$$h_j=h_{j-1}-a*e*x/2p \quad (1)$$

As a result of the updating process, the impulse response which is the transmission characteristic between the desired signal and the input signal. Simultaneously, the error signal e is transmitted. The error signal e is obtained by canceling the desired signal component y from the input signal x. In Equation (1), $h_j$ is impulse response after j times of updating processes, and a is step size which can experimentally be obtained and which is included in a range as 0<a<1.0, a being, for example, 0.1.

Figure 5:
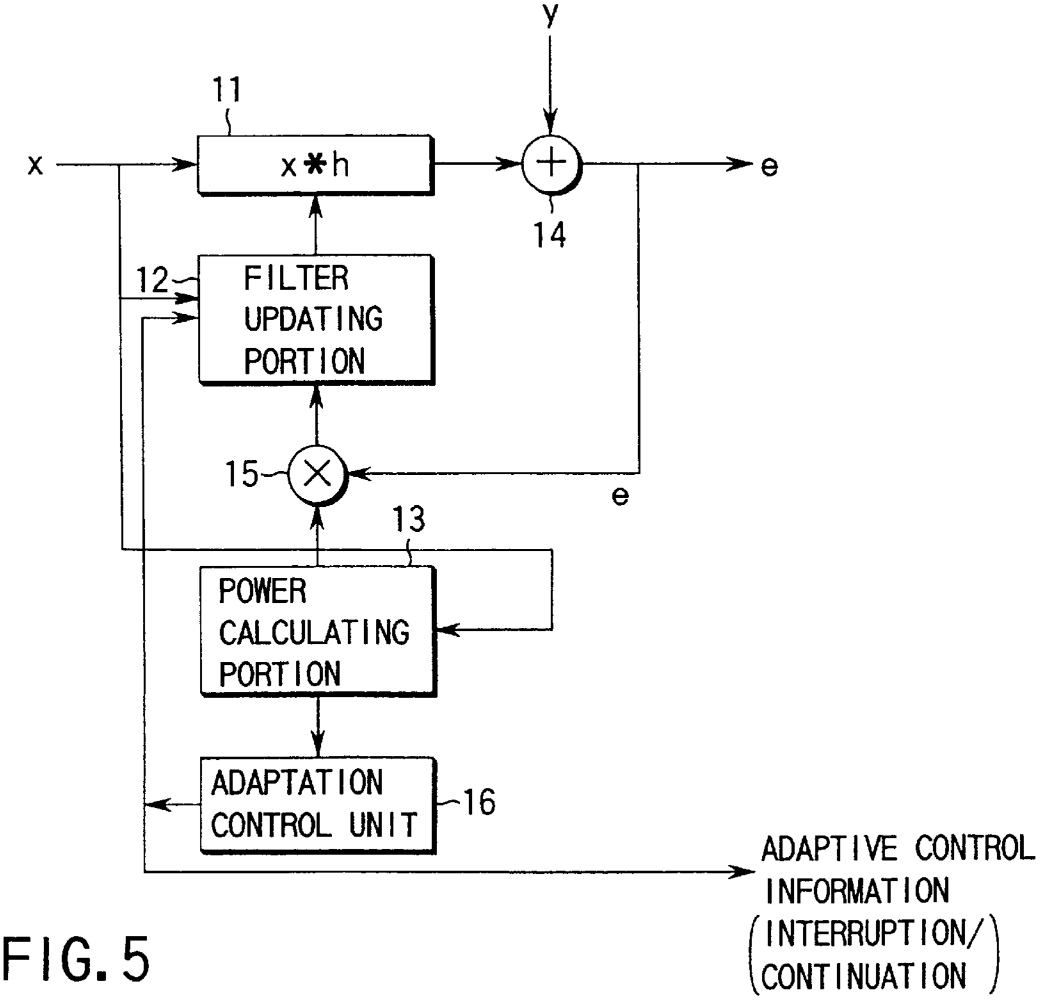
FIG. 5 is a diagram showing the structure of an adaptation control portion.

In order to prevent enlargement of the estimated error owning to noise if the power of the input signal is too small as compared with the level of source signal, an adaptive control process for inhibiting update of the filter if the value of power p of the input signal is smaller than a threshold value is generally performed with an adaptive control unit 16 formed as shown in FIG. 5 and added to the structure shown in FIG. 4. In this embodiment, adaptive control information indicating whether or not the adaptive filter is updated is also transmitted to the outside of the adaptive filter calculating portion.

The value of the power of the input signal is processed such that mean power is obtained from samples at 128 points from the present time of a desired response, which is supplied to the body of the adaptive filter, to a point of 128 points before. Then, adaptive control information indicating whether interruption of adaptation/continuation is output for each sample point. The body of the adaptive filter performs the adaptive operation in accordance with adaptive control information above. The above-mentioned threshold is determined to be a value lower than a mean value of a radiating output signal, which is the input signal, by, for example, 20 dB.

Figure 6:
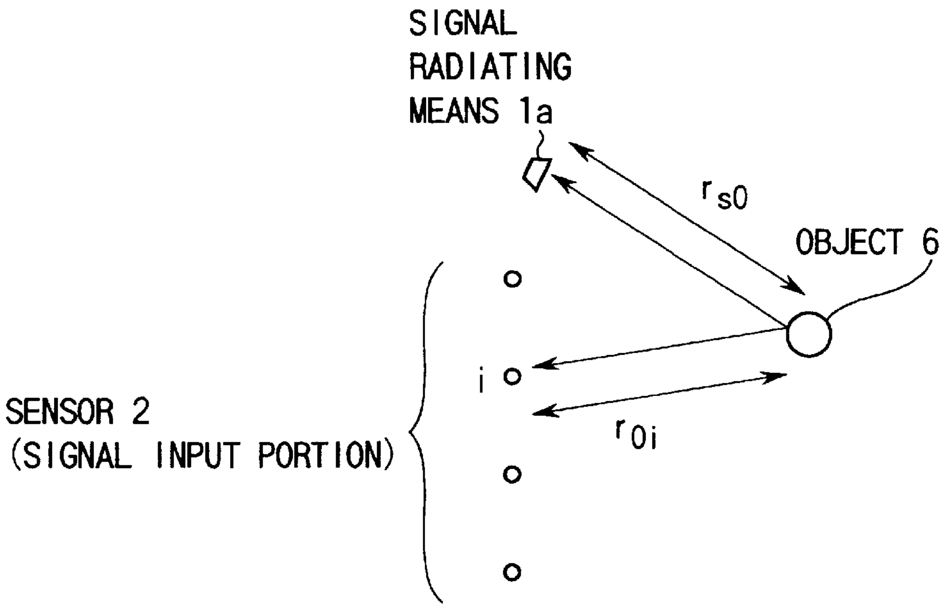
FIG. 6 is a diagram showing transmission time.

A process which is performed in accordance with plural impulse response by the object position estimating portion 4 will now be described. An assumption is made here that the signal output means, sensors and an object are located as shown in FIG. 6.

At this time, transmission time taken for an output signal radiated from the signal radiating means la, transmitted at propagation velocity of c, reflected by the object 6 and allowed to reach an i-th sensor is expressed as follows:

$$T_i=(r_{so}+r_{oi})/c$$

The component of the impulse response is considered to indicate the magnitude of the component of the reflected wave for each time delay. Therefore, the time delay component corresponding to the transmission time is extracted from each impulse response. Since the component of the impulse response is generally obtained in each sampling period, time delay nearest the transmission time $T_i$ of the signal reflected from the object at a virtual position may be obtained by rounding off or a value of impulse response at a time delay point which is not an integer multiple of the sampling period may be obtained by performed linear interpolation as follows:

$$W_i=(n+1-T_i)*h_i(n-1)+(T_i-n)*h_i(n) \quad (2)$$

where $T_s$ is a sampling period, n is an integer obtained by cutting $T_i/T_s$ away, and $h_i$ (k) is a value of a point at which time delay of the impulse response for the i-th sensor is k. Attention may be paid to the energy of the impulse response and the following calculations may be performed:

$$W_i=(n+1-T_i)*|h_i(n-1)|^2+(T_i-n)*|h_i(n)|^2 \quad (3)$$

As an alternative to this, decay owning to transmission may be considered to perform the following calculations:

$$W_i=(n+1-T_i)*|h_i(n-1)/(r_{so}+r_{oi})|^2+(T_i-n)*|h_i(n)/(r_{so}+r_{oi})|^2 \quad (4)$$

Figure 7:
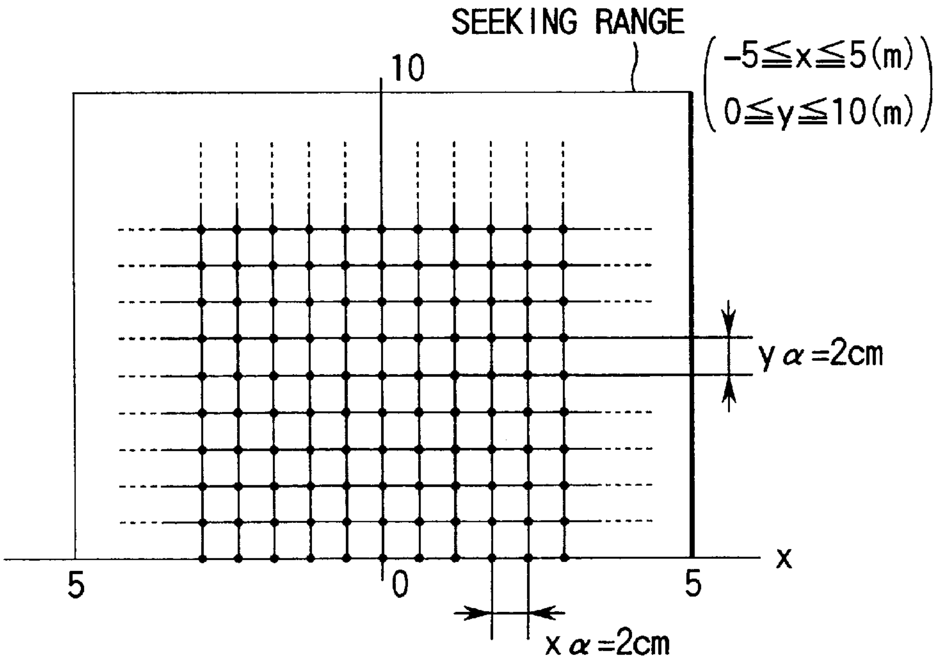
FIG. 7 is a diagram showing a method of setting a virtual position.

After the above-mentioned components corresponding to the transmission time have been obtained for each impulse response, the sum $\Sigma W_i$ of the components is calculated to obtain the weight of the virtual position. Then, the weight is calculated in the overall seeking range such that the position of the virtual position is shifted. At this time, the product may be calculated in place of calculating the weight. As for the virtual position, a plurality of lattice points are, as shown in FIG. 7 for example, determined in the seeking range to calculate the weights for all of the determined lattice point so as to spatial distribution of the weights is obtained. Finally, the peak is detected from the obtained distribution of the weights. The obtained position is output as the position of the object.

Figure 8:
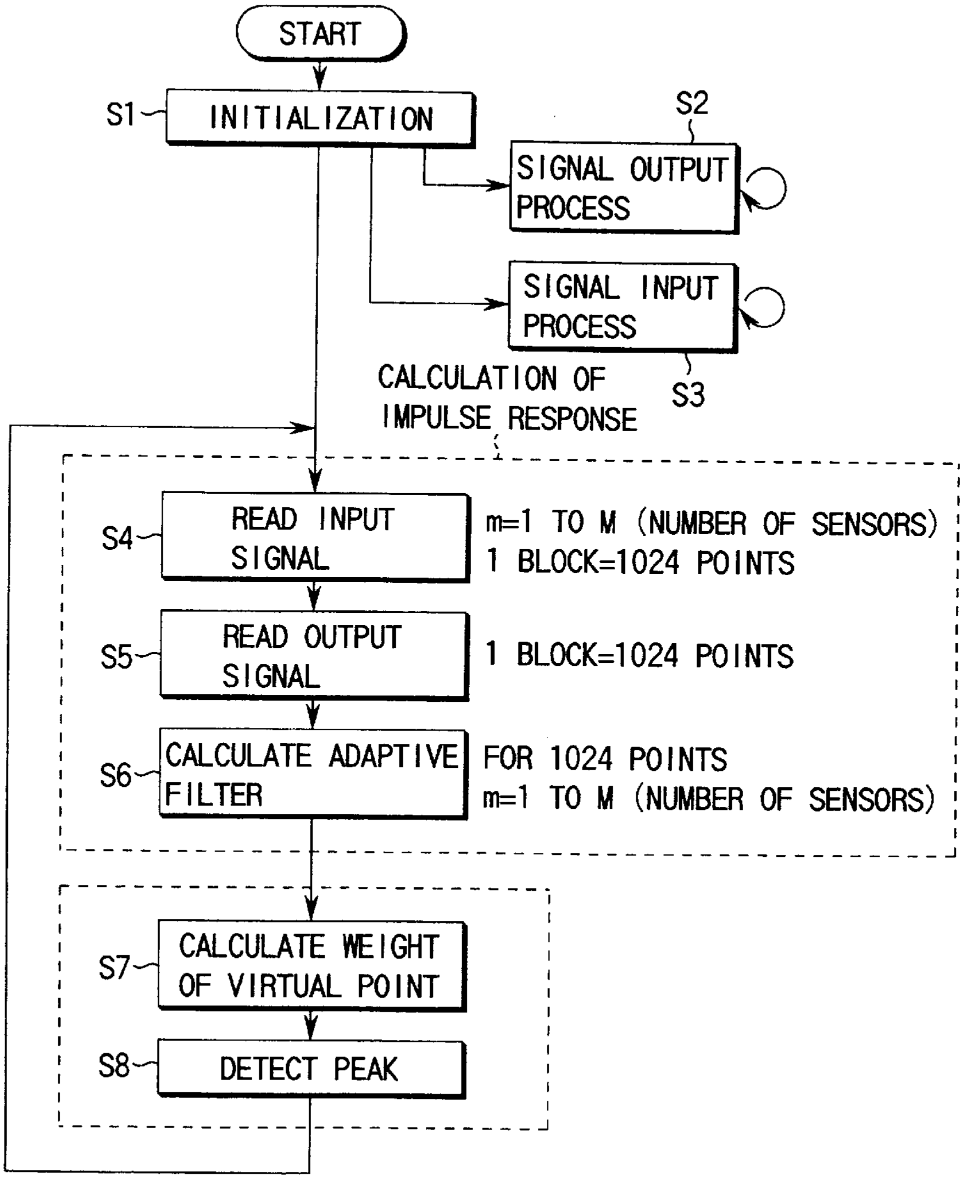
FIG. 8 is a flow chart of the process according to the first embodiment.

Referring to FIG. 8, the flow of the above-mentioned process will now be described.

As an initialization process, the position of the signal radiating means 1*a*, that of the sensor 2*a*, the seeking range and the scale of seeking are determined (step S1).

Then, a signal output process is performed such that a random noise series for a sufficiently long period of time, for example, 60 seconds is stored in the memory so as to be read and D/A-converted, followed by being output from the loud speaker unit. After all data items have been processed, the reading operation is returned to the leading data item. The above-mentioned process is repeated until the overall process is completed (step S2).

Then, a signal input process is performed such that signals from sensors are A/D-converted when the signals are sound waves. The sampling frequency is made to be, for example, 40 kHz so as to be stored in a ring buffer having a capacity of one seconds. The foregoing process is continued until the overall process is completed. The above-mentioned A/D conversion process is performed for all of the sensors (step S3).

A process of the signal input portion 2 for fetching a signal and generation of an output signal and output of the generated signal which are performed by the signal output portion 1 are individually performed in parallel to the other processes.

Then, input signals for the length of one block, for example, for 1,024 points, are read from the ring buffer. The input signals from all of the sensors are read (step S4).

Then, output signals for the length of one block, for example, for 1,024 points, are read from the memory in which the output signals are stored. Reading is performed from the leading end of data. When output signal is read in this step, data next to the final data of the read data is read. When data has been completely read, the reading operation returns to the leading end of data and the foregoing process is repeated (step S5).

Then, the adaptive filter is used to calculate and update the impulse response in accordance with read input and output data for the length of one block. Calculations are performed for all of the adaptive filters (step S6).

Then, a virtual position is determined in a space which must be sought, and then the weight of the virtual position is calculated in accordance with, for example, Equation (3). The virtual position is made to be a lattice point determined in the seeking range, as shown in FIG. 7. Weights of all of the determined lattice points are calculated so as to obtain spatial distribution of the weights (step S7).

Then, peaks are obtained from the distribution of the weights obtained in step S7 so that the position of the peak, at which its weight is larger than the predetermined threshold is output as the position of the object (step S8). The threshold for detecting the peak may be determined to a level higher than a mean value of the distribution of weights in the seeking range by 3 dB or more. However, it is preferable that the threshold be determined experimentally to be adaptable to the situation.

The processes in steps S4 to S8 are repeated until the process is completed.

In the present invention, any signal, the impulse response of which can be estimated, may be employed. Therefore, electric waves may be employed in place of the sound waves. Also the space in which seeking is performed is not limited to the air space. The space may be a space in water space or that in the earth.

According to the first embodiment, the positions of a plurality of objects can be estimated. Moreover, a signal waveform in the form from which the component of the output signal has been canceled can be obtained from signals from a plurality of sensors. The signal waveform in the form from which the component of the output signal has been canceled may as well as be used as a signal for a microphone array to collect voice.

A second embodiment of the present invention will now be described. This embodiment is structured such that signals are output to a space from a plurality of signal radiating means to obtain impulse response corresponding to each of the signal radiating means so as to enable an accuracy in estimating the position of an object to be realized similar to a case where the sensors are increased. That is, impulse responses by the number of the signal radiating means are obtained from one sensor. Therefore, assuming that the number of sensors is M and that of the signal radiating means is N, M*N impulse responses can be obtained by using M*N adaptive filters. Thus, the number of addition operations for obtaining the weight of the virtual position is enlarged so that the accuracy in estimation is improved.

Although the overall structure of this embodiment is the same as that of the first embodiment, the structures of the signal output portion and the impulse response calculating portion are changed to be adaptable to a plurality of signal outputs.

Figure 9:
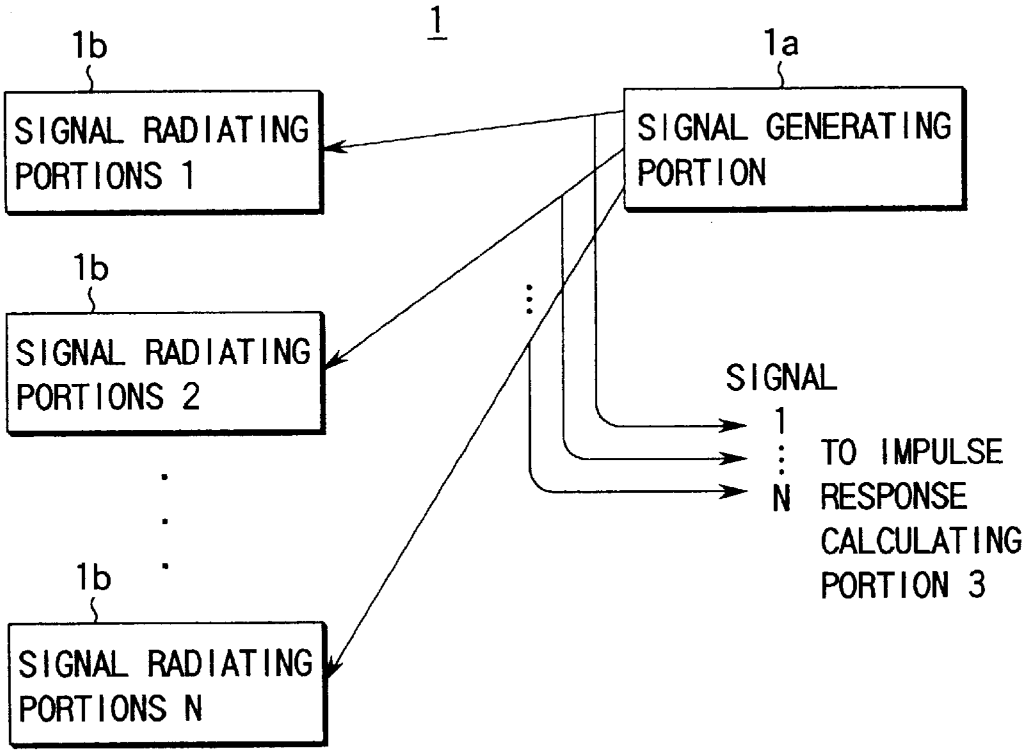
FIG. 9 is a diagram showing the structure of a signal output portion of an apparatus for detecting the position of an object according to a second embodiment of the present invention.

FIG. 9 is a diagram showing the structure of the signal output portion according to the second embodiment. The signal output portion 1 comprises a signal generating portion 1*a* for generating output signals and a plurality of signal radiating portions 1*b* (1 to N). The output signals are radiated from the signal radiating portions 1*b* and as well as output to the impulse response calculating portion 3. Similarly to the first embodiment, a signal series for a sufficiently long period of time, for example, 60 seconds is stored in a memory of the signal generating portion 1*a* so as to be read and supplied to the signal radiating portions 1*b*. After reading of data has been completed, the reading operation is returned to the leading end of the data. The foregoing process is repeated until the overall process is completed. At this time, different random signal series having no correlation respectively are provided for the signal radiating portions 1*b* so as to transmit individual signal series to the signal radiating portions 1*b*.

Figure 10:
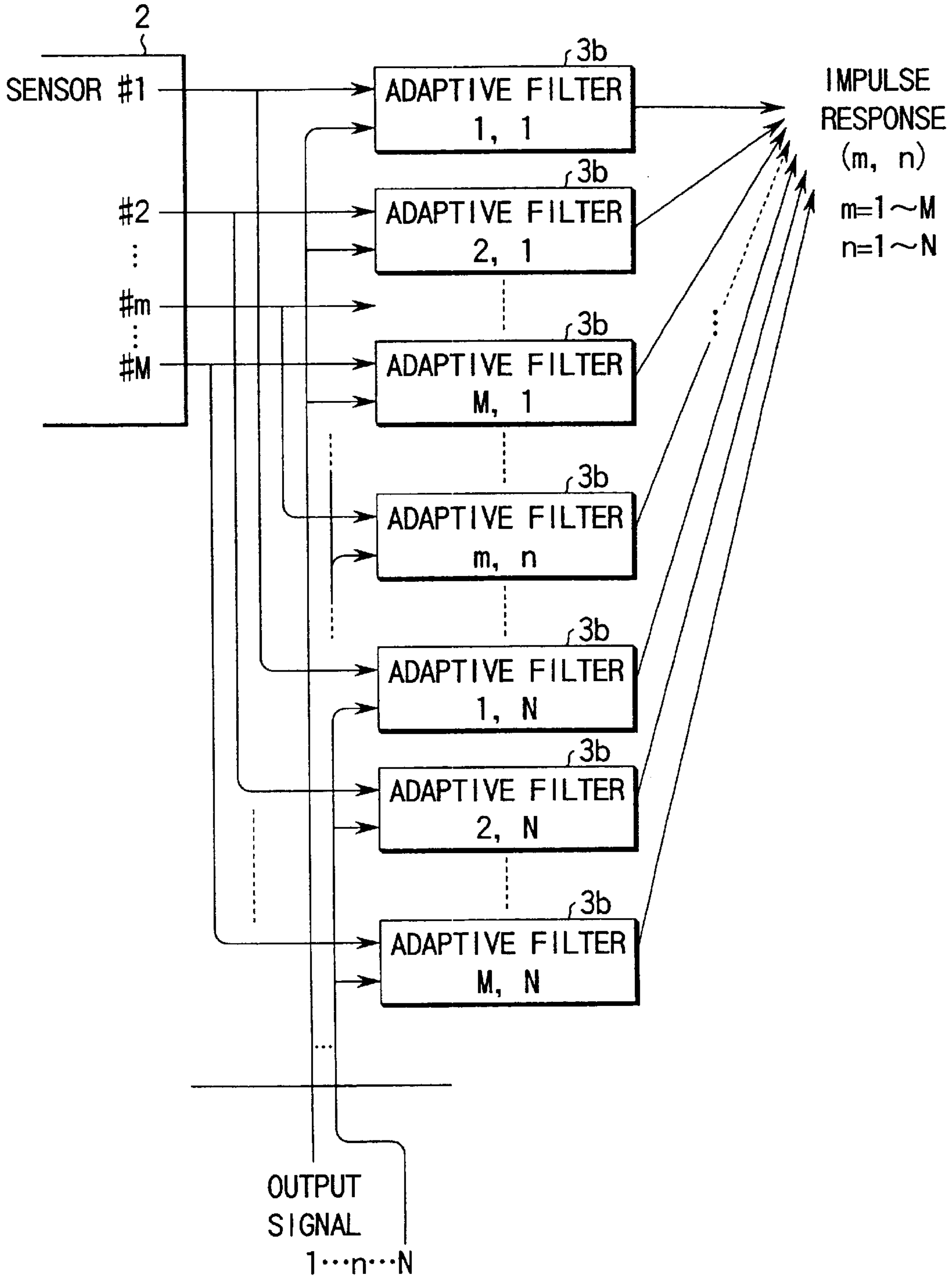
FIG. 10 is a diagram showing an impulse response estimation portion.

The impulse response calculating portion 3 has a structure as shown in FIG. 10 to calculate the impulse responses among the plural output signals and input signals for the sensors. Referring to FIG. 10, the adaptive filters for calculating the impulse responses are provided by the number obtained by (the number of sensors)*(the number of signal radiating portions) to receive M input signals supplied from the sensors 1 of the signal input portion 2 and N signals supplied from the signal output portion 1 so as to measure the impulse responses.

Although the signals from the plural signal output means are, in the superimpose form, supplied to the sensors, components having no correlation with the N signal outputs from the signal output portion 1, which are the desired input for the adaptive filters, are treated as noise. Since the influence of the noise is reduced, no problem arises.

As compared with the first embodiment, the procedure of the process in the structure according to the second embodiment is not basically different from the first embodiment except for the number of calculations for obtaining the impulse response being enlarged from the number of sensors to the number which is (the number of sensors)*(the number of output means) and the number of the impulse responses being enlarged from M to M*N for use in the process for estimating the position of an object. Therefore, the detailed description of the process is omitted here.

A third embodiment of the present invention will now be described.

The second embodiment, having the structure such that random signals having no correlation are output into the space to estimate the impulse responses, has risks that the accuracy in estimating the impulse response deteriorates and the converging speed for the adaptive filter is reduced because the outputs acts as noise. In order to prevent the above-mentioned problems, this embodiment, as will now be described, has a structure such that signals which do not overlap in terms of time are output and signals composed of components in different frequency regions are output from the signal output portion 1.

Figure 11:
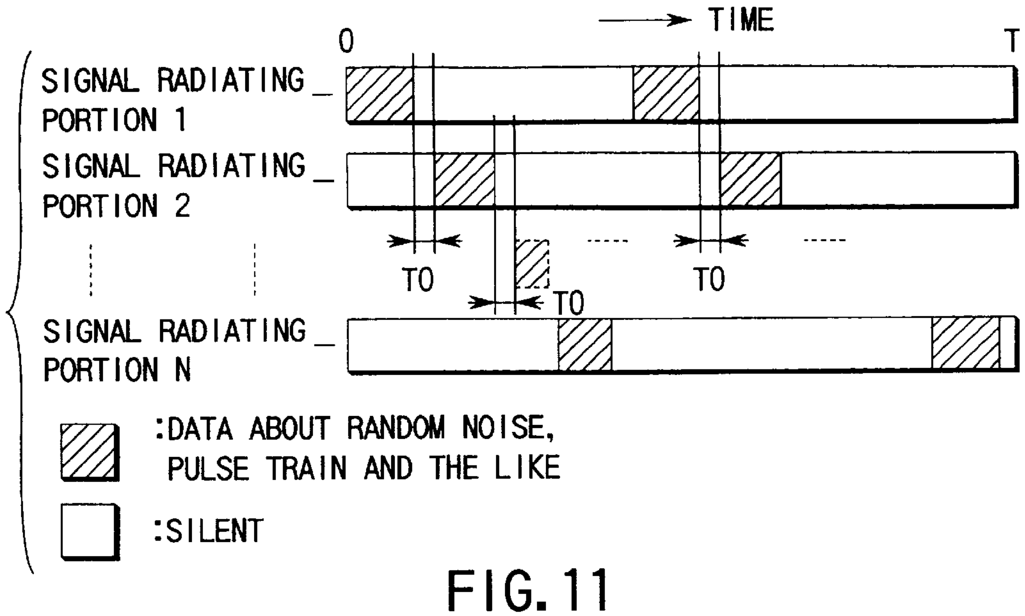
FIG. 11 is a diagram showing the contents of data of a signal which is used when signals are transmitted at different time.

When signals are output at different timings, the contents of data which is, as a signal, stored by the signal generating portion are formed, for example, as shown in FIG. 11. FIG. 11 shows the contents of data of signals radiated from the signal radiating portion 1 and corresponding to N. At the same time, only data of one signal output means indicates existence of a signal and data from the other signal output means indicates soundless state. In order to provide a period of time in which all of the signal radiating portions 1*b* are brought into a silent state while considering reverberation, a short silent period indicated with To shown in FIG. 11, for example, a period of 500 ms, may be provided in front of each signal existing period and in the rear of the same. Data in the signal existing period may be in the form of a pulse series or random signals.

When the impulse response is measured by using the above-mentioned signals, the adaptive filters of the impulse response calculating portion 3 are, as described in the first embodiment, structured in such a manner that interruption/continuation of update of the filter coefficient is performed to correspond to the level of the radiated output signal, which is the desired signal, in order to prevent adaptation owning to noise.

The flow of the above-mentioned process is similar to that according to the second embodiment.

Figure 12:
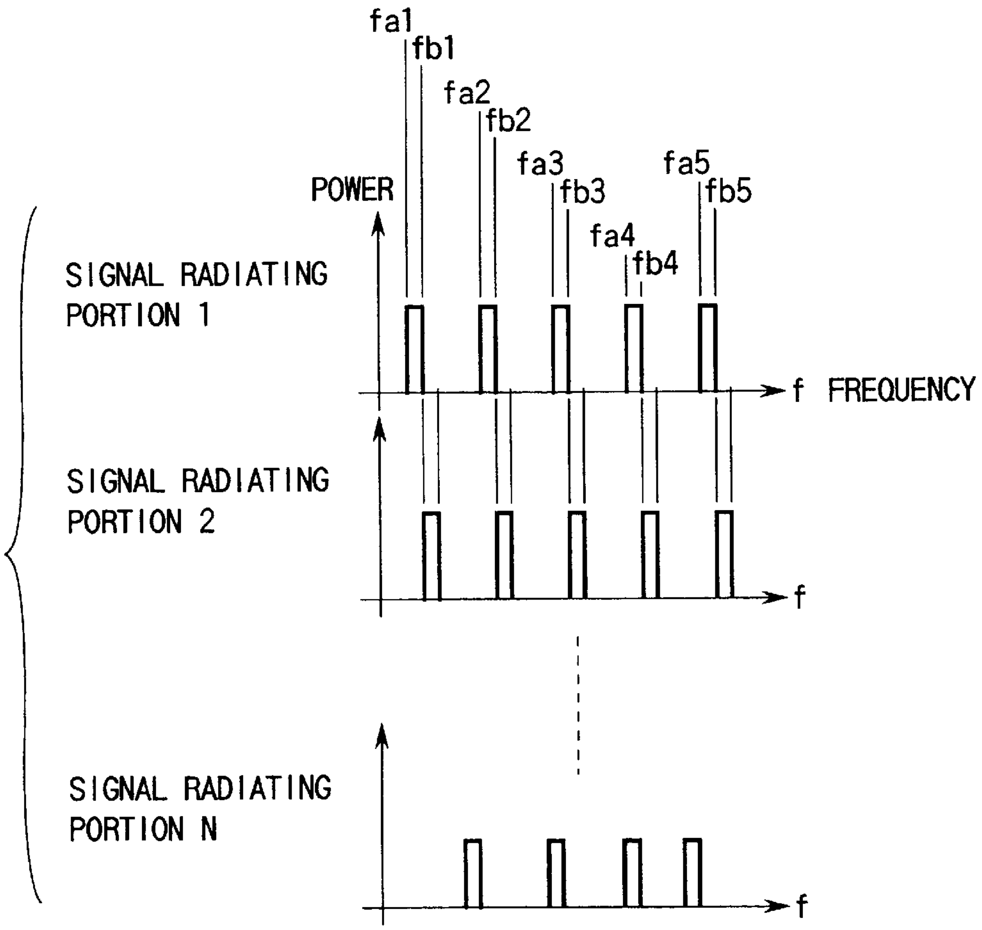
FIG. 12 is a graph showing the frequency characteristic of each of the signal radiating portions.

A case in which signals composed of components in the different frequency regions are output from the signal output means will now be described. In this case, data to be stored in the signal generating portion 1*a* is formed to have a frequency characteristic, for example, as shown in FIG. 12. FIG. 12 shows the frequency characteristic of signal data corresponding to the signal radiating portions 1*b* (1 to N) so that each data has a comb-like band region. Each comb-like frequency characteristic is formed in such a manner that overlap of frequency band regions having great power from the signal radiating portions is prevented. The signal waveform having the above-mentioned comb-like frequency characteristic can be generated by superimposing a plurality of sine waves respectively having individual frequencies.

A signal from the signal output portion 1 shown in FIG. 12 comprises the frequency band region having power in the region fa1 to fb1, fa2 to fb2, fa3 to fb3, fa4 to fb4 and fa5 to fb5. The sine wave having the frequency in the above-mentioned region can be generated in accordance with the following equation:

$$\sin(2\pi k(\text{fbi}-\text{fai})/(N-1)),$$

where $1 \leqq i < 5$, $0 < k \leqq N-1$, i is the number of the regions each having power, N is the number of sine waves, for example, 10 and k is the number of the sine wave. As can be understood from the foregoing equation, enlargement of N causes the region to be densely covered.

Figure 13:
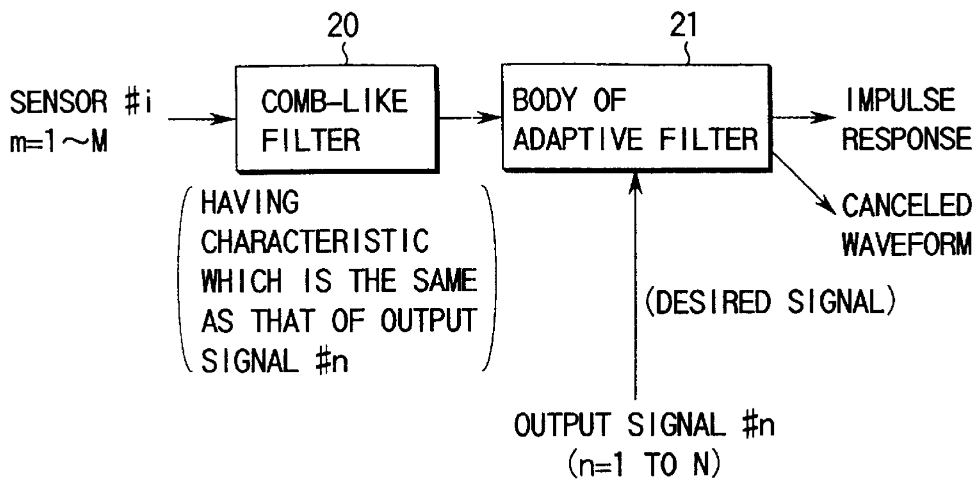
FIG. 13 is a diagram showing the structure of an adaptive filter for use when a plurality of output signals having different frequency characteristics are used.

When the impulse response is calculated by using the signals having the different frequency regions, the adaptive filter of the impulse response calculating portion 3 is formed as shown in FIG. 13. Referring to FIG. 13, reference numeral 20 represents a comb-like filter and 21 represents a body of the adaptive filter having a structure, for examples, as shown in FIGS. 4 and 5. FIG. 13 shows the structure for supplying a signal allowed to pass through the comb-like filter 20 to the body 21 of the adaptive filter. The characteristic of the comb-like filter 20 is made to be the same as the frequency characteristic of the output signal which is received by the body 21 of the adaptive filter to which the comb-like filter 20 is connected. The flow of the process is different from the step for calculation of the adaptive filter (step 6 shown in FIG. 8) according to the second embodiment except for an added step of allowing the signal to pass through the comb-like filter.

A fourth embodiment of the present invention will now be described. The fourth embodiment is structured such that the intensity of the signal which is radiated from the signal output means to the space is changed to be adaptable to the position of the an object. As described above, the structure according to the present invention is formed such that signals, such as sound waves or electric waves, are radiated to a space so that impulse response is measured. If the subject, the position of which is detected, is a human being, or if a human being exists in a seeking range, the output signal must not be discomfortable and harmless for human beings. Sound waves in the audible range is offensive to the ears. Even if a frequency range except for the audible range is employed, there is a risk that the human body is harmed in a case where an intense signal is employed. The influence of the signal is considered to become great in proportion to the distance from, for example, a loud speaker unit to the human being. Therefore, when an object has been detected, the distance from the detected object and the signal radiating means is detected so as to change the intensity of the output signal in accordance with the detected distance.

Figure 14:
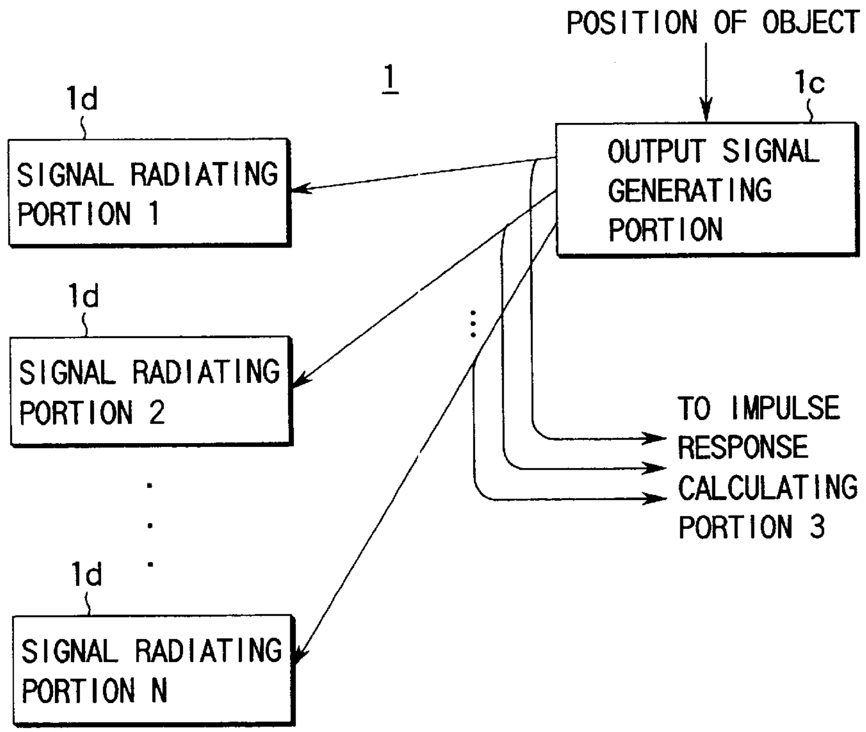
FIG. 14 is a diagram showing the structure of a signal output portion of an apparatus for detecting the position of an object according to a fourth embodiment of the present invention.

In order to achieve the above-mentioned object, the fourth embodiment is arranged in such a manner that the structure of the signal output portion according to the second embodiment is formed as shown in FIG. 14 so as to receive information of the position of the object from the object position estimating portion.

Referring to FIG. 14, reference numeral 1*d* represents a signal radiating portion, and 1*c* represents an output signal generating portion. When N signals corresponding to N signal radiating portions 1*d* are generated in the output signal generating portion 1*c*, the intensity is changed in accordance with the position of an object estimated by the object position estimating portion 4. If only one signal radiating portion 1*d* is provided, the structure according to the first embodiment may, as a matter of course, be formed such that the number N of the signal radiating portions is made to be one.

Figure 15:
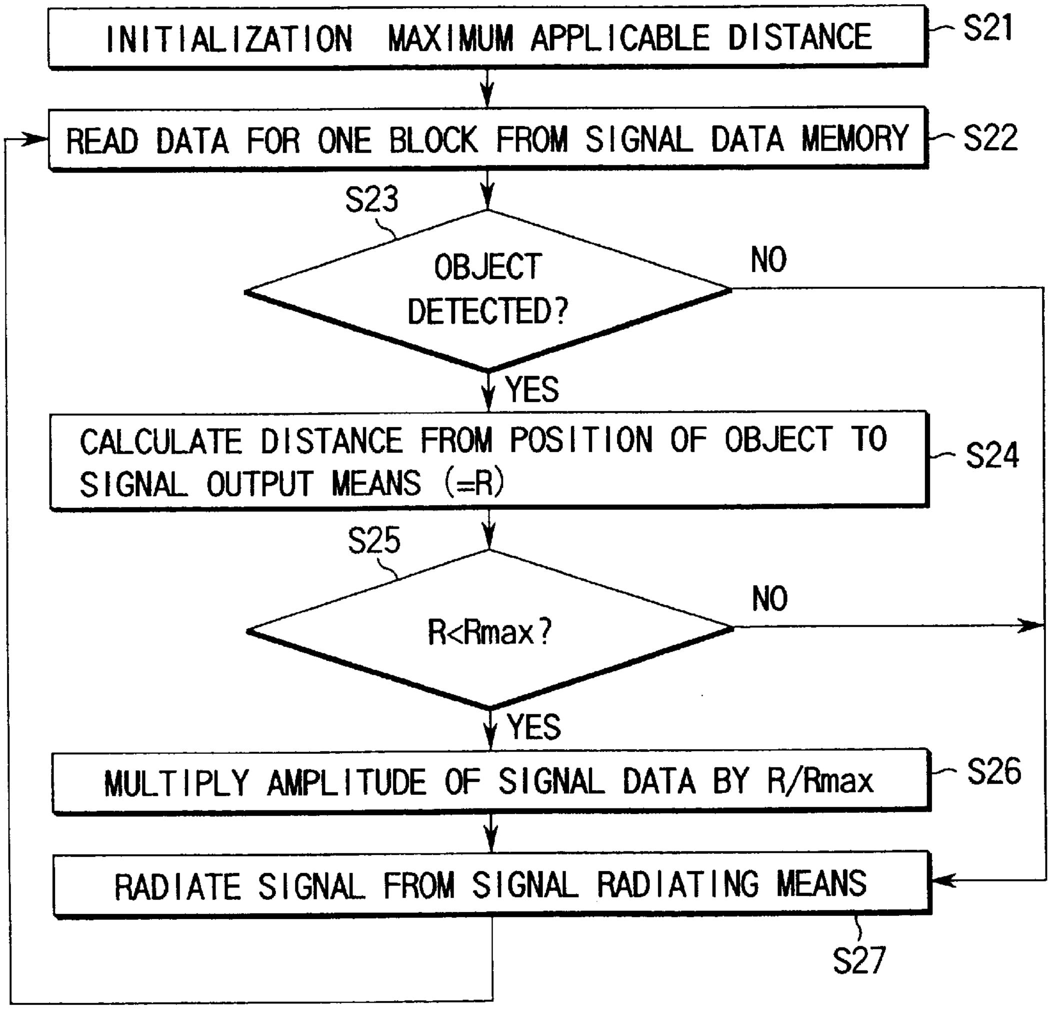
FIG. 15 is a flow chart of a process in a signal output portion according to the fourth embodiment of the present invention.

The process which is performed in the signal output portion including the output signal generating portion 1*c* will now be described with reference to FIG. 15.

To determine the applicable range when the output signal is changed in accordance with the distance from the object, the maximum applicable distance $R_{max}$ is determined in the initial step (step S21). The foregoing value is provided to change the output signal only when an object in a range nearer than the maximum applicable distance is detected. Thus, reaction with respect to a distant object which cannot accurately be detected is inhibited.

Then, data for one block, for example, 1,024 points is red from the memory in which data of output signals is stored (step S22).

Then, information about detection of the position of an object in the object position estimating portion 4 is examined (step S23). If an object is detected, the operation proceeds to step S24. If no object is detected, a signal for this block is radiated from the signal radiating portion 1*d* to the space (step S27). Then, the operation returns to step S22.

In step S24 distance R from the position of the object to the signal output means is detected. If a plurality of signal output means are provided, a smaller value is employed as R.

Then, R and the maximum applicable distance $R_{max}$ are subject to a comparison. If $R<R_{max}$, the operation proceeds to step S26. If a negative result is obtained, the operation proceeds to step S27 (step S25).

In step S26 the amplitude of signal data read in step S22 is made to be $R/R_{max}$ times.

Then, signal data is transmitted to the signal radiating portion 1*d* (step S27), and then operation returns to step S22. Then, the foregoing process is repeated.

A fifth embodiment of the present invention will now be described. The fifth embodiment, the intensity of the signal, which is radiated from the signal output means to a space, is changed to correspond to the position of the object. The fifth embodiment is, as described above, structured in such a manner that signals, such as sound waves or electric waves, are radiated to a space in order to measure the impulse response. If the subject, the position of which is detected, is a human being, components of intense reflected sounds from fixed objects are sometimes included. If the fixed objects are omitted from detection to detect only the mobile object, weight components which are not changed as time elapses are subtracted from weight distribution estimated by the object position estimating portion so that only the mobile object which is changed as time elapses is simply detected. If the components, which are not changed as time elapses are previously subtracted from components of the impulse response and the position of the object is estimated in accordance with the residual impulse response, the position of a mobile object can be detected. This embodiment is formed in such a manner that the mobile object is estimated by using the difference in the impulse response.

Figure 16:
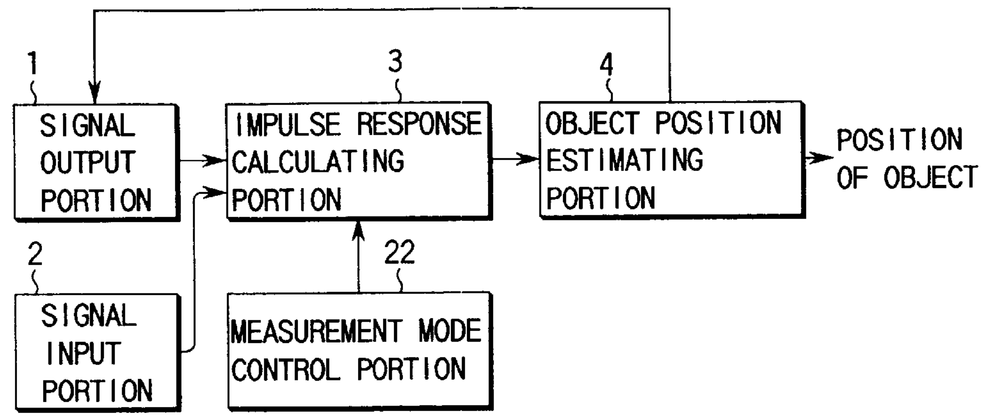
FIG. 16 is a diagram showing the structure of an apparatus for detecting the position of an object according to a fifth embodiment of the present invention.

FIG. 16 shows the structure of the fifth embodiment having a structure formed in such a manner that a measurement mode control portion 22 for instructing perform measurement of only components of the impulse response, which are not changed as time elapses, if no mobile object exists is added to the structure shown in FIG. 1 which shows the basic structure of the first to fifth embodiments. In this embodiment, measurement modes consisting of a mode in which the impulse response is measured as the base component which must be subtracted and a mode in which a component obtained by subtracting the base component is transmitted.

The measurement of the base impulse response may be instructed from a user by depressing a switch or by using a keyboard or a mouse of a computer. As an alternative to this, a structure may be employed in which a predetermined period of time, for example, five seconds, immediately after start of the process for detecting the position of an object, are automatically made to be the base impulse response measurement mode. Moreover, a usual impulse response estimation is performed after a lapse of 5 seconds. If the latter structure is employed in which the base impulse response is automatically measured for a predetermined period of time, the measurement mode control portion 22 is structured, for example, as shown in FIG. 17.

Figure 17:
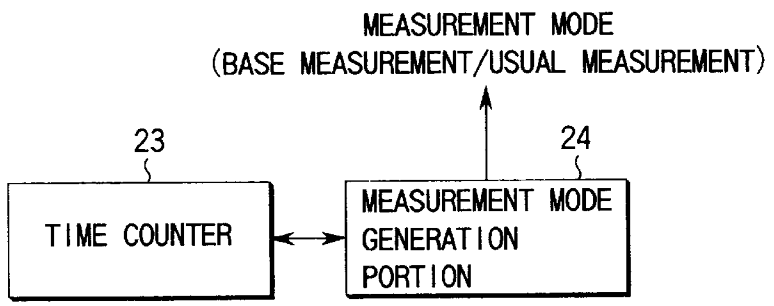
FIG. 17 is a diagram showing the structure of a measurement mode control portion.

Referring to FIG. 17, reference numeral 23 represents a time counter and 24 represents a measurement mode generating portion. The time counter 23 counts time from start of the process. The measurement mode generating portion 24 determines the mode for measuring the base impulse response before a lapse of the predetermined time and the mode for measuring the usual impulse response after the predetermined times has elapsed. Note that measurement of time can easily be performed by a system function of a computer system, for example, a UNIX.

Figure 18:
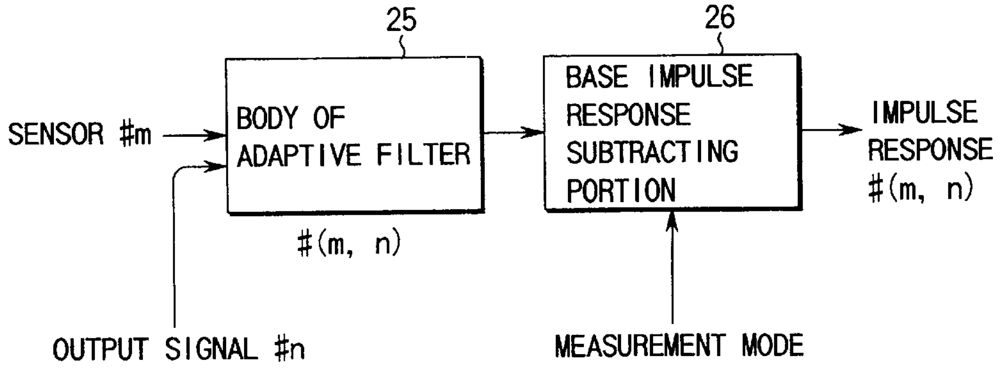
FIG. 18 is a diagram showing the structure of an adaptive filter having a base subtracting portion.

Moreover, each adaptive filter of the impulse response calculating portion 3 is formed as shown in FIG. 18. Referring to FIG. 18, reference numeral 25 represents a body of the adaptive filter for measuring the impulse response and formed, for example, as shown in FIGS. 4 and 5. Reference numeral 26 represents a base impulse response subtracting portion. The impulse response measured by the body 25 of the adaptive filter is supplied to the base impulse response subtracting portion 26. Then, a result of this process is supplied to the object position estimating portion 4. If the measurement mode is the base measurement, the base impulse response subtracting portion 26 stores the measured impulse response as the base impulse response. If the measurement mode is the usual measurement, the base impulse response is subtracted from the supplied impulse response.

Figure 19:
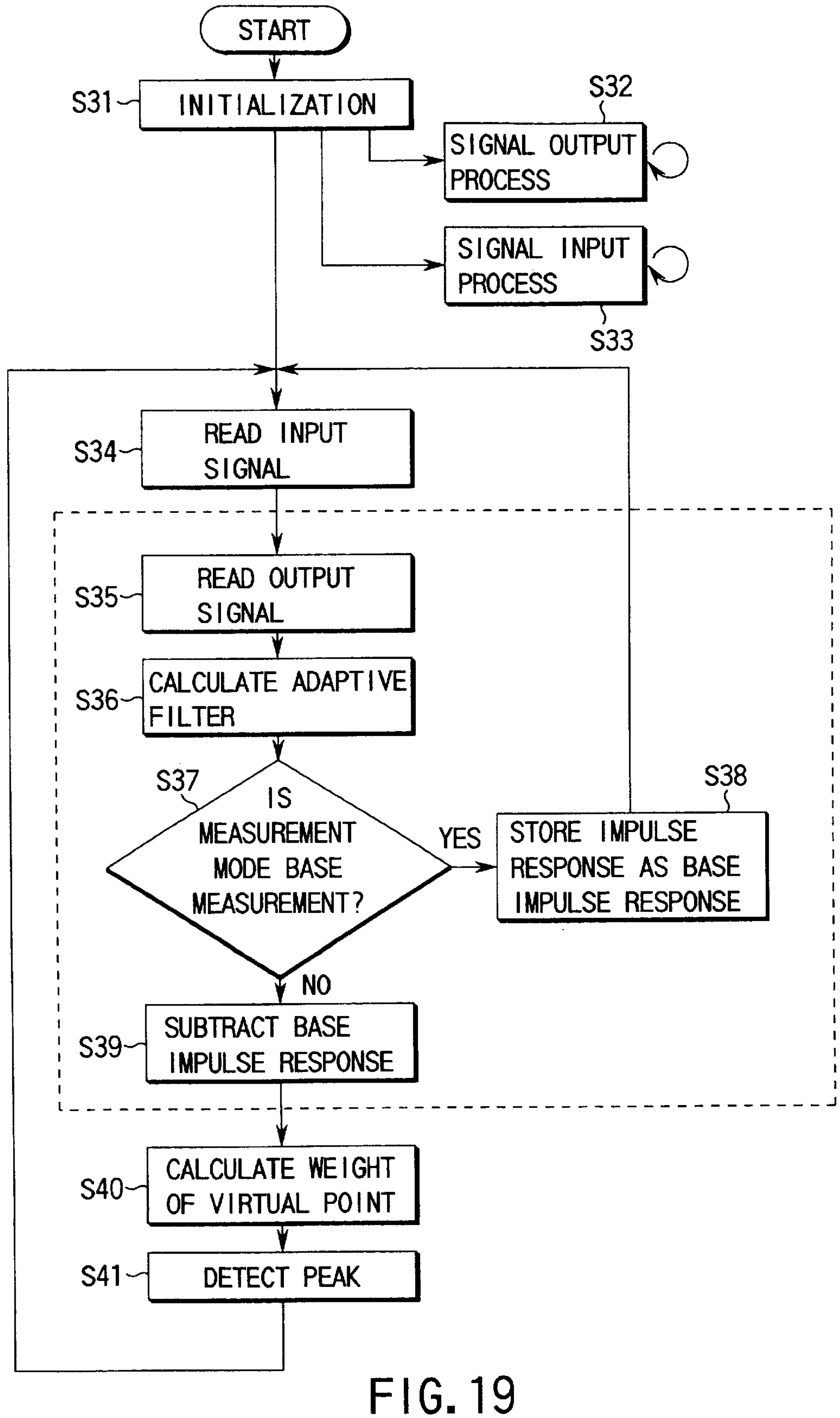
FIG. 19 is a flow chart of a process according to a fifth embodiment of the present invention.

A flow of the process including the process for subtracting the base impulse response and according to this embodiment will now be described with reference to FIG. 19.

The process from the initialization (step S31) to the calculation (step S36) of the impulse response by means of the adaptive filter is the same as that according to the first embodiment. In step S37 whether the measurement mode is the base measurement or the usual measurement is detected. If the mode is the base measurement mode, the impulse response is stored as the base impulse response (step S38). Then, the operation returns to step S34. If the usual measurement is performed, the operation proceeds to step S39. In step S39 the base impulse response is subtracted from the measured impulse response. Then, the process for estimating the object is performed similarly to the first embodiment (steps S40 and S41).

The above-mentioned steps S34 to S41 are repeated until the process is completed.

Thus, the apparatus for estimating the position of an object, according to the fifth embodiment and having the structure formed in such a manner that the components reflected from fixed objects are removed when the impulse response is estimated, is able to estimate the positions of a plurality of mobile objects.

The above-mentioned impulse response calculating process, the weight calculating process and the object position estimating process may be formed into computer programs which can be installed on a storage medium, such as a hard disk, a floppy disk or a CD-ROM which is loaded into an appropriate computer.

According to the first to fifth embodiments, the positions of a plurality of objects can be detected in accordance with impulse responses at a plurality of measuring points. Since a considerably small quantity is required to process for seeking a space needed to estimate the positions of objects, the foregoing structure is suitable to be employed as a real time process. Since the plural signal output means are employed to perform the process, the number of impulse responses for use to estimate objects can be enlarged. As a result, positions of objects can accurately be detected with a small number of sensors.

Sixth to fourteenth embodiments of the present invention will now be described. The sixth to fourteenth embodiments will schematically be described. The sixth to fourteenth embodiments are formed in such a manner that a method in which the position of a human being is detected in accordance with an image; and noise is suppressed by an adaptive microphone array in accordance with the detected position of the human being so as to extract voice employs the following method to cope with a case in which a plurality of positions of human beings are detected.

That is, the sixth embodiment employs a pilot signal method which is one of adaptive filter process methods to determine a filter for suppressing noise. Thus, an input signal, which is a learning signal of the adaptive filter and a desired response signal are artificially generated in accordance with the positions of the plural human beings obtained after the image has been processed. Moreover, control is performed in such a manner that the constant sensitivity for sound waves simultaneously transmitted from the positions of plural human beings is maintained. Thus, background noise is suppressed to enable voices of all speakers to simultaneously be fetched.

Moreover, the same structure is enabled to perform control in such a manner that sound waves transmitted from the position of an object person are detected at a high sensitivity and sound waves transmitted from the positions of the other persons are detected at a low sensitivity so that voice of a specific human being is fetched. As for the pilot signal method, refer to the above-mentioned document (acoustic system and digital processing) or a document (PROC. IEEE Vol. 55, No. 12 (1967), B Widraw: "Adaptive Antenna Systems".

The seventh embodiment has a structure that the filter coefficient for suppressing noise by using the adaptive filter is learned in such a manner that the power of sound waves transmitted from the position of a human being is estimated to determine the amplitude of an input signal to the adaptive filter and the converging speed for the adaptive filter. Thus, the signal generated artificially can accurately be adapted to the actual environment. Therefore, the filter for suppressing noise can accurately be learned.

The eighth embodiment is formed such that the filter coefficient for suppressing noise by using the adaptive filter is learned in such a manner that information indicating speaking motion is extracted from the image of a human being in addition to estimating the power of the sound waves transmitted from the position of the human being. In accordance with the power at each position and information about the speaking motion at each position, the amplitude of an input signal to the adaptive filter and the converging speed for the adaptive filter are determined. Thus, even if intense background noise exists and the accuracy in estimating the transmitted power is unsatisfactory, the filter for suppressing noise can accurately be learned.

The ninth embodiment comprises an input mode switch means for collecting test voices. Thus, data of test voices are input and an adaptive filter process is performed by the pilot signal method in accordance with the level of the input test voices so that the amplitude of learning signal is accurately determined to perform learning of the adaptive filter when the adaptive filter process is performed. As a result, noise can accurately be suppressed.

The tenth embodiment is formed in such a manner that a learning signal of the adaptive filter is generated to maintain a constant sensitivity for detecting sound transmitted from an object person and the sensitivity with respect to each of sounds transmitted from other persons is lowered to learn the filter coefficient. Moreover, the foregoing filter is prepared for each person so that voice from each person is extracted when a plurality of persons have produced sounds.

The eleventh embodiment is structured in such a manner that an adaptive filter process having a constraint condition is employed in place of the adaptive filter process adapted to the pilot signal method so as to determined the coefficient of the adaptive filter under the constraint condition that a constant sensitivity of the microphone array is maintained with respect to the positions of plural human beings obtained by the process of an image. Thus, background noise is suppressed to enable voices of all speakers to be fetched. With the above-mentioned method, the control of adaptation corresponding to the voice period, which is required for the pilot signal method, can be omitted. Thus, the above-mentioned structure can be realized with a small number of elements.

In the foregoing embodiment, the noise suppressing filter is determined under constraint that a constant sensitivity with respect to sounds transmitted from an object human being is maintained and the sensitivity with respect to sounds transmitted from other persons is lowered. As a result, only voice from a specific person can be fetched.

The twelfth embodiment uses the adaptive filter process having the constraint condition according to the eleventh embodiment. The coefficient of the noise suppressing filter is determined under the constraint that a constant sensitivity with respect to sounds transmitted from an object human being is maintained and the sensitivity with respect to sounds transmitted from other persons is lowered. The foregoing filter is prepared for each person so that the sound from each person is fetched when a plurality of persons have produced sounds.

The thirteenth embodiment is formed by combining the adaptive filter processes having the constraint conditions according to the eleventh and twelfth embodiments and the pilot signal method employed in the first to fifth embodiments. Thus, the coefficient of the noise suppressing filter is determined under the constraint that a constant sensitivity with respect to sounds transmitted from an object person is maintained. A learning signal is generated in such a manner that the sensitivity with respect to sounds transmitted from the positions of other persons is lowered. In response to the generated learning signal, the filter coefficient is determined by the adaptive filter having the constraint condition. Thus, deterioration in the noise suppressing performance occurring due to enlargement of the number of constraint conditions can be prevented. Moreover, similar performance can be realized with a small quantity of calculations required to generate the learning signal.

The fourteenth embodiment is formed in such a manner that a plurality of noise suppressing filters according to the thirteenth embodiment are prepared for all of the persons. Thus, sound from each person can be fetched even if a plurality of persons have produced sounds.

Each embodiment will now be described with reference to the drawings.

Figure 20:
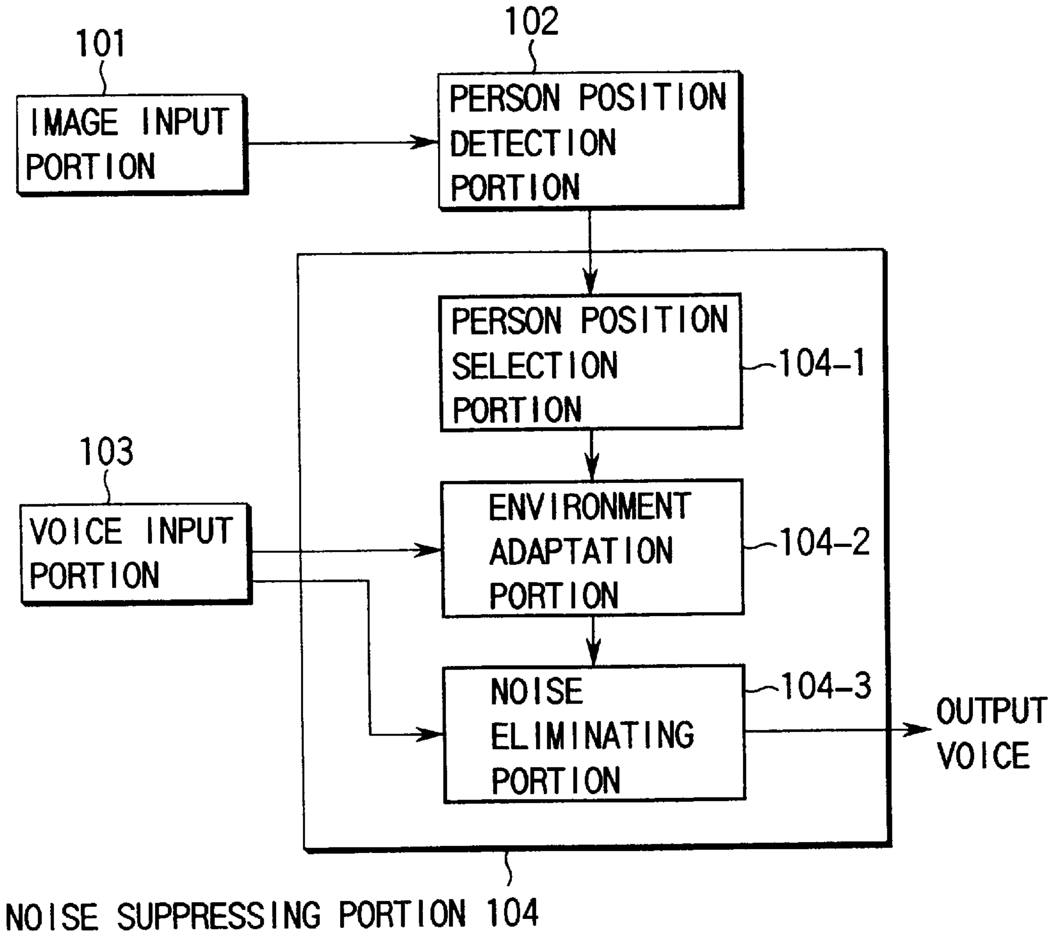
FIG. 20 is a diagram showing the structure of an apparatus for collecting voices according to a sixth embodiment of the present invention.

Referring to FIG. 20, the sixth embodiment will now be described. In this embodiment, a learning signal for the adaptive filter is generated in accordance with the position of a person detected by processing an image so as to perform a noise suppressing process by using the learned filter. Since this embodiment is formed such that control of leaning of the adaptive filter is enabled with respect to the positions of a plurality of persons, the noise suppressing process, which has been performed for one subject, can be performed for a plurality of subjects. Therefore, input of sounds in a case of a conversation or simultaneous sound production can automatically and stably be performed at a satisfactory S/N ratio.

Referring to FIG. 20, reference numeral 101 represents an image input portion, 102 represents a person position detection portion for processing the supplied image so as to detect the position of a person, 103 represents a voice input portion for, in parallel, receiving voices from a plurality of microphones and 104 represents a noise suppressing portion for suppressing noise in the supplied voices obtained from the plural microphones in accordance with the position of a person detected due to the image process so as to fetch voice. The noise suppressing portion 104 has an internal structure comprising a person position selection portion 104-1 for selecting the position of a person which is the subject to be processed from the positions of persons detected by the person position detection portion 102, an environment adaptation portion (a filter coefficient determining means) 104-2 for learning the adaptive filter in accordance with the selected position of the human being and a noise eliminating portion 104-3 for performing a noise suppressing process by using the determined filter coefficient.

In the above-mentioned structure, an image received through the image input portion 101 is supplied to the person position detection portion 102. The person position detection portion 102 detects the direction or the position of a person from the image. The position of an object person is selected from the detected positions of persons by the person position selection portion 104-1. Then, the environment adaptation portion 104-2 generates a learning signal for the adaptive filter in accordance with the selected position of the person so as to determine the coefficient for the adaptive filter. The noise eliminating portion 104-3 uses the determined filter coefficient to subject the supplied voice to a filter process for suppressing noise.

The above-mentioned process will be described further in detail. Initially, detection of the position of a person from an image will be described. The position of a person from an image can be detected by a process for extracting a face region in accordance with template matching. As for the template matching, refer to, for example, "Image Analysis Handbook" (Publish Society of Tokyo University). By employing template matching, the movement of an object in the image can be traced as disclosed in, for example, CV76-7, pp. 49–56 (1992), "Searching and Recognition of Face in a Scene", Kosugi et. al. technical report of Information Processing Society. As can be understood from the disclosed techniques, the coordinates of the same person can be specified and traced at each time. Since the above-mentioned techniques are arranged to treat an image of a small region including the face of a person, also the image can be obtained in addition to the detection of the position of a person.

When one video camera is used to input an image to detect a position of a person in accordance with an image, the direction of the person with respect to the camera can be specified with a satisfactory accuracy. However, the distance and direction between the camera and the person involves great errors. However, a rough relationship between the distance and the direction can be obtained by comparing the size of the image of the person. Although an accurate distance can be measured by using a stereoscopic camera, the rough relationship between the direction of the person and the distance is sufficient for this embodiment. Therefore, a method of extracting the position of a person using one camera may be employed and thus the stereoscopic camera is not required. As a matter of course, the stereoscopic camera or a multiplicity of cameras may be employed. Since the method of detecting the position of a person does not relate to the essential portion of this embodiment, it is omitted from description. As a matter of course, the foregoing technique may be employed.

Figure 21A:
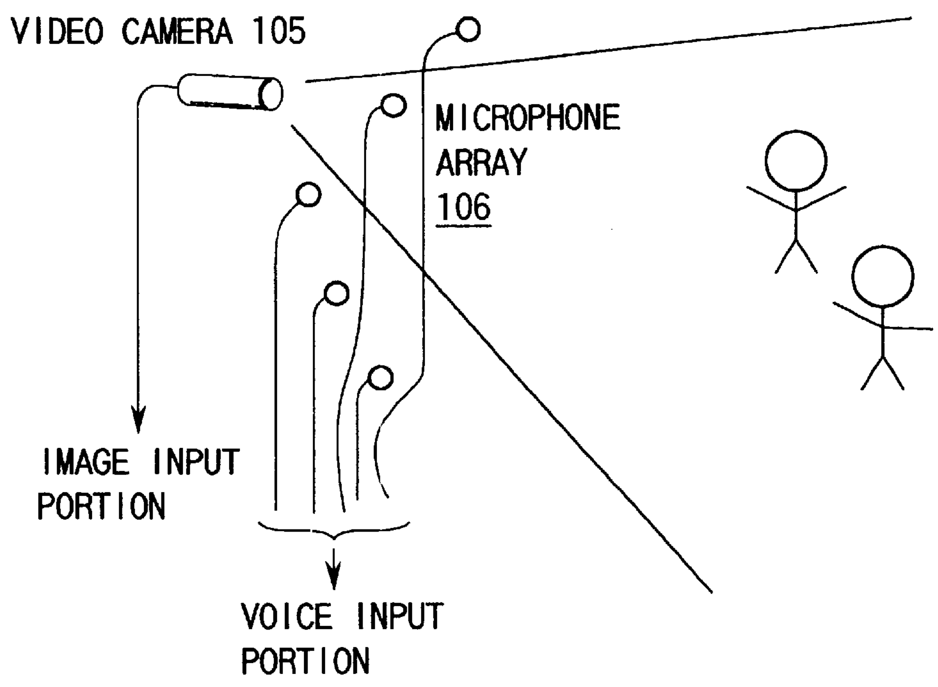
FIGS. 21A and 21B are diagrams each showing the positions of a camera and microphones.

When the process is performed by combining a video camera and microphone, the positions of the video camera and microphone may arbitrarily be determined. If one video camera is employed, it is disposed, for example, as shown in FIG. 21A. It is preferable that the video camera 105 and the microphone array 106 are disposed in such a manner that they are disposed in the same direction when viewed from the person so as to use common azimuth coordinate for the process with the microphone array 106 and that for the video camera 105.

Figure 21B:
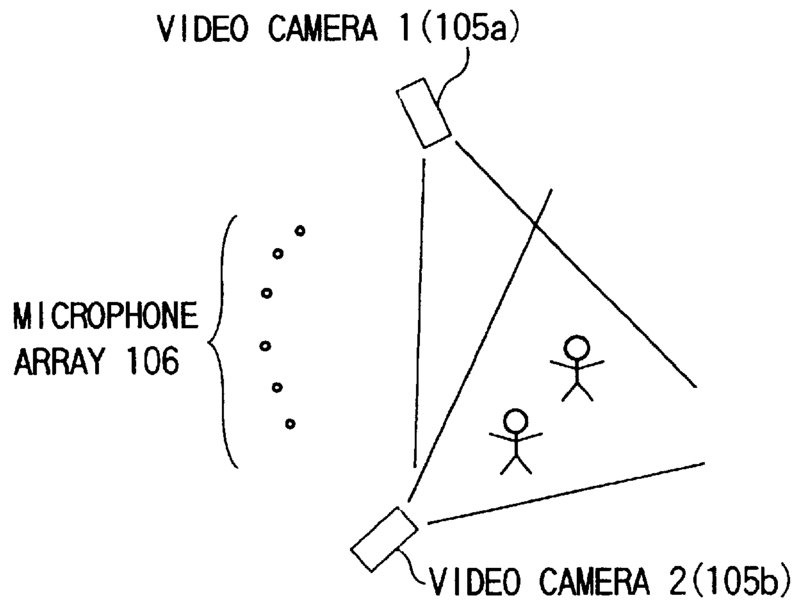

When a plurality of the video cameras 105 are employed as shown in FIG. 21B, the position of a person can be obtained as 3D coordinates. Therefore, the necessity for the positions of the cameras and those of the microphones to be disposed in the same direction when viewed from a user can be removed. When the microphone array process is performed, the coordinates of a person obtained from the video cameras 105 may be converted into an angle when viewed from the microphone array 106.

After the position of the person has been detected due to the foregoing process, the noise suppressing portion 104 causes the person position selection portion 104-1 to previously select the subject position of the person. In accordance with the selected position of the person, the environment adaptation portion 104-2 generates a learning signal for the adaptive filter to supply the learning signal to the adaptive filter so as to determine the filter coefficient. By using the determined filter coefficient, the noise eliminating portion 104-3 subjects voices supplied from the plural microphone to the filter process using the foregoing filter so as to fetch the output voice.

A variety of adaptive filters for suppressing noise by processing voices input through a plurality of microphones have been known as disclosed in, for example, the document "Adaptive Filter Theory", written by Haykin. In this embodiment, the pilot signal method is employed which is capable of relatively easily setting the response of the array with respect to sounds transmitted from a plurality of arbitrary directions or positions.

The detailed structure of the noise suppressing portion 104 will now be described. In the noise suppressing portion 104, the person position selection portion 104-1 selects, from the positions of a plurality of persons, the position of the subject person, the voice of which is subjected to the extraction process. In the selection process, the maximum number of the positions of the selected person is made to be N, for example, N=3. If the number of the positions of persons specified by the person position detection portion 102 is larger than N, N positions are selected from the specified positions of the persons. If the specified number is smaller than N, all of the specified positions are selected. The selection may be performed such that, for example, the distance from the camera to the person is used as a reference to use N positions in the ascending order of the distance. As an alternative to this, the difference in the angle between the central direction of the camera and the direction of the person is used as a reference to use N positions in the ascending order of the difference in the angle.

A value obtained by combining the two references may be employed as a reference. If one camera is employed and thus the distance from the camera to the person cannot easily be measured, the size of the person or the size of the face of the person may be employed as a measure for the distance.

Figure 22:
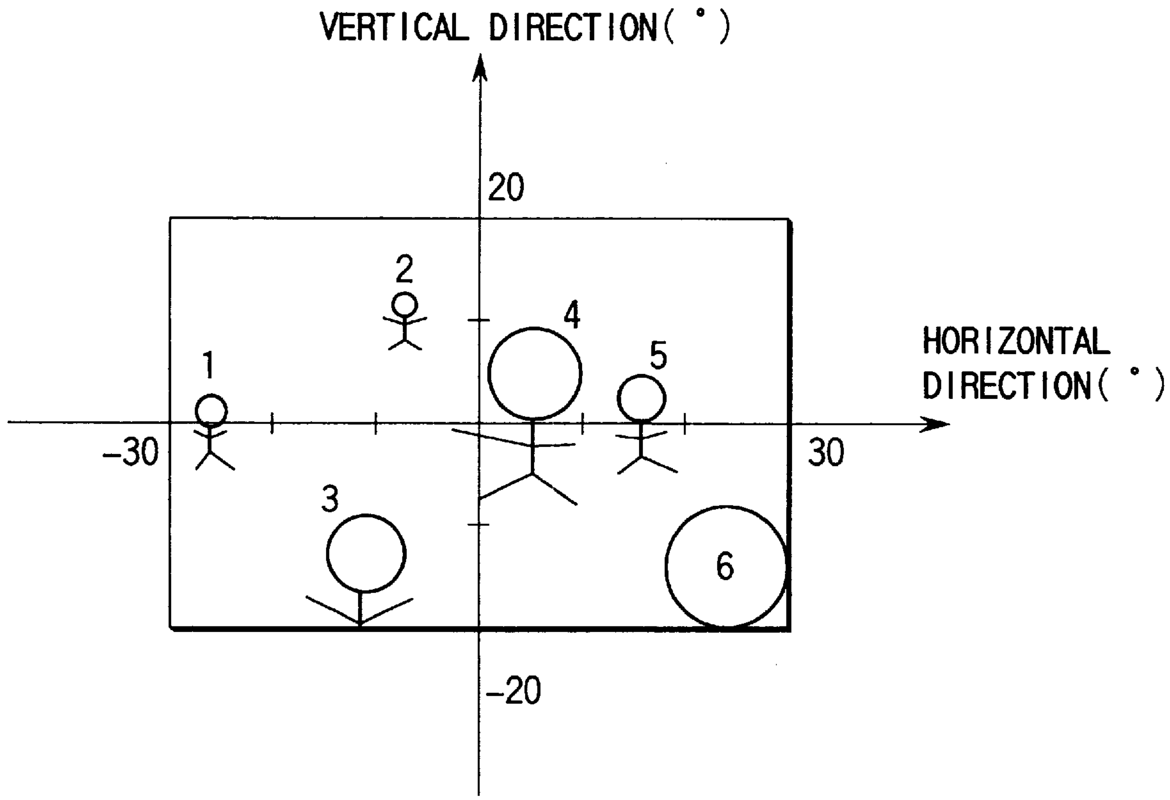
FIG. 22 is a diagram showing an example of data of a person on a screen.

When the direction (X, Y) of the position of a person, the size (A) of the face and the difference (B) in the angle between the central line direction and the direction of the person obtained by calculation performed in accordance with the direction of the person as shown in FIG. 23 from the image data as shown in FIG. 22 have been obtained, a consideration may be performed that the distance to the camera is short in inverse proportion to the area of the face portion. Thus, three persons having person numbers 6, 4 and 3 in the descending order of the area of the face may be selected. As an alternative to this, person numbers 4, 2 and 5 may be selected in the ascending order of the difference in the angle between the direction of the central line of the camera and the direction of the person. Person numbers 4, 3 and 6 may be selected in accordance with a value obtained by combining A and B, for example, the value of A/B.

Figure 24:
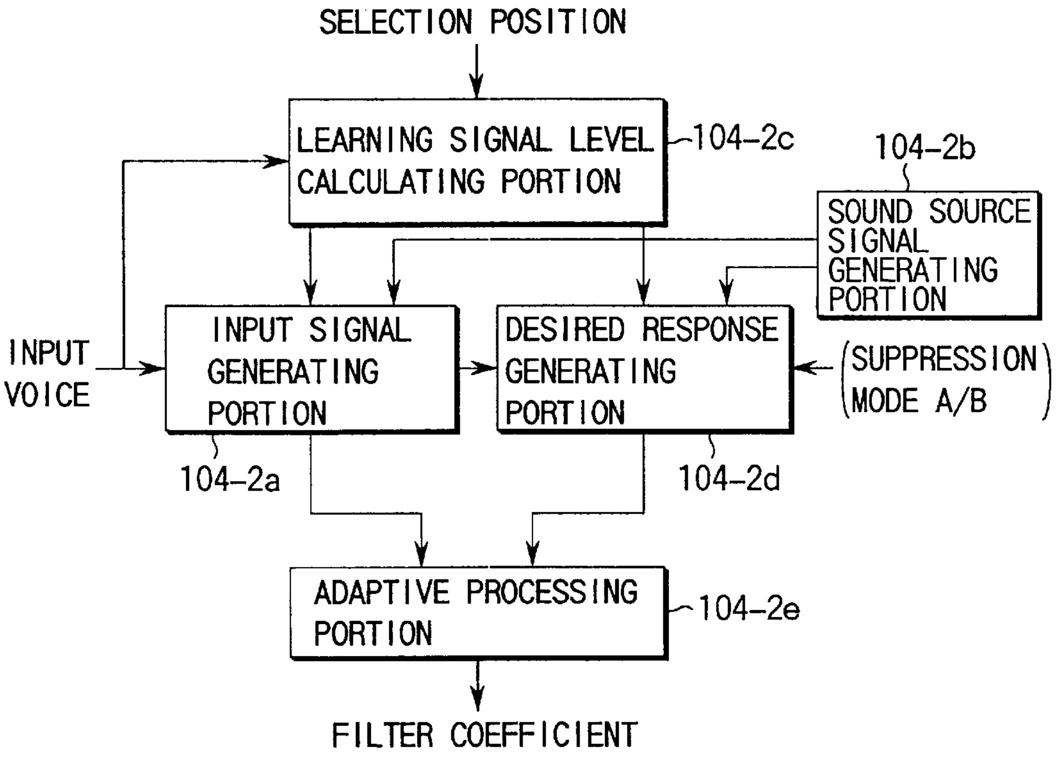
FIG. 24 is a diagram showing the structure of an environment adaptation portion.

Then, the adaptive filter process using the pilot signal method is performed by the environment adaptation portion 104-2 having a structure as shown in FIG. 24. Referring to FIG. 24, reference numeral **104-2*a* represents an input signal generating portion, 104-2*d* represents a desired response generating portion, 104-2*e* represents an adaptive processing portion, 104-2*c* represents a learning signal level calculating portion and 104-2*b*** represents a sound source signal generating portion.

In the above-mentioned structure, initially, the sound source signal generating portion **104-2*b* generates a signal as a result of an assumption that a sound source exists for each of the positions of the selected persons. The learning signal level calculating portion 104-2*c* determines the level of the sound source is when an input signal is generated in accordance with the input voice. Then, the input signal generating portion 104-2*a* uses the obtained level of the learning signal and the sound source signal to generate an input signal for the adaptive filter in accordance with the selected position of the person. Simultaneously, the desired response generating portion 104-2*d* generates desired response for the adaptive filter from the learning signal level and sound source signal to supply the generated input signal and the desired response to the adaptation processing portion 104-2*e***. Thus, the adaptive process for the adaptive filter is performed. The process for the adaptive filter may be performed by the known LMS or RLS method disclosed in the document "Guidance to Adaptive Filter" written by Haykin. The description will be performed about a structure in which the LMS adaptive filter is employed.

Figure 25:
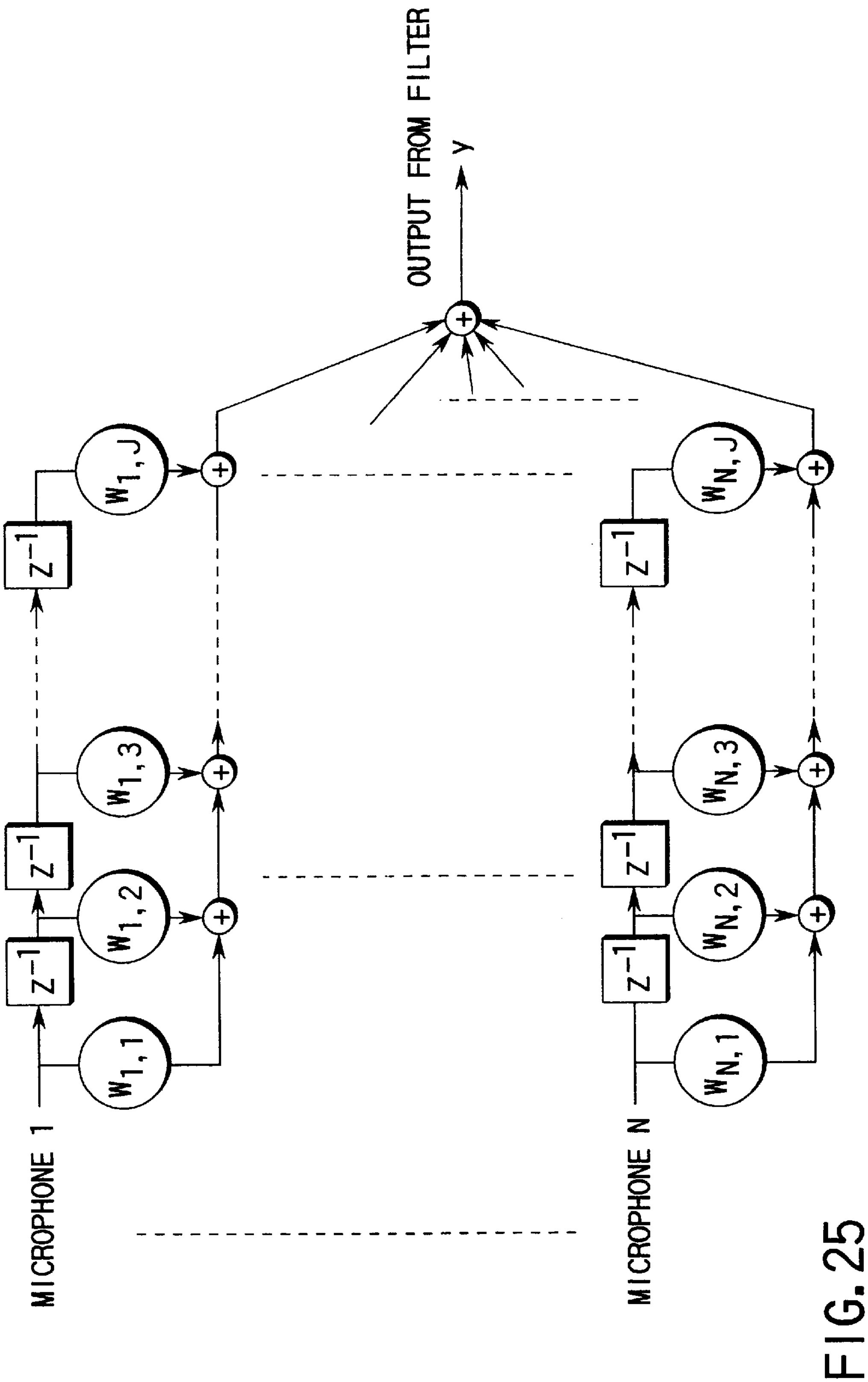
FIG. 25 is a diagram showing the structure of a filter.

The process of the adaptive filter is performed by using a universal filter composed of a filter having a delay line tap as shown in FIG. 25 with respect to each input to a plurality of channels. Referring to FIG. 25, an assumption is made that the number of taps of the filter is J, the filter coefficient of an i-th microphone is $w_{ij}$ ($1 \leqq i \leqq N$, $1 \leqq j \leqq J$). In this case, J is, for example, 200. In this structure, the waveform of the i-th microphone is assumed to be $x_i(n)$. A series $x_i=(x_i(n-J+1), x_i(n-J+2), \ldots, x_i(n-1), x_i(n))$ of a waveform sample of each microphone from J samples before to time n is arranged at time n and expressed by vector as follows:

$$X=(x_1, x_2, \ldots, x_N) \tag{1'}$$

Moreover, filter coefficients $w_{ij}$ of the i-th microphone are arranged and expressed by vector as follows:

$$w_i=(w_{i1}, w_{i2}, \ldots, w_{iJ}) \tag{2'}$$

Then, the filter coefficients are arranged for all of the microphones as follows:

$$W=(w_1, w_2, \ldots, w_J)^T \tag{3'}$$

In accordance with Equations (1') and (3'), the output from the filter is expressed as follows:

$$Y=W^H X \tag{4'}$$

The factor of the filter coefficient W is in the form of a complex number, H is a transposed conjugate of a complex number of the vector and X is generally called a "snap shot".

The adaptation processing portion 104-2*e* for the LMS adaptive filter (Normalized LMS) updates the filter coefficient of the above-mentioned filter structure in accordance with the following equation so that the filter coefficient is learned:

$$W_j=W_{j-1}-a*e*X/2p \tag{5'}$$

where $W_j$ is a filter coefficient after j times of updating operations, e is an error signal $e=d-W^H X$, d is desired response, p is power of the desired response and a is step size which is experimentally determined within a range $0<a<1.0$, for example, 0.1.

The input signal X and desired response d for use to update the filter respectively are generated from the sound source signal by the input signal generating portion 104-2*a* and the desired response generating portion 104-2*d*. Since the foregoing signals are artificially generated, arrangement of the contents of the signals enable the noise eliminating manner. For example, method (A) in which the sensitivity is raised with respect to sound waves transmitted from all of the selected positions of the persons; or (B) in which the sensitivity with respect to the sound wave transmitted from a certain position of a person among the selected positions of persons is raised and the same is lowered with respect to the other positions may be employed.

Hereinafter the two suppressing methods respectively are called suppression modes (A) and (B). The mode (B) is a method in which the sensitivity is previously lowered in a direction in which there is a great possibility that disturbance sound is generated. As compared with the conventional adaptive microphone process in which generated disturbance sound is suppressed to be adapted to the environment, input of voice having a significantly improved quality can be performed. The suppression mode is set by the environment adaptation portion 104-2 when the initialization is performed.

As a step which is performed before the input signal X and the desired response d are generated for use to update the filter, sound source signals, which is a signal series, the number of which is the number of the positions of persons, are generated by the sound source signal generating portion 104-2*b*. The generated sound source signals may have artificial contents, for example, random noise. To make random noise to have no correlation with respect to the positions of persons, the signals must be generated from independent random number series for the respective positions of persons. The frequency characteristic may be filtered to have the same inclination as that of the spectrum of mean voice.

Then, the input signal generating portion 104-2*a* calculates a signal which is observed by a microphone on the assumption that the generated sound source signal propagates in the air and reaches the position of the microphone. The signal which is observed at the position of the microphone can be obtained by performing calculating using the difference in the period of time for which the sound source signal is transmitted and change in the amplitude occurring due to the transmission.

Figure 26A:
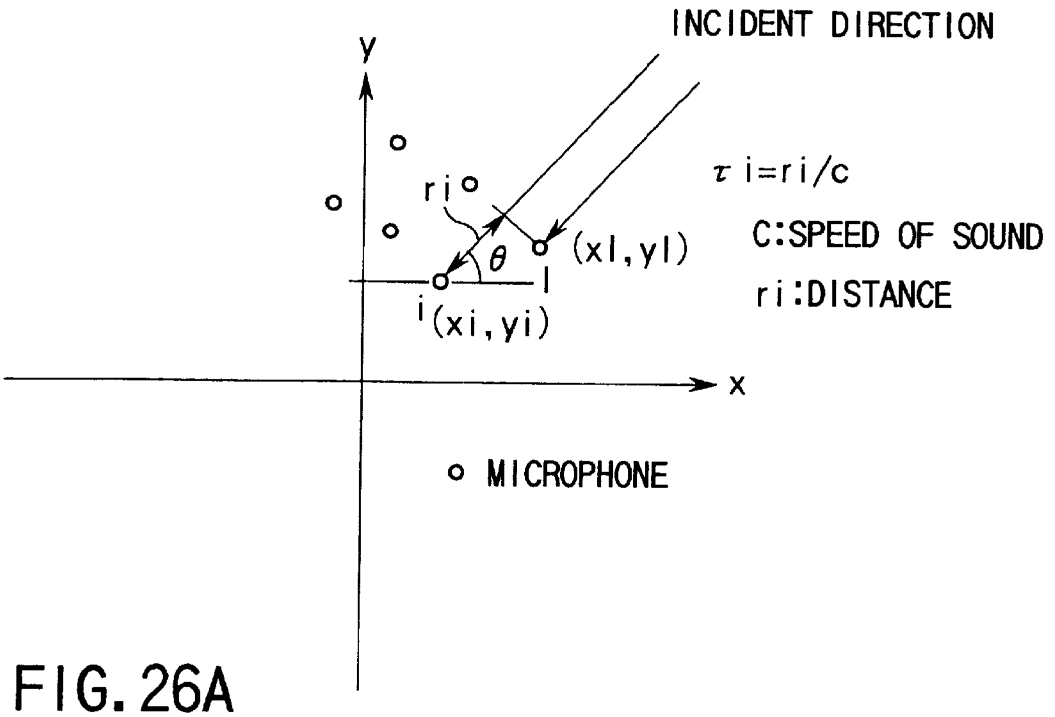
FIGS. 26A and 26B are diagrams showing positions of microphones and a person.

Assuming that the positions of the microphone and a person are located as shown in FIG. 26A, required calculations will now be described with reference to FIG. 26A. Assuming that the coordinates of a first microphone are $(x_1, y_1)$ and those of an i-th microphone are $(x_i, y_i)$, the transmission time difference $\tau_i$ of sound waves which respectively are made incident upon the i-th microphone and the first microphone from direction θ can be expressed as follows under the assumption of plane waves:

$$\tau_i(\theta)=((x_i-x_1)^2+(y_i-y_1)^2)^{1/2}\times\cos(\theta-\tan^{-1}((yi-y1)/(xi-x1))) \tag{6'}$$

The amplitude can be expressed as follows:

$$a_1=a_2= \ldots a_N=1 \tag{7'}$$

Figure 26B:
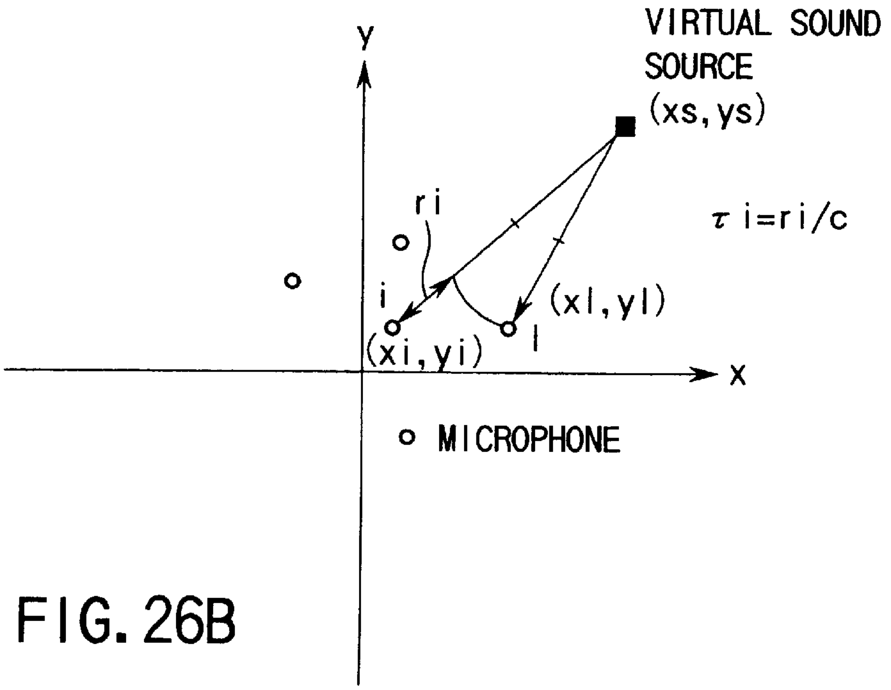

On the assumption of a point sound source and virtual sound source position θ is made to be $(x_s, y_s)$ as shown in FIG. 26B, the time difference is expressed as follows:

$$\tau_i=(((x_i-x_s)^2+(y_i-y_s)^2)^{1/2}-((x_1-x_s)^2+(y_1-y_s)^2)^{1/2})/c \tag{8'}$$

The amplitude is expressed as follows:

$$a_i=((x_i-x_s)^2+(y_i-y_s)^2)^{1/2}/((x_1-x_s)^2+(y_1-y_s)^2)^{1/2} \tag{9'}$$

where c is speed of sound. Although the description has been performed about a space on a 2D plane to simplify the description, development to a 3D space can easily be performed.

By using the thus-obtained delay time $\tau_i$, component $x_i(n)$ transmitted from a k-th person position among the signals observed by the i-th microphone can be expressed as follows when $s_k(n)$ indicates the waveform of sound wave transmitted from a k-th person position or a sound source signal:

$$x_i(n)=S_k(n-\tau_i') \tag{10'}$$

where $\tau_i'$ is a value obtained by rounding $\tau_i$ off. In order to further accurately delay the signal, a digital filter described in the above-mentioned acoustic system and the digital process (refer to pp. 215) may be convoluted in place of performing rounding off. As an alternative to this, conversion to a frequency region may be performed by Fourier transform so as to realize a delay attributable to phase rotation, followed by performing inverse Fourier transform.

Then, the learning signal level calculating portion 104-2*c* determines the level of the sound source signal so as to make the thus-observed level of the sound source signal at the position of the microphone to be the same as the determined level. Then, the signal actually supplied from the microphone and the foregoing sound source signal are added so as to be transmitted as an input signal for the adaptive filter. To calculate the level of the sound source signal, the learning signal level calculating portion 104-2$c$ calculates and stores the mean value of the power of background noise of the input voice in the voice period. The power of the background noise of the input voice is calculated such that the power of the first microphone among the plural microphones is sequentially calculated to detect the voice period; and the mean power in a period omitted from detection as the voice period is obtained. As well known, the detection of a voice period in accordance with the power has been described in, for example, a document "Voice Recognition" written by Niimi.

Then, a level higher than the level of thus-obtained power of the background noise by a predetermined degree v, for example, v=7 dB, is made to be the level of the sound source signal. Then, a value of a square root of the power is made to be the amplitude of the sound source signal. That is, the amplitude is calculated as follows:

$$A_k=(P_N*10^{v/10})^{1/2} \tag{11'}$$

where $A_k$ is the amplitude of the sound source signal and $P_N$ is the power of the background noise.

Then, the desired response generating portion 104-2$d$ generates desired responses by individual methods in accordance with the two suppression modes (A) and (B). When mode (A) is employed in which sound waves transmitted from all of the selected person positions are collected, the process is arranged in such a manner that the signal observed at the position of the microphone is transmitted as the desired response on the assumption that sound waves are transmitted from all of the selected person positions. In this case, a signal observed at the position of the first microphone is used as the desired response. Note that the response is delayed as compared with a signal observed at the position of the microphone. The degree of the delay is made to be, for example, half of the number of the taps.

In a case where mode (B) is employed in which the sound wave transmitted from a certain person position among the selected person positions is suppressed, a signal corresponding to the sound wave transmitted from the person position is not added when the observed signal at the position of the microphone is generated on the assumption that the sound wave is transmitted from the person position. If three person positions are selected and a person portion required to be input is included in the three person positions, an assumption is made that only transmission from the one person position required to be input is performed. Thus, the signal observed with the microphone is made to be the desired response.

The process for the continuous signals including the voice which are performed by the noise eliminating portion 104 comprising the environment adaptation portion 104-2 is performed in block units such that 1,024 points per one channel is considered to be one block. That is, reading of voice data performed by the voice input portion 103, generation of the sound source signal, that of the learning signal, the adaptive filter process and the noise eliminating process which are performed by the environment adaptation portion 104-2 are performed in block units such that 1,024 points per one channel is considered to be one block.

Figure 27:
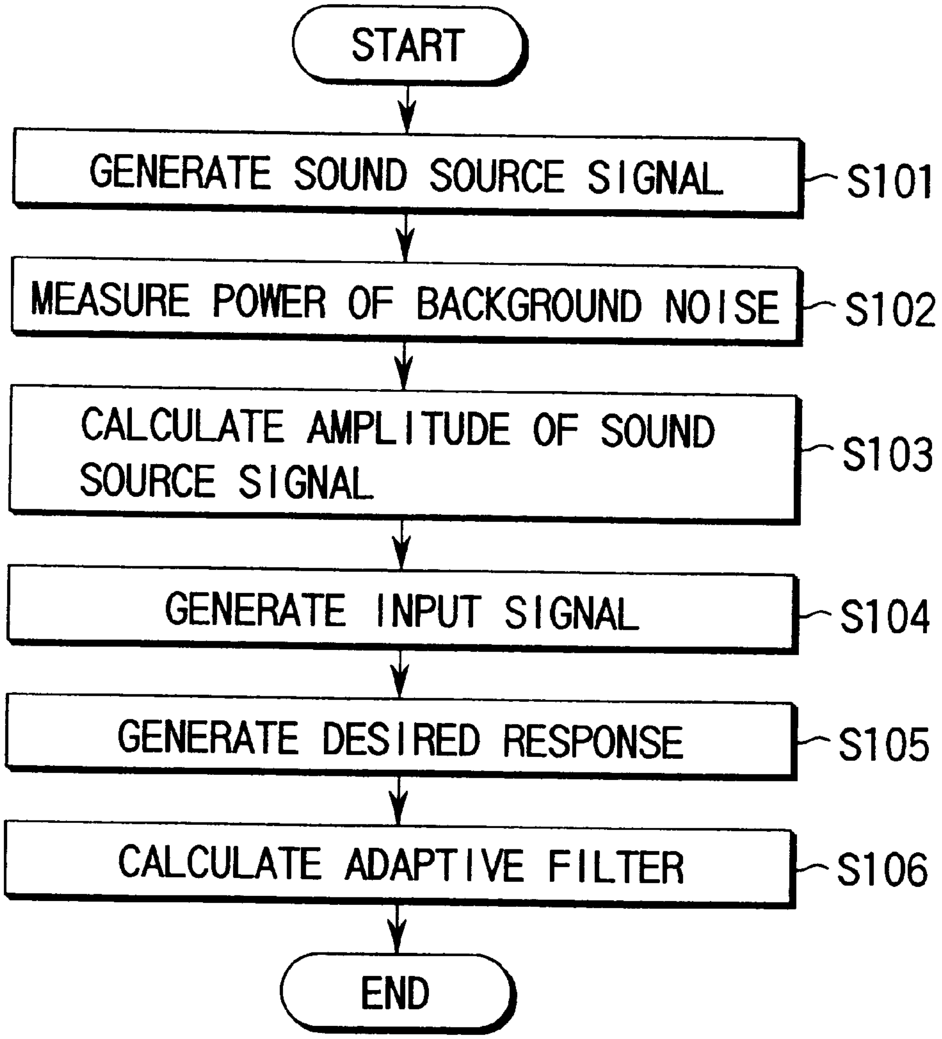
FIG. 27 is a flow chart of a process in the environment adaptation portion.

A flow of a process which is performed by the environment adaptation portion 104-2 will now be described with reference to FIG. 27.

In the sound source signal generating portion 104-2$b$ of the environment adaptation portion 104-2, a series of sound source signals are generated by the number corresponding to the number of the selected person positions (step S101). The sound source signals are formed into a series having no correlation with the sound sources. Moreover, dispersion is normalized to 1. Then, the learning signal level calculating portion 104-2$c$ calculates the power of a signal in, for example, a first channel among input voices input to plural channels for 128 small waveform segments, for example. Then, voice detection is performed to determine voice portions and non-voice portions. Then, the mean power of the non-voice portions is obtained, the mean power being made to be power $P_N$ of the background noise (step S102). The power of the background noise may be averaged with the previously obtained values. In this case, the averaging operation is performed by using the following equation:

$$P_N=\gamma*P_N+(1-\gamma)P_N' \tag{12'}$$

where $P_N'$ is the previous obtained power of background noise and $\gamma$ is a forgetting coefficient, for example, $\gamma$=0.1.

Then, the learning signal level calculating portion 104-2$c$ calculates a signal on the assumption that the sound source signal is transmitted and observed at the position of the microphone. In accordance with the Equation (1140 ), the learning signal level calculating portion 104-2$c$ calculates amplitude $A_k$ of the sound source signal (step S103). Then, the input signal generating portion 104-2$a$ adds the calculated signal to an actually input voice so as to generated an input signal for the adaptive filter. That is, assuming that input voice to the i-th channel is $r_i$(n), input signal $x_i$(n) of the i-th channel adaptive filter if calculated in accordance with the following equation (step S104):

$$x_i(n)=r_i(n)+\Sigma A_k S_k(n-\tau_k') \tag{13'}$$

Then, the desired response generating portion 104-2$d$ generates desired response in accordance with the sound source signal and the amplitude of the sound source signal by using the following equation:

$$d(n)=\Sigma A_k S_k(n-\tau_k'-n_0) \tag{14'}$$

where no is adequate delay, for example, $n_0$=10. When suppression mode A is employed, k is changed for all of the person positions. When mode B is employed, k is changed for the person position, the sensitivity of which is required to be raised. As shown in Equations (12') and (13'), in place of realizing the delay with the value $\tau_k'$ obtained by rounding off the delay of the sound source signal with the sampling period, the delay can be realized more accurately as described above (step S105).

Then, the generated input signal and the desired response are supplied to the adaptive filter so as to obtain a filter coefficient (step S106). The obtained filter is transmitted to the noise eliminating portion 104-3 in which the input voice is processed so as to extract the voice. The filter process, which is performed by the noise eliminating portion 104-3 is performed in accordance with Equation (4').

Figure 28:
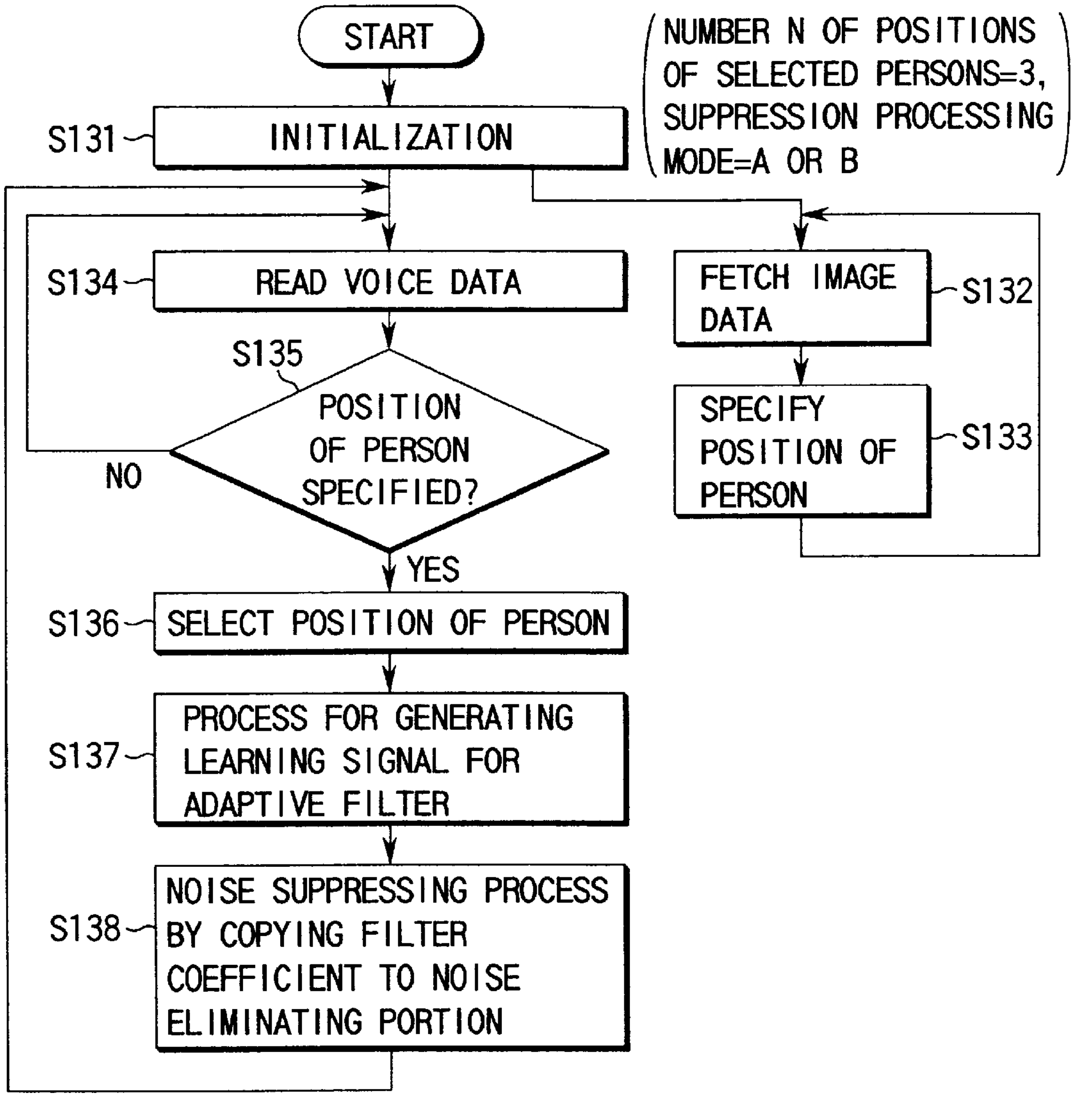
FIG. 28 is a flow chart of a process according to a sixth embodiment of the present invention.

Referring to FIG. 28, a flow of the process according to this embodiment will now be described.

Initially, initialization is performed, and then number N of the selected person portions and whether the noise suppression mode is A or B are determined (step S131).

On the other hand, the image process is performed such that image data is fetched from the video camera 5 at a rate of five frames per second (step S132) so as to specify and output a person for each frame (step S133). The foregoing processes in steps S132 and S133 are repeated. The process for specifying the person position from the image is performed independently and in parallel to the processes for suppressing noise in the voice.

The voice process is performed such that voice data is A/D-converted at a sampling period of, for example, 12 kHz so that data for one block is fetched by making, for example, 1,024 samples per one channel to be made one block (step S134). Then, whether or not the person position has been specified is determined (step S135). If the person position is not specified, no operation is performed, and the processes in steps S134 and S135 are performed. If the person position is specified, the process in step S136 is performed. The person portion cannot be specified in a case where a result of an image process has not been obtained immediately after start of the process or no person exists. Since the process of the position image and the process of the voice are performed independently, data of person portion can be communicated by known communication between processes using a socket or a shared memory or a file in a case where all of the processes are performed by one computer.

In step S136, the person position selection portion 104-1 selected the position of a subject person. Then, the environment adapting portion 104-2 uses the position of the person selected by the person position selection portion 104-1 or the direction and the distance to generate a learning signal for the adaptive filter so as to update the filter coefficient (step S137). The length of the learning signal is made to be 1,024 points per channel similarly the length of fetched voice data.

In step S137 the updated filter coefficient is copied to the noise eliminating portion 104-3 so that a convolution operation of the filter and the input voice is performed to output the voice (step S138).

The foregoing processes in steps S131 and S132 and those in steps S133 to S138 are performed in parallel.

As a result, the coefficients of the filters for performing the noise suppressing process are learned to enable the sensitivity of each of voices transmitted from respective person portions specified due to the image process. Therefore, if a plurality of persons simultaneously produce voices, voices of all of the persons can be fetched by suppressing background noise or voice of only one person can be fetched such that voices of other persons are suppressed.

Since the person portions are sequentially specified and the learning signals for the filter process are generated to correspond to the person positions, the noise suppressing process can be performed to follow the persons even if the plural persons respectively are moved.

The seventh embodiment of the present invention will now be described. The second embodiment is structured such that voice from each of person selected as the subjects for the voice process is detected. In accordance with information about the result of detection, generation of the learning signal is controlled to perform leaning accurately.

Figure 29:
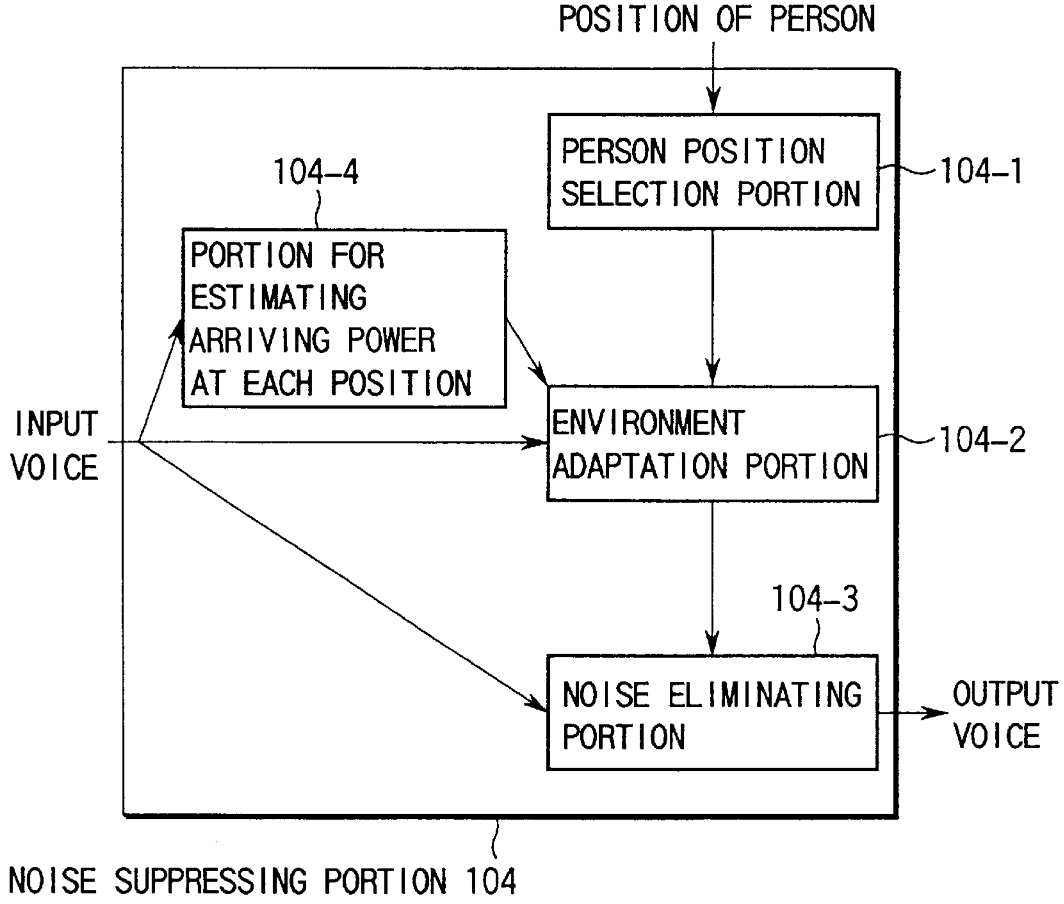
FIG. 29 is a diagram showing the structure of a noise suppressing portion according to a seventh embodiment of the present invention.

In the process for learning of the adaptive filter by the pilot signal method, as described the sixth embodiment, is arranged such that learning is performed regardless of a fact whether or not the person is speaking. The adaptation is inhibited during a period in which a person required to be input at a high sensitivity is speaking, or the sound source signal on the assumption that it is transmitted from the direction of a person required to be suppressed is not used to generate an input signal and a desired signal. Thus, accurate leaning of noise suppression further adaptable to the environment can be performed. Therefore, the structure according to this embodiment further comprises a portion 104-4 for estimating arriving power for each position such that transmitted power for each position which is a scale for a fact whether or not the person is speaking, is estimated. The overall structure including the portion 104-4 for estimating transmitted power for each position is shown in FIG. 29. Referring to FIG. 29, reference numeral 104-1 represents the person position selection portion, 104-2 represents the environment adaptation portion and 104-3 represents the noise eliminating portion.

Figure 30:
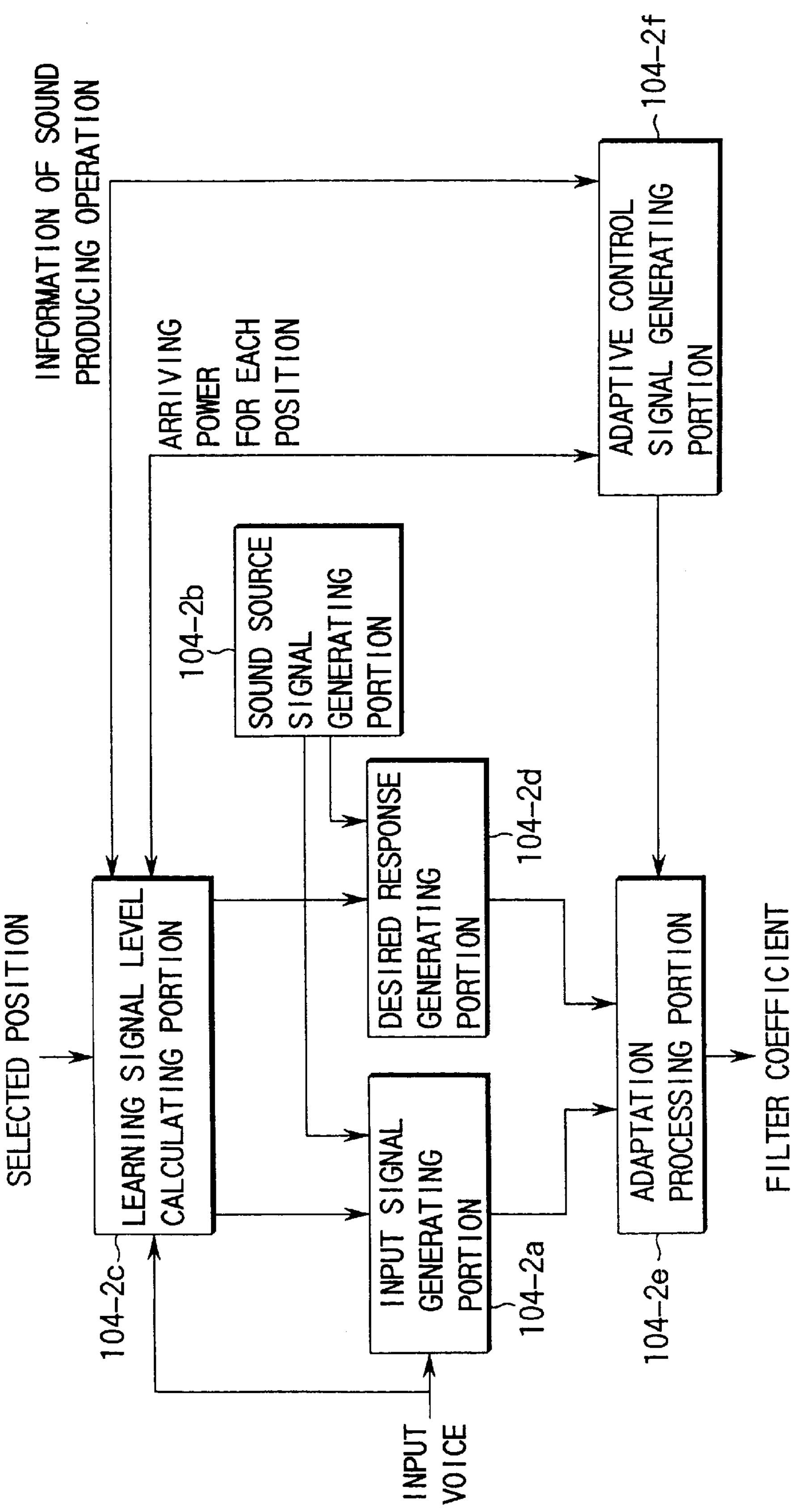
FIG. 30 is a diagram showing the structure of the environment adaptation portion.

To control learning of the filter in accordance with the estimated transmitted power for each position, the environment adaptation portion 104-2 has a structure formed as shown in FIG. 30. Referring to FIG. 30, reference numeral 104-2*a* represents the input signal generating portion for the adaptive filter, 104-2*d* represents the desired response generating portion for the adaptive filter, 104-2*e* represents the adaptation processing portion by the adaptive filter, 104-2*b* represents the sound source signal generating portion for generating a sound source signal which is an artificial waveform for use to generate the input signal and the desired response, 104-2*c* represents the learning signal level calculating portion for determining the amplitude of the sound source signal for each person portion in accordance with the power arriving from each position when the input signal and the desired response are generated, and 104-2*f* represents a adaptation control signal control portion 104-2*f* for determining a parameter for controlling the adaptation speed of the learning of the filter in accordance with the transmitted power from each position.

The portion 104-4 for estimating arriving power for each position detects the power transmitted from each person position in accordance with the voice supplied to the microphone array 106. As a method for calculating the power transmitted from each portion of from each direction by the microphone array 106, a variety of methods may be employed which include a delay sum method, a minimum dispersion method and the MUSIC method as disclosed in the document "Acoustic System and Digital Processing". In this embodiment, the delay sum method is employed which is able to obtain the power with a small quantity of calculations. Note that the other methods may, of course, be employed though the quantity of calculations are somewhat enlarged.

As described in the foregoing document, the delay sum method is a method in which the signals from a plurality of microphone are delayed in such a manner that the phases of the sound waves transmitted from the subject directions positions and then the sum of the signals are calculated. In the case where the microphones and transmission positions are located as shown in FIG. 21, the difference $\tau_i$ in the transmission time between sound wave made incident on an i-th microphone and that made incident on a first microphone can be obtained in accordance with Equation (6') in the case where plane wave is made incident as described above. In the case where spherical wave is made incident as described above, it can be obtained in accordance with Equation (8). Assuming that the waveform of the i-th microphone is xi(n) and the series $x_i(x_i(n-J+1), x_i(n-J+2), \ldots, x_i(n-1), x_i(n))$ of waveform samples of the respective microphones at time n in a period from J samples before to time n is delayed by $\tau_i$, mean power for all of the microphone is expressed as follows:

$$p=|\Sigma x_i(n-\tau_i)|^2/M \quad (15')$$

The obtained value has been known to be in proportion to the power of the sound source if the sound wave is transmitted from the subject direction or position.

Therefore, the power transmitted from each person position can be estimated by using Equation (15'). In a case of spherical wave, a correction coefficient is required in accordance with the distance from the sound source to the microphone. The correction can easily be performed. As for details, refer to a document (magazine of Japan Acoustics Society, 47, 4, pp. 268–273, 1991).

The learning signal level calculating portion 104-2*c* will now be described which determines the amplitude of the sound source signal from each person portion for use to generate the input signal and the desired response for the adaptive filter. To determine the amplitude, the learning signal level calculating portion 104-2*c* calculates and stores the mean value of the power of background noise of the input voice and the power transmitted from each position in the voice period. The power of the background noise of the input voice is calculated such that the power of the first microphone among the plural microphones is sequentially calculated to detect the voice period; and the mean power in a period omitted from detection as the voice period is obtained. As well known, the detection of a voice period in accordance with the power has been described in, for example, a document "Voice Recognition" written by Niimi. As for the power transmitted from each position, a similar detection for voice period for each position is performed so that mean power in the voice period is obtained.

In accordance with the thus obtained transmitted power from each position and power of background noise, the amplitude of the sound source signal is calculated. At this time, the method of calculating the amplitude is changed in accordance with a fact whether the person position is the sensitive position or a low sensitivity position.

If the sensitivity of the position has been raised, a value of a square root of the mean value of the transmitted power from each position is made to be the amplitude of the sound source signal. If no sound is produced, the power from each position has a small value. Therefore, only when the power transmitted from each position is larger than the background noise by a certain value v, for example, v=7 dB, the amplitude is set to the value of the square root of the power transmitted from each position. That is, assuming that $A_k$ is the amplitude of the sound source signal at a k-th position, it is calculated as follows:

$$A_k=(P_N*10^{v/10})^{1/2} \quad (16')$$

Note that the foregoing equation is employed when the power transmitted from each position is smaller than the sum of the background noise and vdB.

$$A_k=A_{ko}=(P_k)^{1/2} \quad (17')$$

Note that the foregoing equation is employed when the power transmitted from each position is larger than the sum of the background noise and 7 dB. In the above-mentioned equations, $P_N$ is the power of background noise and $P_k$ is the power transmitted at the k-th position.

If the sensitivity of the position is lowered, the amplitude is reduced in inverse proportion to the power transmitted from each position. The amplitude of the sound source signal from, for example, a k-th position is calculated in accordance with the following equation:

$$A_k=A_{ko}*(P_N/P_k) \quad (18')$$

The thus-obtained amplitude of the sound source and the input voice are added to each other so that a input signal for the adaptive filter is generated.

An assumption is made that person positions a and b are selected, a is the object person position, the voice of which is required to be input and thus the sensitivity of which is raised, and b is the position of disturbance sound, the sensitivity of which must be lowered. When the arriving power at each of positions a and b has been estimated as shown in FIGS. 31A and 31B, the component of the input signal relating to a in the periods respectively indicated by 1 and 2 is enlarged as shown in FIG. 31C. In the period indicated by 3, the component relating to b is reduced, as shown in FIG. 31D. The desired response is made to be the same as the component of the input signal relating to a. On the other hand, all of components relating to b are made to be 0 or they are not added.

The control of the adapting speed of the adaptive filter in accordance with the power transmitted from each position will now be described. As well known, learning of the adaptive filter can be controlled with value a of the step S size in Equation (5'). If the power transmitted from the position, which is the subject from which voice is input, is large, a signal to be extracted is not included in the desired response though it is included in the input signal. Therefore, it is suppressed. Accordingly, if the value of the transmitted power is large, the adaptation is performed slowly or interrupted. If the value is small, the adapting speed is raised.

Accordingly, the value of the step size (which is a in Equation (5')) fixed in, for example, Equation (a in Equation (5')) is sequentially calculated in accordance with the following equation to make the value to be variable:

$$a=C/(\alpha_B p_k/p_N+1) \text{ (when suppression mode B)} \quad (19')$$

$$a=C/(\alpha_A\Sigma(p_k/p_N)/M+1) \text{ (When suppression mode A)} \quad (20')$$

where $P_N$ is the power of background noise, $P_k$ is the power transmitted from a k-th position, $C\alpha_A$ and $\alpha_B$ are constants, for example, C=2.0, $\alpha_A=\alpha_B=1$. The equations for obtaining the step size are examples and other methods may be employed.

Figure 32:
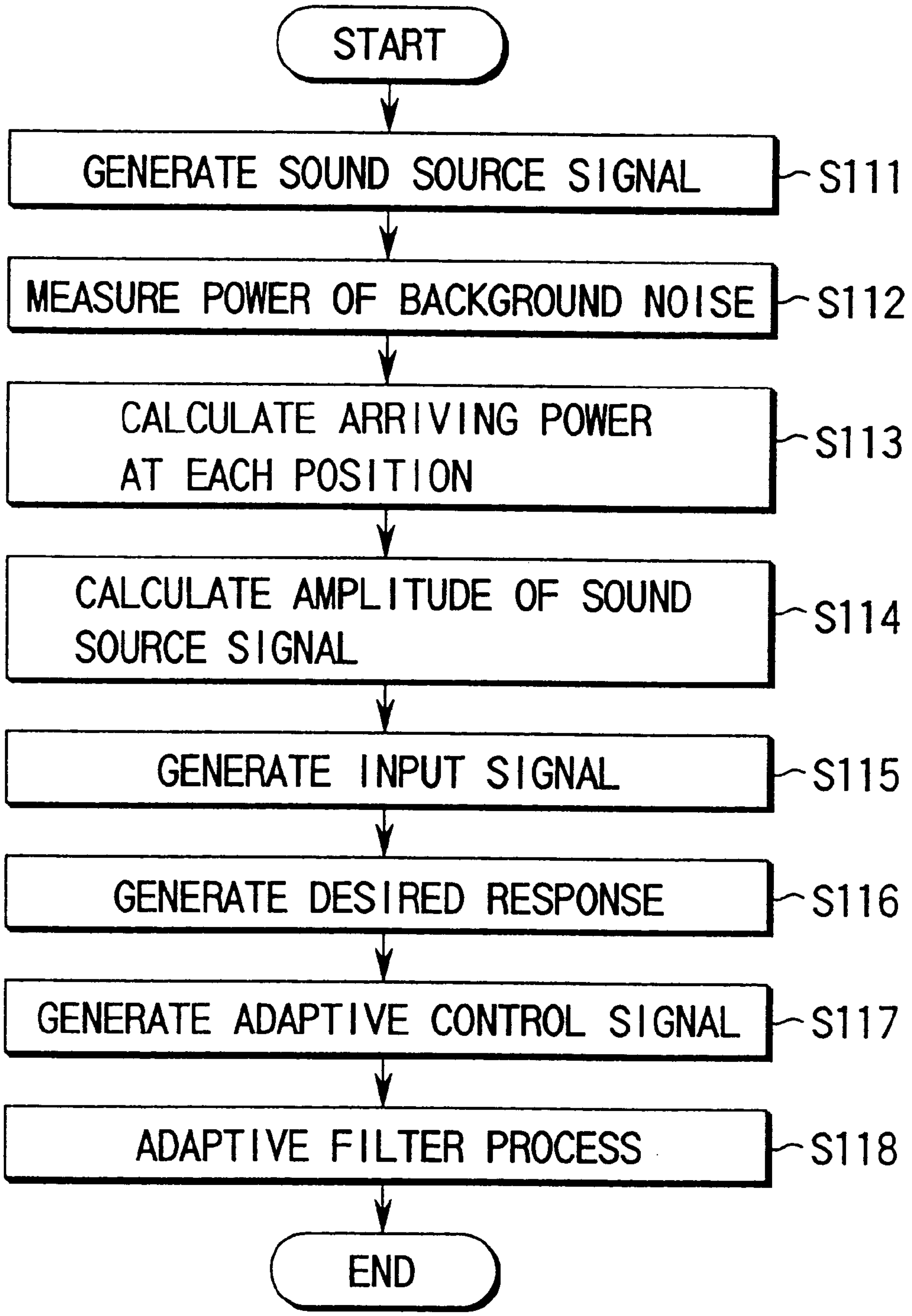
FIG. 32 is a flow chart of a process in the environment adaptation portion.

Referring to FIG. 32, a flow of the process of the environment adaptation portion according to the second embodiment will now be described.

Initially, the sound source signal generating portion 104-2*b* of the environment adaptation portion 104-2 generates a series of sound source signals by the number which is the number of the selected person positions (step S111).

Then, the learning signal level calculating portion 104-2*c* calculates the power of input voices received by the plural channels, and then detects voice so as to determine voice portions and non-voice portions. Thus, power $P_N$ of background noise is obtained from the mean power in the non-voice portions (step S112). At this time, averaging may be performed in accordance with Equation (12'). Then, the power arriving from each position is calculated from the input voices to the plural channels in accordance with Equation (15') (step S113).

Then, the learning signal level calculating portion 104-2*c* calculates the amplitude $A_K$ of the sound source signal in accordance with Equations (16') to (18') (step S114). Then, the input signal generating portion 104-2*a* performs addition to actual input voice in accordance with Equation (13') so that an input signal for the adaptive filter is generated (step S115).

Then, the desired response generating portion 104-2*d* generates desired response from the sound source signal and the amplitude of the sound source signal in accordance with Equation (14')(step S116). Then, the adaptation control signal generating portion 104-2*f* generates adaptive control signal series from the power of background noise and power transmitted from each other in accordance with Equations (19') and (20') (step S117).

Then, the generated input signal, the desired response and the adaptive control signal are supplied to the adaptive filter so that a filter coefficient is obtained (step S118). The obtained filter is transmitted to the noise eliminating portion 104-3 so that the input voice and the filter are convoluted to extract voice. The filter process is performed by the noise eliminating portion 104-3 in accordance with Equation (4').

Since the overall flow of the seventh embodiment is the same as that according to the sixth embodiment, it is omitted from description.

As described, the sensitivity is, by the adaptive filter, set for the voice transmitted from each of a plurality of person positions specified due to the image process in such a manner that the adaptive process of the adaptive filter is controlled to correspond to the power of the transmitted sound from the person position. Therefore, accurate adaptation corresponding to the actual environment can be performed. Although the noise suppression performance can be considerably improved, voices of all of persons can be fetched by suppressing background noise if the plurality persons simultaneous produce sounds or only the voice of one person can be fetched by suppressing voices from other persons.

Since the person position is sequentially specified in accordance with the image and the learning signal for the filter process is generated to correspond to the person position, the noise suppression process can be performed to follow a plurality of moving persons.

An eighth embodiment for detecting a speaking operation by detecting the power of the voice and in accordance with an image will now be described. The eighth embodiment is structured such that a speaking operation is detected in accordance with image data in addition to the estimation of the power transmitted from each person position according to the second embodiment. In accordance with two information items, generation of the learning signal and the adapting speed are controlled so that learning of the adaptive filter is performed to further accurately reflect the sound environment. Since the speaking operation is, in this embodiment, detected in accordance with an image, whether or not a person is speaking can accurately be detected even in loud noise environment. As a result, accurate control of learning of the adaptive filter can be performed.

Figure 33:
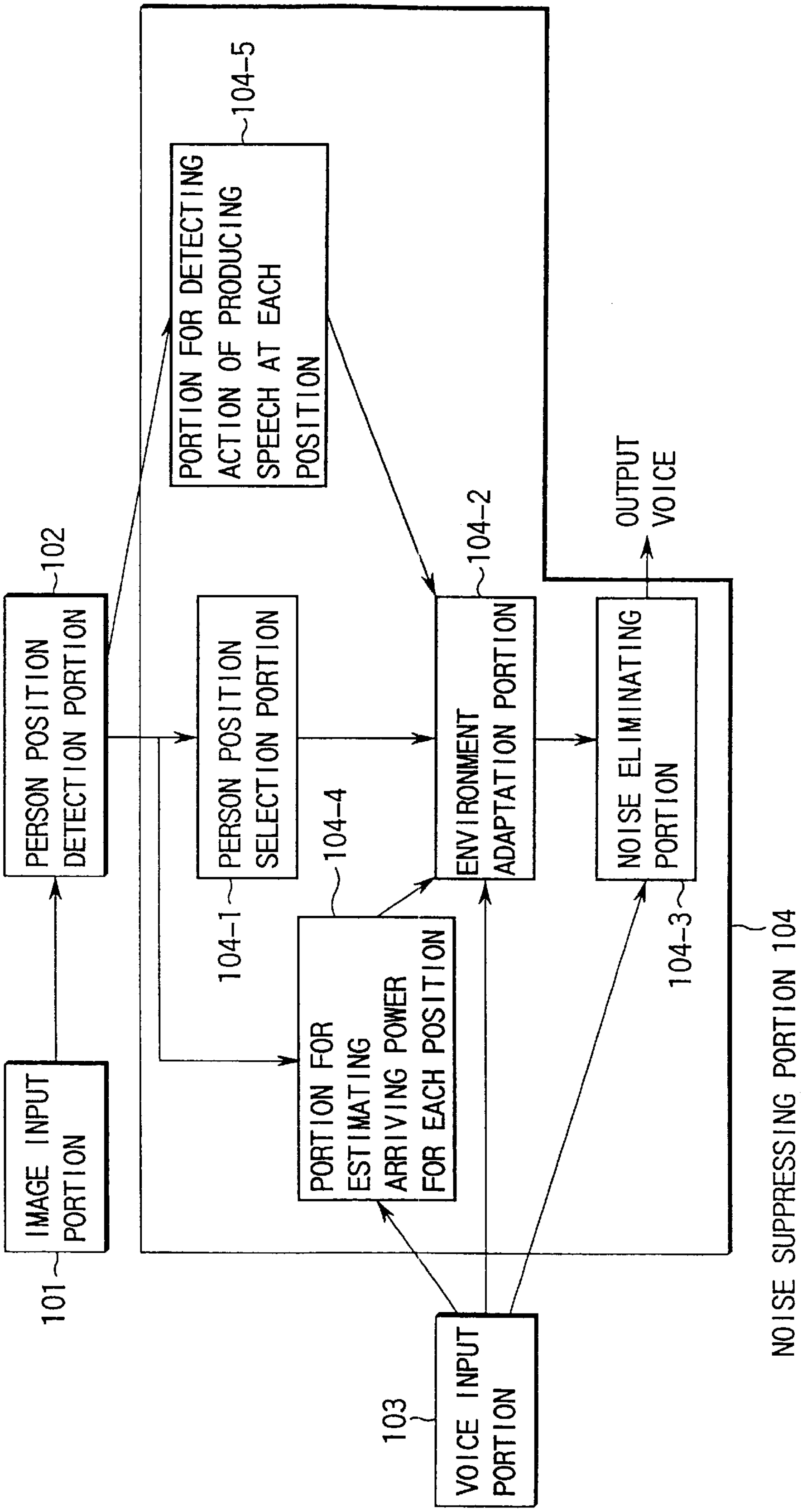
FIG. 33 is a diagram showing the overall structure of an eighth embodiment of the present invention.

To control learning of the adaptive filter by detecting the speaking operation in accordance with the image and in accordance with the power transmitted from each position, the noise suppressing portion according to this embodiment has a structure in which a portion for detecting information of a speaking operation for detecting information about a speaking operation from an image is added to the structure of the noise suppressing portion according to the second embodiment, as shown in FIG. 33.

Referring to FIG. 33, reference numeral 101 represents an image input portion for receiving an image from a video camera or the like, 102 represents a person position detection portion for specifying the position of a person by processing the supplied image, 103 represents a voice input portion for, in parallel, receiving voices from a plurality of microphones and 104 represents a noise eliminating portion for suppressing noise from input voices from the plural microphones in accordance with a person position detected as a result of the image process so as to fetch voice.

The noise eliminating portion 104 comprises a person position selection portion 104-1 for selecting a person position which is a subject to be processed from person positions specified by the person position detection portion 102, a environment adaptation portion 104-2 for performing learning of the adaptive filter in accordance with the selected person position, a noise eliminating portion 104-3 for performing a noise suppressing process by using the determined filter coefficient, a portion 104-4 for estimating arriving power for each position for detecting the transmitted power for each person position and a portion 104-5 for detecting action of producing speech for each position.

A method of detecting voice periods in accordance with an image has been known in which change in the image of a mouth portion occurring as time elapses is used. As a simple method, change in the brightness of the overall image of the mouth portion is calculated at each time to determine time at which the brightness has been changed considerably to be a voice period. In place of the accurate image of the mouth portion, the overall change in the brightness of, for example, a lower half portion of an image including the face of the person specified by the person position detection portion 102 as time elapses is detected to use it as the scale of the speaking operation. Assuming that the number of the frame of image data is i and image data of face portion including the face of a person at vertical and horizontal positions x and y is G (i, x, y), change in the brightness between frames i and i−1 can be obtained in accordance with the following equation:

$$K(i)=\sum_{x}\sum_{y}|G(i,x,y)-G(i-1,x,y)|^2 \qquad (20\text{-}1')$$

The value of K(i) is used as the scale for detecting whether or not a speaking operation is being performed. The image including the face of a person is supplied through the person position detection portion 102 together with the specified position. Since the process for specifying the person position generally includes a process for cutting an image of the face portion from the overall image, the image of the face portion can easily be obtained. The method of detecting the speaking operation from an image is not limited to calculate the change in the brightness. Thus, another method may be employed. Hereinafter, information for use as a scale for detecting the speaking operation extracted from an image and including the brightness change K(i) is called information of a speaking operation for convenience.

The speed of the process for detecting the person position, which is performed at the image input rate, for example, at 5 frames/second, is not the same as the processing speed in a case where the voice process is performed in block units. The processing speed is usually lower than that of the voice process. Therefore, an image, which is the same as that for one block before inn the voice process is sometimes input to the portion 104-5 for detecting information of a speaking operation for each position. Since change in the brightness between the same image is obtained in this case, change in the brightness is zero. To prevent this, the value of the brightness change one block before is, as it is, transmitted when the calculated value of the brightness change is zero.

Information of the speaking operation is arranged to be used in parallel to the transmitted power from each position in the learning signal level calculating portion **104-2*c* and the adaptation control signal generating portion 104-2*f* of the environment adaptation portion 104-2. The other portions are the same as those according to the seventh embodiment. Also the structure of the environment adaptation portion 104-2 is the same as that according to the seventh embodiment. Therefore, the learning signal level calculating portion 104-2*c* and the adaptation control signal generating portion 106**.

The learning signal level calculating portion **104-2*c* determines the amplitude of the sound source signal for each person portion, the transmission of which is assumed when the input signal for the adaptive filter and the desired response are generated. To determine the amplitude, the learning signal level calculating portion 104-2***c* calculates and stores a mean value of the power of background noise and the transmitted power from each position of the input voice in the voice periods, similarly to the second embodiment. In accordance with the above-mentioned information of the speaking operation and the obtained power transmitted from each position and the power of background noise, so as to calculate the amplitude of the sound source signal in accordance with the information of the speaking operation and the obtained power transmitted from each position and the power of background noise. The method of calculating the amplitude is changed in accordance with whether the person position assumed to have a sound source is located at a position at which the sensitivity is set to be a low level or located at a position at which the sensitivity is set to be a high level.

If the person position is at the portion at which the sensitivity is set to be a high level, the value of the square root of the mean value of the power transmitted from each position is made to be the amplitude of the sound source signal similarly to the seventh embodiment. Since the value of the power transmitted from each position has a small value if no sound is produced, a value higher than the background noise by a certain value v, for example, v=5 dB, is set to be a minimum value. Only when the power transmitted from each position is larger than the above-mentioned value, the amplitude is set to be the detected value. That is, the following equations are employed:

$$A_k=(P_N*10^{v/10})^{1/2} \qquad (21')$$

Note that the foregoing equation is employed when the power transmitted from each position is smaller than the sum of the background noise and vdB.

$$A_k=(P_k)^{1/2} \qquad (22')$$

Note that the foregoing equation is employed when the power transmitted from each position is larger than the sum of the background noise and vdB. In the above-mentioned equations, $P_N$ is the mean value of the power of background noise and $P_k$ is the power transmitted from each position and v is a minimum value of 5.

When the person position is the position at which the sensitivity is set to be a low level, the sound source signal is made to have a smaller amplitude in inverse proportion to the power transmitted from each position and information of the speaking operation so as to prevent adaptation to the artificial leaning signal. For example, the amplitude of the k-th sound source signal is calculated in accordance with the following equation:

$$A_k = A_k * \gamma(P_N/P_k)^{1/2} * (1-\gamma)(k_o/(K_k+K_o))^{1/2} \qquad (23')$$

where $K_k$ is the brightness change between frames of images of face portion at the k-th position calculated in accordance with Equation (20'), $K_0$ is a mean value of the brightness change and γ is a constant which is, for example, γ=0.5. The thus-obtained amplitude of the sound source and the input voice are added to generated an input signal for the adaptive filter.

Then, the adaptation control signal generating portion 104-2*f* controls the step size of learning of the filter in accordance with the power transmitted from each position and information of the speaking operation. Similarly to the seventh embodiment, the step size is controlled in such a manner that the adaptation is performed slowly when the value of the transmitted power is large and the adaptation is performed quickly when the transmitted power is small.

To perform the above-mentioned control, the value of the step size (a in Equation (5')) fixed in Equation (5') is sequentially calculated in accordance with the following equation so as to make the same to be variable in order to adjust the adaptation speed:

$$a=C/(\alpha_B p_k/p_N+\beta_B K_k+1) \text{ (suppression mode B)} \qquad (24')$$

$$a=C/(\alpha_A\Sigma(p_k/p_N)+\beta_A\Sigma(K_k/K_o)+1)\text{(suppression mode A)} \qquad (25')$$

where $p_k$ is the power transmitted from each position from position k at which the sensitivity is set to be a high level, C, $\alpha_A$, $\alpha_B$, $\beta_A$ and $\beta_B$ are constants having values such that, for example, C=2.0, αA=α=0.5, and $\beta_A=\beta_B=0.5$. The above-mentioned equations are examples. Therefore, another method may be employed in which a threshold is provided for each of the power transmitted from each position and the brightness change and the adaptation is inhibited (a is made to be 0) if either of the value exceeds the threshold value.

Figure 34:
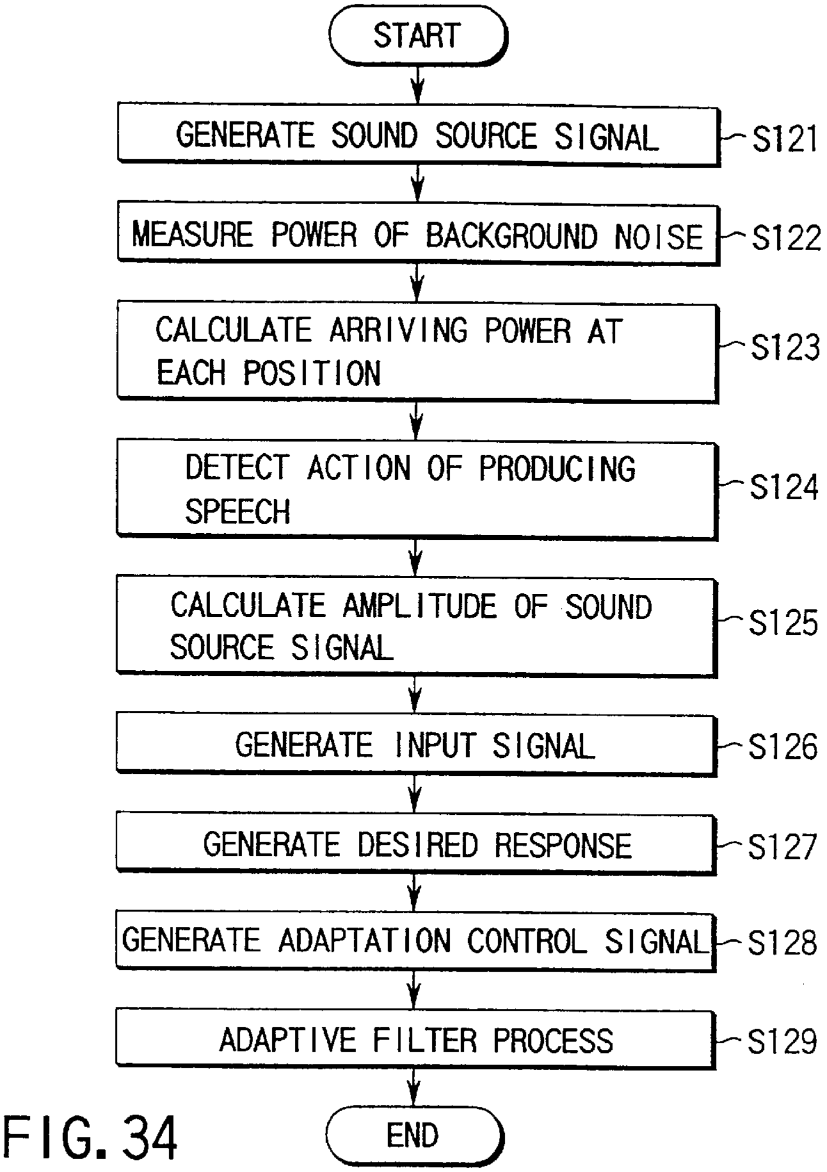
FIG. 34 is a flow chart of a process in the environment adaptation portion.

Referring to FIG. 34, a flow of the overall process which is performed by the environment adaptation portion according to the eighth embodiment will now be described.

Initially, the sound source signal generating portion 104-2*b* of the environment adaptation portion 104-2 generates a series of sound source signals by a number corresponding to the number of the selected person positions (step S121).

Then, the learning signal level calculating portion 104-2*c* calculates the power of the input voices received by the plural channels so as to detect the voices and determine voice portions and non-voice portions. In accordance with the mean power in the non-voice portions, power $P_N$ of background noise is determined. At this time, an averaging operation may be performed in accordance with Equation (12')(step S122).

Then, the arriving power from each position is calculated from the input voices from the plural channels in accordance with Equation (15')(step S123). Then, the portion 104-5 for detecting action of producing speech for each position receives an image of the face portion from each person position through the person position detection portion 102 so as to detect information about the speaking operation. If the calculation of the brightness change results in zero, a value one block before is employed as the value of the brightness change in this block. If the result is not zero, a value of the brightness change in this block is employed, the employed value being stored (step S124).

Then, the learning signal level calculating portion 104-2*c* calculates the amplitude $A_k$ of the sound source signal in accordance with Equations (21') to (23')(step S125). Then, the input signal generating portion 104-2*a* performs addition to actual input voice in accordance with Equation (13') so that an input signal for the adaptive filter is generated (step S126).

Then, the desired response generating portion 104-2*d* generates desired response from the sound source signal and the amplitude of the sound source signal in accordance with Equation (14') (step S127).

Then, the adaptation control signal generating portion 104-2*f* generates a series of adaptation control signals of the step size from the power of background noise and power transmitted from each position in accordance with Equation (24) or (25)(step S128). Then, the generated input signal, the desired response and the adaptation control is are supplied to the adaptive filter so that filter coefficient is obtained (step S129). The obtained filter is transmitted to the noise eliminating portion 104-3 so that the input voice and the filter are convoluted so as to extract the voice.

Since the flow of the overall process of the eighth embodiment is the same as that according to the sixth embodiment, it is omitted from description. As described above, when the noise suppression is performed such that the sensitivity is, by the adaptive filter, set for the voices transmitted from a plurality of person positions specified due to the image process, the adaptation process of the adaptive filter is controlled in accordance with the power transmitted from the person position and information of a speaking operation obtained from an image. Therefore, even if noise is too intense and estimation of the power transmitted from each portion is unsatisfactory, the noise suppressing performance can be improved significantly and voices of all persons can be fetched by suppressing background noise even if a plurality of persons simultaneously produce sound or the voice from only one person can be fetched by suppressing voices from other persons.

A ninth embodiment having a test speech mode will now be described. The ninth embodiment has an input mode switch portion for temporarily interrupting a usual voice input process to receive test voice so as to calculate the level during the operation of the voice collecting apparatus. Thus, the level of the sound source signal is made to be adaptable to the actual environment so as to perform an accurate adaptation process.

Figure 35:
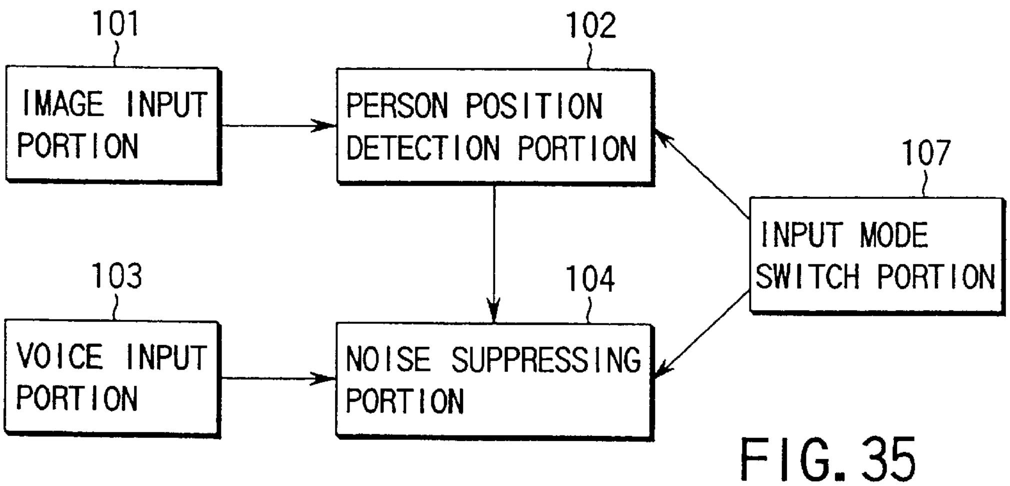
FIG. 35 is a diagram showing the overall structure according to a ninth embodiment of the present invention.

In the above-mentioned embodiments, the amplitude of the sound source signal for use to generate the learning signal for the adaptive filter is calculate by using the level of background noise and the level of default voice determined experimentally. In this embodiment, test voice speech is performed to determine the level of the sound source in order to be adaptable to the actual sound field. Therefore, an input mode switch portion 107 is added which switch the test voice and usual voice input during the operation, as shown in FIG. 35. Referring to FIG. 35, reference numeral 101 represents a image input portion, 102 represents a person position detection portion 102, 103 represents a voice input portion, 104 represents a noise eliminating portion and 105 represents the input mode switch portion.

In this structure, a usual voice input process is set to the input mode switch portion 105 in a usual case. When test speech is performed, information indicating the test speech is input through the input mode switch portion 105. When the input mode is set to the test speech, the usual adaptive filter process is interrupted. Then, the learning signal level calculating portion 104-2*c* calculates and holds the level of the supplied voice. After the test speech has been completed and the mode has been returned to the usual input mode, the minimum level, determined to be, for example, a default level of 5 dB, for the sound source signal for sue to calculate the level of the learning signal is not used. In this case, the detected level of the test speech is used to calculate the amplitude of the sound source signal.

Figure 36:
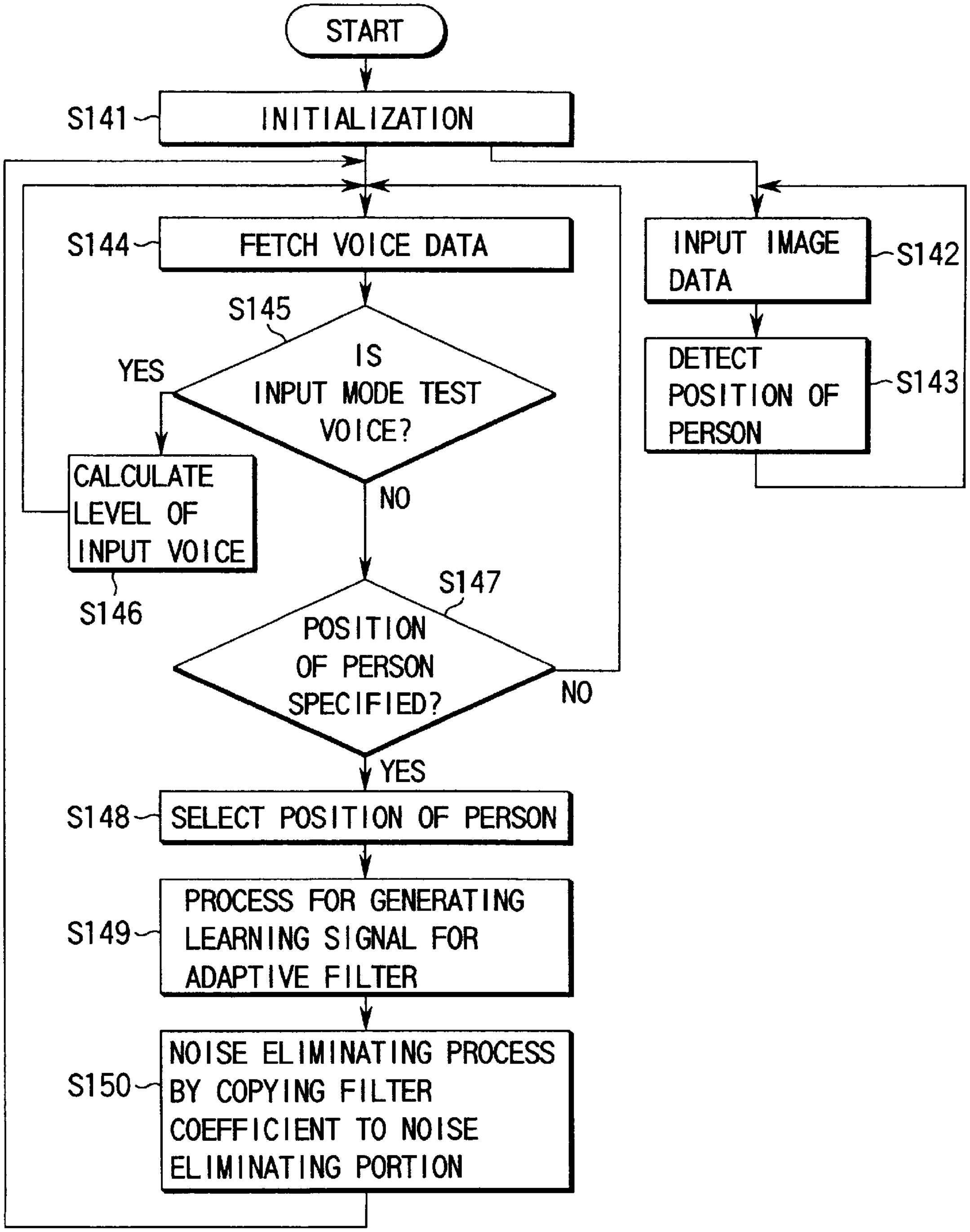
FIG. 36 is a flow chart of an overall process according to the ninth embodiment of the present invention.

Referring to FIG. 36, the flow of the overall process of the ninth embodiment will now be described.

Initially, initialization is performed such that the number N of the positions of persons to be selected and whether the noise suppressing mode is A or B are set (step S141).

The image process is performed in such a manner that image data is fetched from a video camera at a rate of, for example, five frames per seconds (step S142). Then, the person position is specified for each frame and transmits the person position (step S143). The foregoing steps S142 and S143 are repeated. The process for specifying the person position from an image is, in parallel, performed independently from the process for suppressing noise in voice.

The voice process is performed such that voice data is initially A/D-converted at a sampling frequency of 12 kHz so that data for one block is fetched in such a manner that, for example, 1,024 samples per channel is considered as one block (step S144).

In step S145 whether the input mode is the test speech or usual input is detected. If the input mode is the test speech, the operation proceeds to step S146. If the input mode is the usual input, the operation proceeds to step S147. In step S146 the learning signal level calculating portion 104-2*c* calculates and stores the level of the input voice. The level of the input voice is determined such that voice is detected in accordance with the power of input through a certain number, for example, a first microphone, and a mean value in the portions detected as voice periods is employed. Then, the operation returns to step S144.

Then, in step S147 whether or not the person position has been specified is determined. If the person position is not specified, no operation is performed and the operations in steps S144 to S147 are repeated. If the person position is specified, the operation proceeds to step S148. The person portion cannot be specified in a case where a result of an image process has not been obtained immediately after start of the process or no person exists. Since the process of the position image and the process of the voice are performed independently, data of person portion can be communicated by known communication between processes using a socket or a shared memory or a file in a case where all of the processes are performed by one computer.

In step S148, the person position selection portion 104-1 selects the person position which is the subject to be processed. Then, the environment adaptation portion 104-2 uses the person position selected by the person position selection portion 104-1 or direction and the distance to generate a Learning signal for the adaptive filter so as to update the filter coefficient (step S149). Then, the filter coefficient updated in step S149 is copied onto the noise eliminating portion 104-3, and then the foregoing filter and the input voice are convoluted so that voice is transmitted (step S150).

The operations in the steps S141 and S142 and S143 to S150 are repeated in parallel.

Although the test speech mode according to this embodiment is arranged to be added to the structure according to the sixth embodiment, it may be added to the structure according to the seventh or eighth embodiment.

Figure 37:
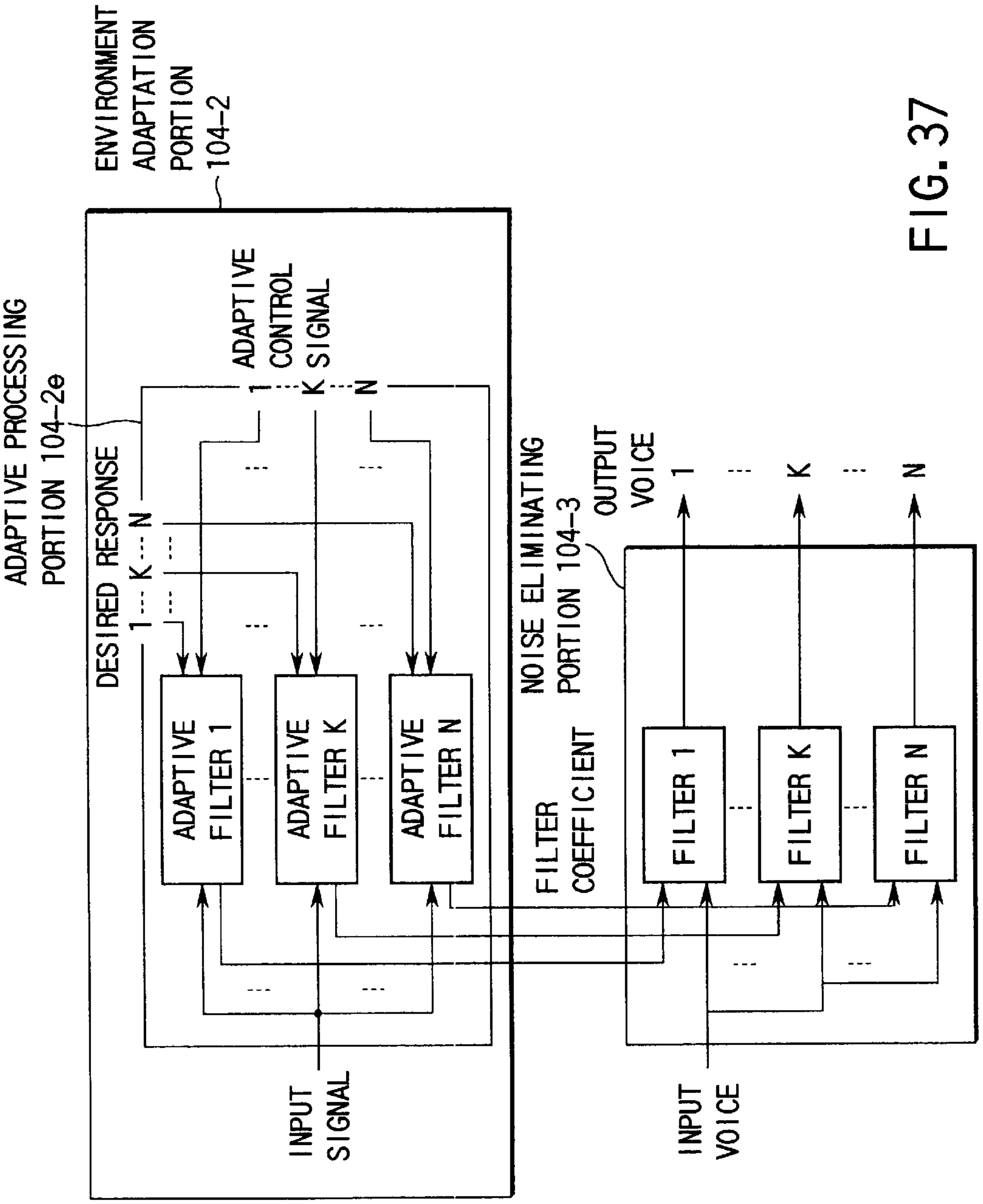
FIG. 37 is a diagram showing the structures of a noise eliminating portion and an environment adaptation portion according to a tenth embodiment of the present invention.

The tenth embodiment of the present invention will now be described. In this embodiment, voice from each person is separated from voices from other persons so as to be fetched by forming the structure such that each of the noise estimating portion and the adapting process portion in the environment adaptation portion according to any one of the sixth to ninth embodiments are formed by a plurality of filters. The thus-formed structure is shown in FIG. 37. The other structures are the formed similarly to those according to the sixth to ninth embodiments. Although this embodiment is development of the eighth embodiment, it may be applied to the seventh embodiment and the ninth embodiment. If the environment control signal generating portion of the environment adapting portion is removed, this embodiment is the development of the sixth embodiment. Referring to FIG. 37, plural (N), for example, three, filters are provided for each of the adaptation processing portion 104-2*e* of the environment adaptation portion 104-2 and the noise eliminating portion 104-3. The filters in the noise eliminating portion 104-3 are copies of the coefficients of the adaptive filters in the environment adaptation portion 104-2. Although the same input signals are input to the adaptive filters of the environment adaptation portion 104-2, different desired responses and adaptation control signals are supplied in accordance with the number k of the filter.

The process which is performed by the environment adaptation portion 104-2 including the adaptation processing portion 104-2*e* will now be described. In the environment adaptation portion 104-2, an assumption is performed that sound wave is transmitted from each of person positions detected and selected in accordance with an image and a signal of the sound wave is generated by the sound source signal generating portion 104-2*b*. The contents of the signal may be artificial contents, for example, random noise having no correlation among the sound sources as described in the sixth embodiment. In accordance with the sound source signal, an input signal and desired response for performing the adapting process are generated. At this time, the learning signal level calculating portion 104-2*c* determines the amplitude of the sound source signal in accordance with the power transmitted from each position and/or information of the speaking operation and observed level of background noise.

The adaptation control signal generating portion 104-2*f* generates the adaptation control signal for controlling the adapting speed in the adapting process. The adaptation processing portion 104-2*e* receives the three signals to determine the filter coefficient for suppressing noise by the adaptive filter. The adaptation control signal is not always required. Moreover, the power transmitted from each position and information about the speaking operation are not always required to calculate the level of the learning signal.

Voices transmitted from a plurality of person positions detected by the person position detection portion 102 and then selected by the person position selection portion 104-1 are extracted by using plural filters as shown in the structural view. The number of the filters are made to be the same as the number of the selected person positions. The number k of the filter corresponds to the number of the person position.

To cause each filter to extract voice from each person, the contents of desired response when adaptation is performed by the k-th adaptive filter are made to be the same as that of a signal from one sound source which is assumed to be transmitted from the k-th person position, the contents being calculated in accordance with Equation (14'). The input signal for each adaptive filter is obtained by adding actually input voice to all of sound source signals corresponding to the N person positions, transmitted and then observed at the positions of microphones. In accordance with Equation (13'), the input signal is calculated at each position of the microphone so that N-channel signals are generated. The input signals are commonly used for all of the adaptive filters.

On the other hand, adaptation control signals for controlling the converging speed for the adaptive filters are generated to have different contents for the numbers of the adaptive filters. The k-th filter is arranged to receive a series of step size values calculated in accordance with the power transmitted from the k-th person position or information of a speaking operation by using Equations (19') and (20') or Equations (24') and (25'). When the sixth embodiment with which the power transmitted from each position or information about the speaking operation cannot be obtained is developed, no adaptation control signal is generated and constant step size is employed.

The thus-generated input signals, desired responses and adaptation control signals are supplied to the adaptive filters and thus plural sets of filter coefficients are determined. Then, the coefficients are transmitted to the noise eliminating portion 104-3 so that the input voice is subjected to a filter process for removing noise. As a result, voice from the k-th person portion is transmitted from the k-th filter because voice from each person is individually extracted.

As described above, use of the plural filters corresponding to the person position enables sounds respectively transmitted from person positions to be separately fetched.

The eleventh embodiment of the present invention will now be described. The eleventh embodiment is structured in such a manner that adaptive filters having linear constraint conditions are used in place of the adaptive filters adapted to the pilot signal method so as to perform the noise suppressing process for collecting voices. Use of the adaptive filters of the above-mentioned type enables a process to be performed from which the process for generating the learning signals which requires a large quantity of calculations.

Figure 38:
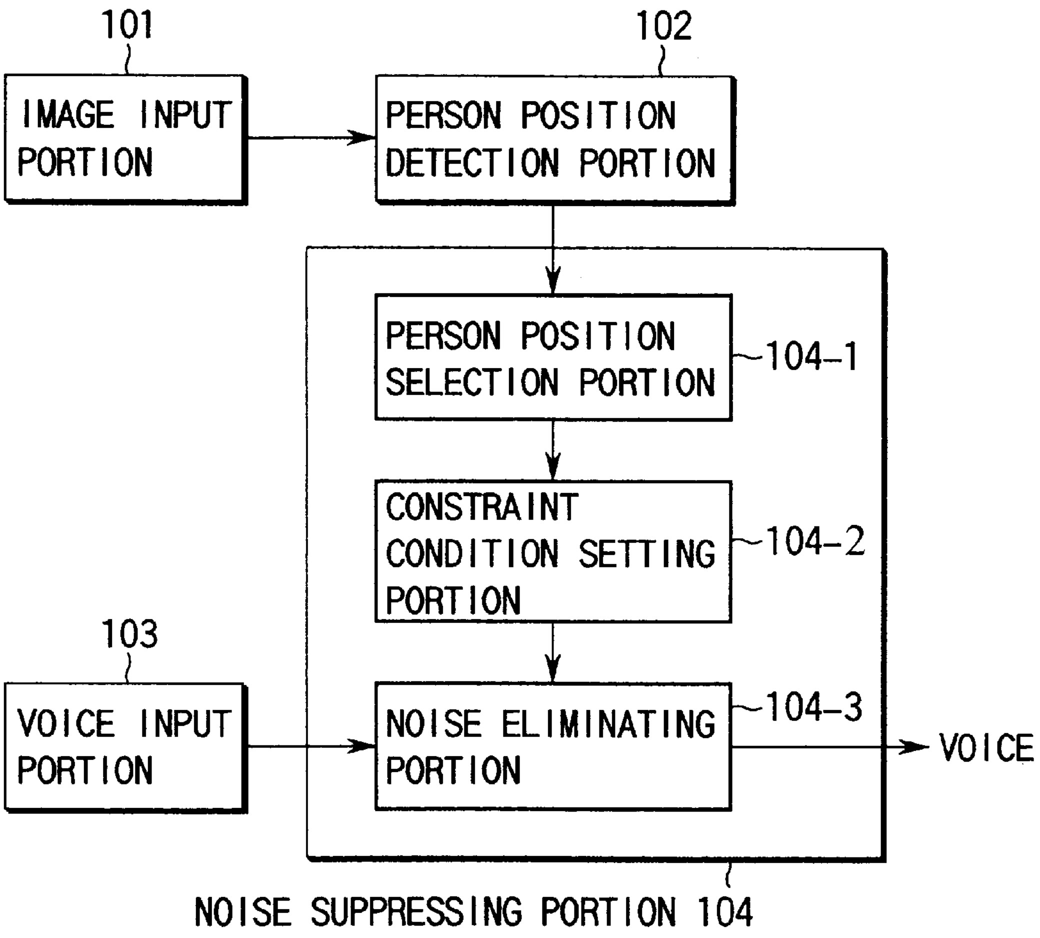
FIG. 38 is a diagram showing the overall structure according to an eleventh embodiment of the present invention.

FIG. 38 is a diagram showing the overall structure of the eleventh embodiment. Referring to FIG. 38, reference numeral 101 represents an image input portion, 102 represents a person position detection portion for processing a supplied image to specify the position of a person, 103 represents a voice input portion for, in parallel, processing voices from a plurality of microphones and 104 represents a noise eliminating portion for suppressing noise contained in the input voice supplied from the plural microphone in accordance with the position of a person detected as a result of an image process. The noise eliminating portion 104 includes a person position selection portion 104-1 for selecting the person position which is the subject of the process from positions of persons specified by the person position detection portion 102, a constraint condition setting portion 104-2 for setting constraint conditions for the adaptive filter in accordance with the selected portion of the person, and a noise eliminating portion 104-3 for causing the adaptive filter to perform the noise suppressing process under the set constraint conditions.

The person position selection portion 104-1 selects the positions of persons determined in accordance with the positions of a plurality of persons obtained from an image as described in the sixth embodiment. The constraint condition setting portion 104-2 sets the constraint conditions for the adaptive filter having the linear constraint condition in accordance with the position of the person. The constraint condition enables the sensitivity with respect to sound wave transmitted from an arbitrary person position to be set. The noise eliminating portion 104-3 performs the process for suppressing noise by using the adaptive filter under the set constraint condition.

Although the detailed structure of the adaptive filter having the linear constraint condition has been described in a document ("Adaptive Filter Theory" written by Heykin), the processing method will schematically be described.

Referring to Equations (1') to (4'), an assumption is performed that an output from the microphone array is X, the filter coefficient is W and an output from the filter is $y=W^H X$, the filter coefficient of a minimum dispersion adaptive filter having the constraint condition is obtained by making an expected value of output power $y^2$ from the filter to be minimum under constraint condition that the response with respect to an object direction or position is maintained constant:

$$E[y^2]=E[w^H X X^H w]=w^H R w \tag{26'}$$

where E [] is the expected value and R=E $[XX^H]$ is an autocorrelation matrix.

The constraint condition is expressed as follows:

$$W^H A = g \tag{26'-1}$$

where g is a column vector of a constant value having a magnitude corresponding to the number G of the constraint conditions, for example, [1, 1, . . . , 1], A is a matrix having direction control vector am relating to the different frequencies as the column vector thereof and expressed as follows:

$$A = [a_1, \ldots, a_L] \tag{27'}$$

Control vector $a_m$ (m=1, . . . , L) in each direction which is a component of Equation (6') is expressed as follows:

$$a_m = (1, a_2 e^{-j\omega} m^{\tau} 2, \ldots, a_N e^{-j\omega} m^{\tau} N) \tag{28'}$$

where $\tau_2, \ldots \tau_N$ are differences in the transmission time for sound wave which is made incident upon each microphone when a first microphone is considered as a reference, $\omega_m$ is an angular frequency, $a_2, \ldots, a_N$ are amplitude ratios of sound wave which is made incident upon each microphone when the first microphone is considered as a reference, G is, for example, 10, $\omega_m$ is, for example, $\omega_m = (((\omega_a - \omega_b)/(G-1)) * m + \omega_b$, where $\omega_a$ is an upper limit for the band region and $\omega_b$ is an angular frequency of a lower limit.

As the constraint condition in Equation (26'), responses with respect to sound waves transmitted from one direction or position are made to be constant. Moreover, responses with respect to sound waves transmitted from plural directions or positions are made to simultaneously be constant. For example, control vectors $a_m(\theta_1)$, $a_m(\theta_2)$(m=0, 1, . . . , L) using time delay $\tau_i(\theta_1)$, $\tau_i(\theta_2)$(Equation (6')) relating to, for example, two transmission angles $\theta_1$ and $\theta_2$ as follows is used:

$$\begin{aligned} a_m(\theta_2) = (1, a_1 e^{-j\omega_m \tau} 1(\theta_2), a_2 e^{-j\omega_m \tau} 2(\theta_2), \cdots, \\ a_{N-1} e^{-j\omega_m \tau} (N-1)(\theta_1)) \\ a_{N-1} e^{-j\omega_m \tau} (N-1)(\theta_2)) \end{aligned} \tag{29'}$$

Moreover, the following relationship is employed:

$$A = [a_0(\theta_1), a_1(\theta_1), \ldots, a_L(\theta_1), a_0(\theta_2), a_1(\theta_2), \ldots, a_L(\theta_2)] \tag{30'}$$

Thus, the constraint for the response of the array with respect to the plural transmission directions can be set.

In a case where the minimizing issue with Equations (4') and (5') is repeatedly solved, the filter coefficient updated due to j repetitions is expressed as follows:

$$W_j = P[W_{j-1} - \mu y_j X] + F \tag{31'}$$

where P and F are expressed as follows:

$$P = 1 - A(A^H A)^{-1} A^H, \; F = A(A^H A)^{-1} g \tag{32'}$$

In accordance with Equation (8'), a filter coefficient capable of suppressing noise and fetching required voice can be obtained. Moreover, voice output $y_j$ in which noise has been suppressed can simultaneously be obtained.

Then, an operation for setting the constraint condition for suppressing noise will now be described. The noise suppression is performed in a case where a plurality of positions of persons are, as described in the sixth embodiment, obtained by suppression process mode A in which sound waves transmitted from all of the positions of persons selected as the subjects of the process are received at a high sensitivity and suppression process mode B in which only the sound wave transmitted from one selected position of a person is received at a high sensitivity and sound waves transmitted from positions of other persons are received at a low sensitivity. Moreover, an intermediate method between A and B may be employed in which the sensitivity is raised with respect to the positions of a predetermined plural persons and the sensitivity is lowered with respect to the other persons. The suppression can be realized by combining A and B.

The constraint conditions for the noise suppression is set by providing an element of matrix A and constant vector g for Equation (25') expressing the constraint condition. Both of processing modes A and B are arranged to have matrix A, the contents of which are the same, the contents being the direction control vector Equation (30') relating to the position of the selected person. The contents of constant vector g is changed in accordance with the suppression processing mode. In the suppression mode A in which sensitivity is raised with respect to the positions of all of selected persons, the element of g is made to be 1 without exception. In the case of suppression processing mode B, the element of g relating to the position of a person provided with high sensitivity is made to be 1. On the other hand, the element of g relating to the position of a person provided with low sensitivity is made to be 0.

In the case where matrix A of the direction control vector relating to directions $\theta_1$ and $\theta_2$ has the contents expressed by the following Equation (30'):

$$A = [a_0(\theta_1), a_1(\theta_1), \ldots, a_L(\theta_1), a_0(\theta_2), a_1(\theta_2), \ldots, a_L(\theta_2)]$$

The contents of constant vector g in the case where the sensitivity is raised with respect to direction $\theta_1$ and the sensitivity is lowered with respect to direction $\theta_2$ are made to be as follows:

$$g = [1, 1, \ldots, 1, 0, 0, \ldots, 0]$$

Figure 39:
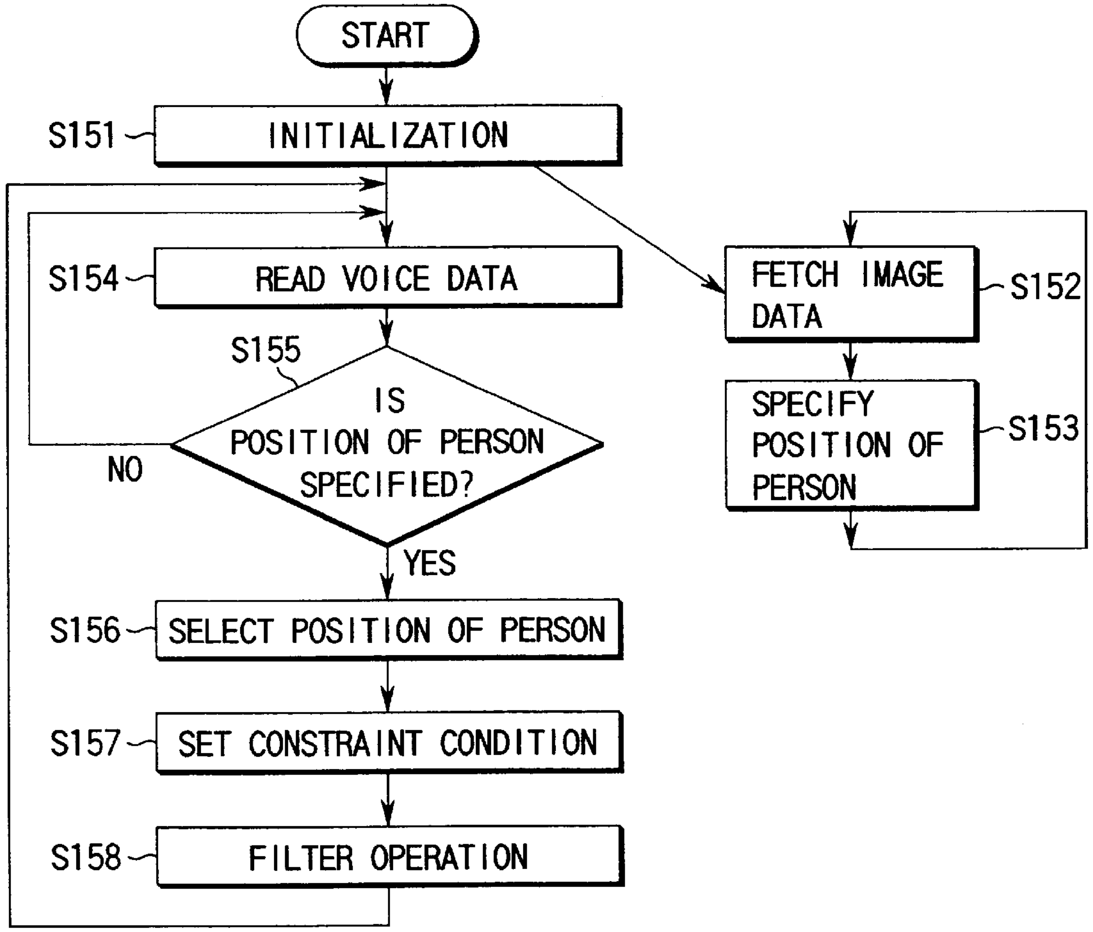
FIG. 39 is a flow chart showing a process according to the eleventh embodiment of the present invention.

A flow of the above-mentioned process will now be described with reference to FIG. 39.

As described in the sixth embodiment, the process for specify the position of a person from an image and the process for suppressing noise in the voice are performed in parallel. The image process is performed by the same method according to the sixth embodiment.

Initially, initialization is performed, and then the number N of the positions of persons to be selected and whether the noise suppressing process is performed in mode A or mode Base are determined (step S151).

The image process is performed in such a manner that image data is fetched at a rate of five frames per second (step S152) so as to specify the position of a person in each frame (step S153).

The voice process is performed in such a manner that voice data for one block is fetched at a sampling rate of 12 kHz such that 1,024 samples per channel are considered to be one block (step S154).

Then, whether or not the position of a person has been specified is determined (step S155). If the position of a person is not specified, the operation returns to step S154. If the position has been specified, the operation proceeds to step S156.

In step S156 the person position selection portion 104-1 selects the position of a person which is the subject of the process. Then, in accordance with the position of the selected person, the constraint condition for the filter process is set in accordance with Equations (26') and (30') (step S157).

Under the constraint condition set in step S157, the adaptive filter is calculated so that voice is output (step S158). The processes in steps S152 and S153 and those in step S154 to S158 are performed in parallel.

The twelfth embodiment having a structure comprising plural filters having constraint conditions will now be described. The twelfth embodiment is structured in such a manner that sounds respectively transmitted from a plurality of positions of persons are separately fetched in a case where th adaptive filter having the constraint condition is used. In order to separately fetch sounds transmitted from the positions of the plural persons, the noise eliminating portion 104-3 shown in the overall structural view is formed by using a plurality of adaptive filters as shown in FIG. 40.

Figure 40:
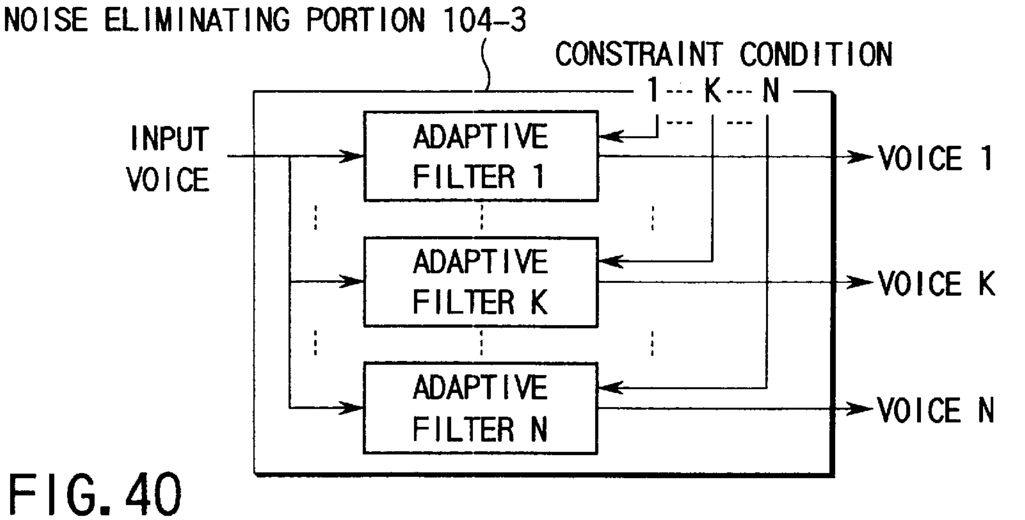
FIG. 40 is a diagram showing the structure of a noise eliminating portion according to a twelfth embodiment of the present invention.

Referring to FIG. 40, the number of the adaptive filters are made to be the same as the number of the positions of persons selected by the person position selection portion 104-1, the number being made to be, for example, 3. The constraint condition is set with the different contents for the respective adaptive filters. The constraint condition set by the constraint condition setting portion 104-2. Thus, the k-th adaptive filter is provided with the constraint condition under which the sensitivity with respect to the k-th position among the positions of the selected persons is raised and the sensitivity with respect to the positions of the other persons is lowered.

As described above, use of the plural adaptive filters and setting of constraint conditions for the respective adaptive filters enable sounds transmitted from the positions of respective persons to be extracted separately from sounds transmitted from the other positions.

Figure 41:
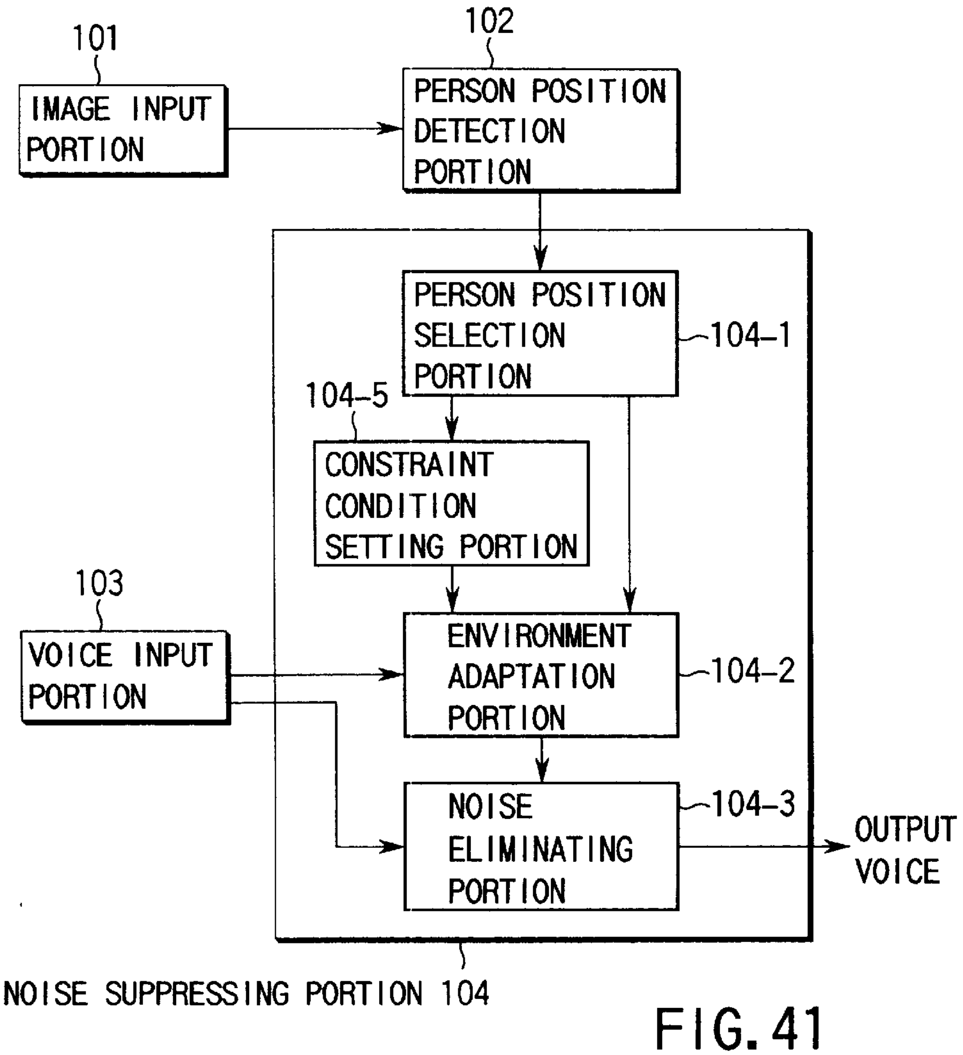
FIG. 41 is a diagram showing the overall structure according to a thirteenth embodiment of the present invention.

A thirteenth embodiment formed by combing the adaptive filters each having the constraint conditions and the pilot signal method will now be described. The structure of the thirteenth embodiment is shown in FIG. 41. Referring to FIG. 41, reference numeral 101 represents an image input portion, 102 represents a person position detection portion, 103 represents a voice input portion and 104 represents a noise eliminating portion. The noise eliminating portion 104 includes a person position selection portion 104-1, an environment adapting portion 104-2, a noise eliminating portion 104-3 and a constraint condition setting portion 104-5.

In the above-mentioned structure, the person position selection portion 104-1 selects the positions of a plurality of persons by detecting an image. In accordance with a result of the selection, the constraint condition setting portion 104-5 set the constraint conditions for the adaptive filters each having the linear constraint conditions. The environment adapting portion 104-2 generates an input signal, which is the learning signal for the adaptive filter, and desired response to input the same to the adaptive filters. Then, the filter coefficient for suppressing noise is determined. The determined filter coefficient is supplied to the noise eliminating portion 104-3 so that the input voice is subjected to the filter process for eliminating noise.

Although a variety of methods may be employed to generate the constraint conditions and the learning signals, the suppression process mode B is employed in the following description. In this case, the constraint condition is determined in such a manner that the sensitivity is raised with respect to the position of one person. Moreover, a learning signal is generated in such a manner that the sensitivity is lowered with respect to the positions of the other persons. Thus, the coefficient of the adaptive filter is determined.

If the sensitivity is raised with respect to direction $\theta_1$, matrix A of the direction control vector is made to have the following contents:

$$A=[a_0(\theta_1), a_1(\theta_1), \ldots, a_L(\theta_1)]$$

The contents of constant vector g are made to be as follows:

$$g=[1, 1, \ldots, 1]$$

As for the input signal among the learning signals, an assumption is performed that sound wave is transmitted from only the position of the person, the sensitivity of which is lowered. Then, a signal which is observed at the position of the microphone is obtained in accordance with Equation (13') according to the sixth embodiment. In this case, desired response is not generated because it is not used. Therefore, the environment adapting portion can be realized by employing a structure as shown in FIG. 42 in which the desired response generating portion of the environment adapting portion according to the sixth and seventh embodiments is omitted.

Figure 42:
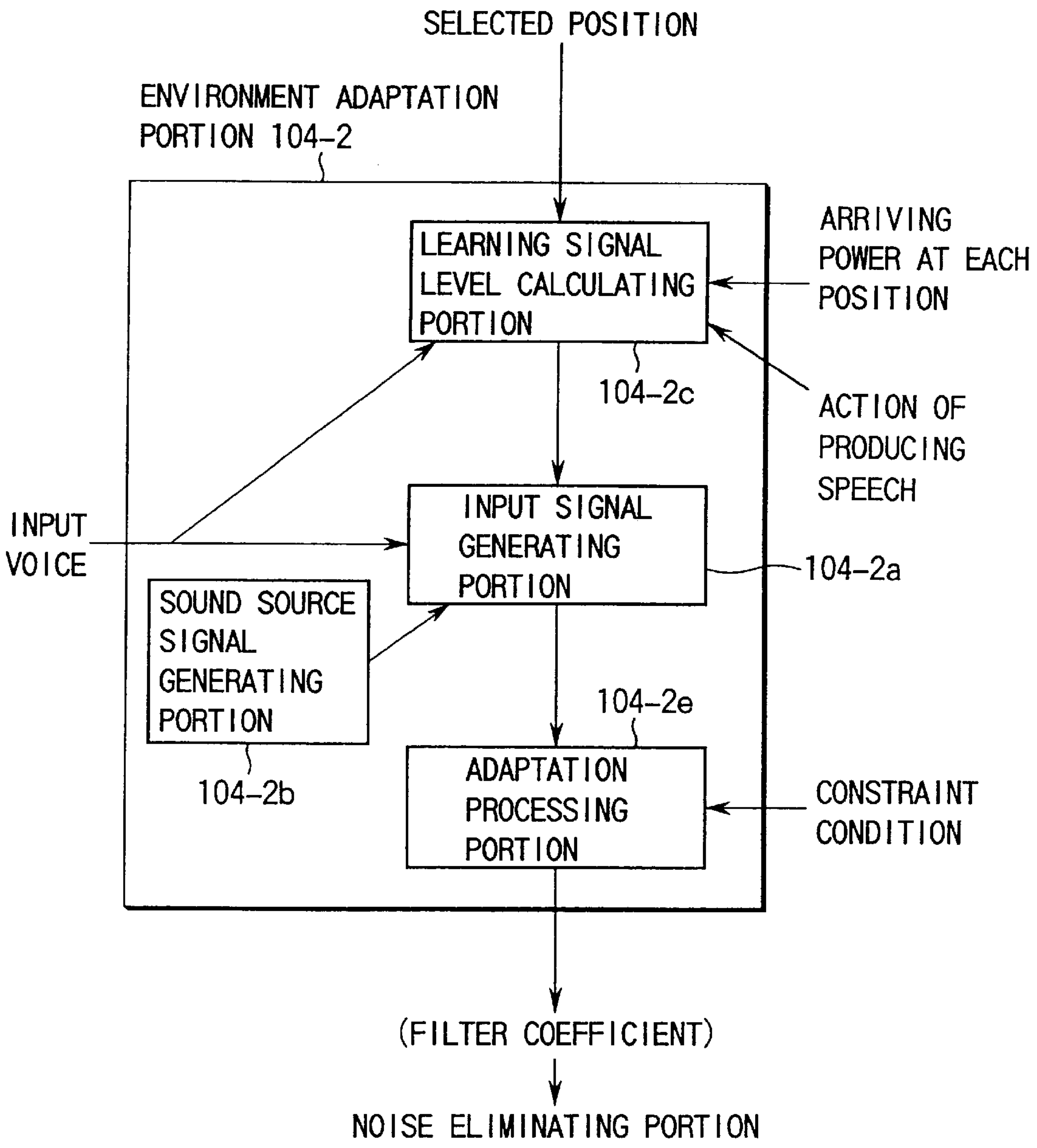
FIG. 42 is a diagram showing the structure of an environment adaptation portion according to the thirteenth embodiment of the present invention.

Referring to FIG. 42, reference numeral **104-2*c* represents a learning signal level calculating portion, 104-2*a* represents an input signal generating portion, 104-2*b* represents a sound source signal generating portion and 104-2*e*** represents a adaptation processing portion. With the above-mentioned structure, the constraint conditions for the adaptive filters each having the constraint conditions are set. Then, the input signal is supplied to the adaptive filter so as to update the filter coefficient.

Figure 43:
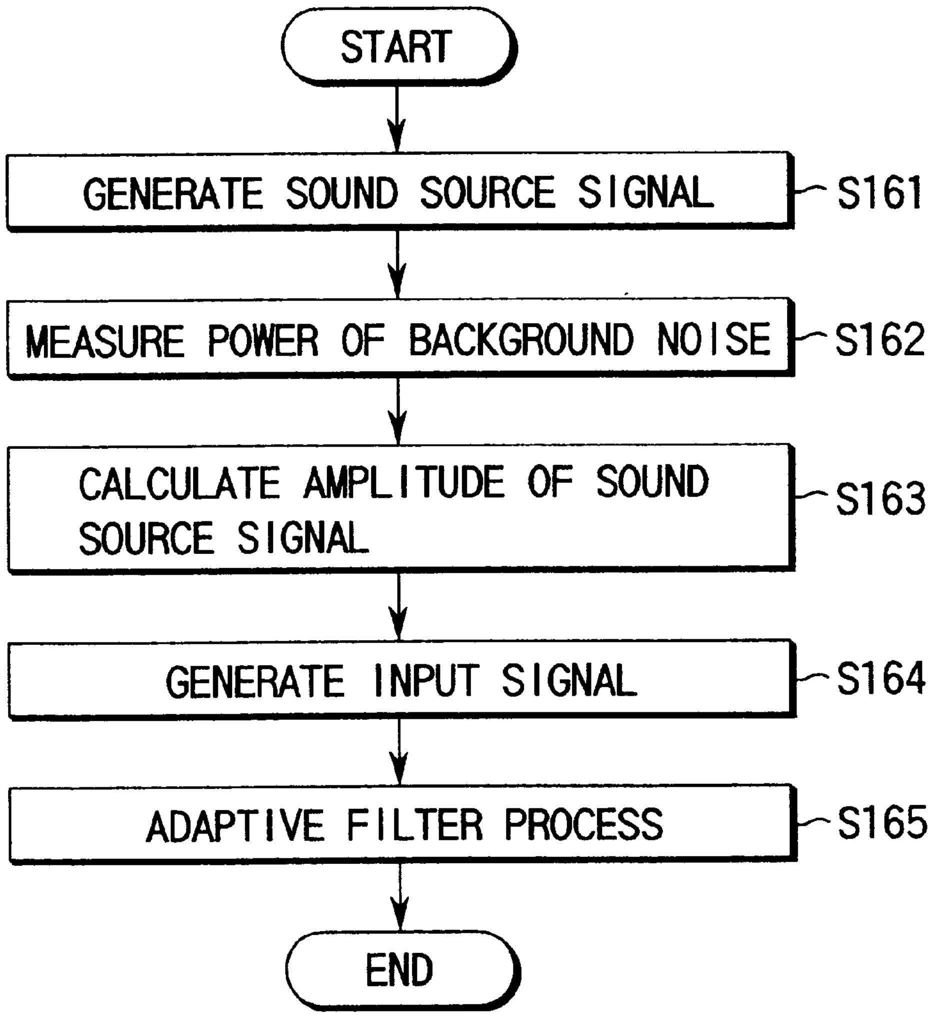
FIG. 43 is a flow chart of the process in the environment adaptation portion.

A flow of the process, which is performed by the environment adapting portion 104-2, will now be described with reference to FIG. 43.

Initially, the sound source signal generating portion **104-2*b* of the environment adapting portion 104-2 generates a series of sound source signals by the number which is the same as the number of positions of selected persons (step S161**).

Then, the learning signal level calculating portion **104-2*c* calculates the power of the voices supplied to the plural channels. Then, voice is detected so that the voice portions and non-voice portions are determined. In accordance with the mean power in the non-voice portions, power $P_N$ of background noise is obtained. At this time, an averaging operation may be performed in accordance with Equation (12')(step S162**).

Then, the learning signal level calculating portion **104-2*c* calculates the amplitude $A_k$ of the sound source signal in accordance with Equation (11')(step S163). Then, the input signal generating portion 104-2*a* performs addition to the actual input voice in accordance with Equation (13') so that an input signal for the adaptive filter is generated (step S164). Then, the generated input signal is, as the adaptation control signal, supplied to the adaptive filter so that a filter coefficient is obtained (step S165**).

The obtained filter is transmitted to the noise eliminating portion 104-3. Then, the input voice and the filter are convoluted so that voice is extracted. The filter process is performed by the noise eliminating portion 104-3 in accordance with Equation (4').

Figure 44:
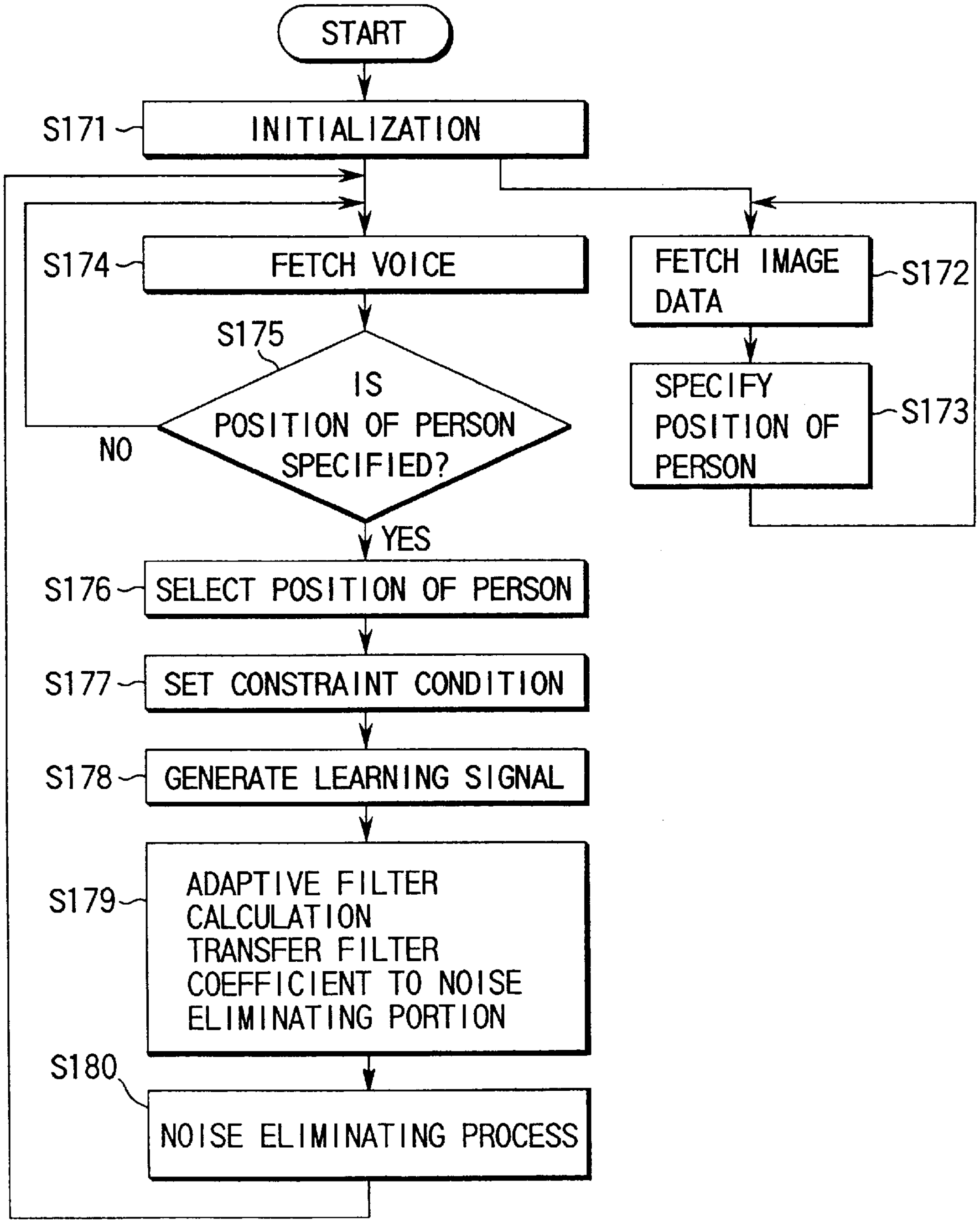
FIG. 44 is a flow chart showing a process according to the thirteenth embodiment.

A flow of the process according to this embodiment will now be described with reference to FIG. 44.

As described in the sixth embodiment, the image process for specifying the position of a person from an image and the process for suppressing noise in the voice are performed in parallel. The image process is the same as that according to the sixth embodiment.

Initially, initialization is performed, and the number N of the positions of persons to be selected and whether the mode of the noise suppression process is mode A or mode B are determined (step S171).

The image process is performed in such a manner that image data is fetched at a rate of, for example, five frames per second (step S172) so that the position of a person is specified for each frame (step S173).

The voice process is performed in such a manner that voice data for one block is fetched at a sampling rate of 12 kHz such that 1,024 samples per channel are considered to be one block (step S174).

Then, whether or not the position of a person has been specified is determined (step S175). If the position of the person is not specified, the operation returns to step S174. If the position has been specified, the operation proceeds to step S176.

In step S176 the person position selection portion selects the position of the person which is the subject of the process.

Then, the constraint condition for the filter process is set in accordance with the position of the selected person by using Equations (26') and (30')(step S177).

Then, the environment adapting portion 104-2 generates a learning signal for the adaptive filter by using the position of the person selected by the person position selection portion 104-1 or the direction or the distance (step S178).

Under the constraint condition set in step S177, the adaptive filter is calculated so as to update the filter coefficient. The filter coefficient is transferred to the noise eliminating portion 104-3 (step S179).

Then, the noise eliminating portion 104-3 performs the convolution operation of the filter transferred in step S179 and the input voice so that voice is transmitted (step S180).

The processes in steps S172 and S173 and those in steps S174 to S180 are performed in parallel.

As described above, application of the pilot signal method to the adaptive filter having the constraint condition enables the quantity of process required to generate the learning signal required for the pilot signal method to be reduced. Moreover, deterioration in the performance of the adaptive filter having the constraint condition occurring due to unsatisfactory degree of freedom can be prevented. Therefore, the process for suppressing noise can accurately be performed to be adaptable to the actual environment with a small quantity of process.

The fourteenth embodiment will now be described. The fourteenth embodiment is structured in such a manner that voices from the positions of a plurality of persons are separately fetched in a case where the adaptive filter having the constraint condition and the pilot signal method are combined. To separately fetch voice from the plural positions of the persons, each of the noise eliminating portion 104-3 and the adaptation processing portion 104-2*e* of the environment adapting portion 104-2 is formed by a plurality of filters as shown in FIG. 45.

Figure 45:
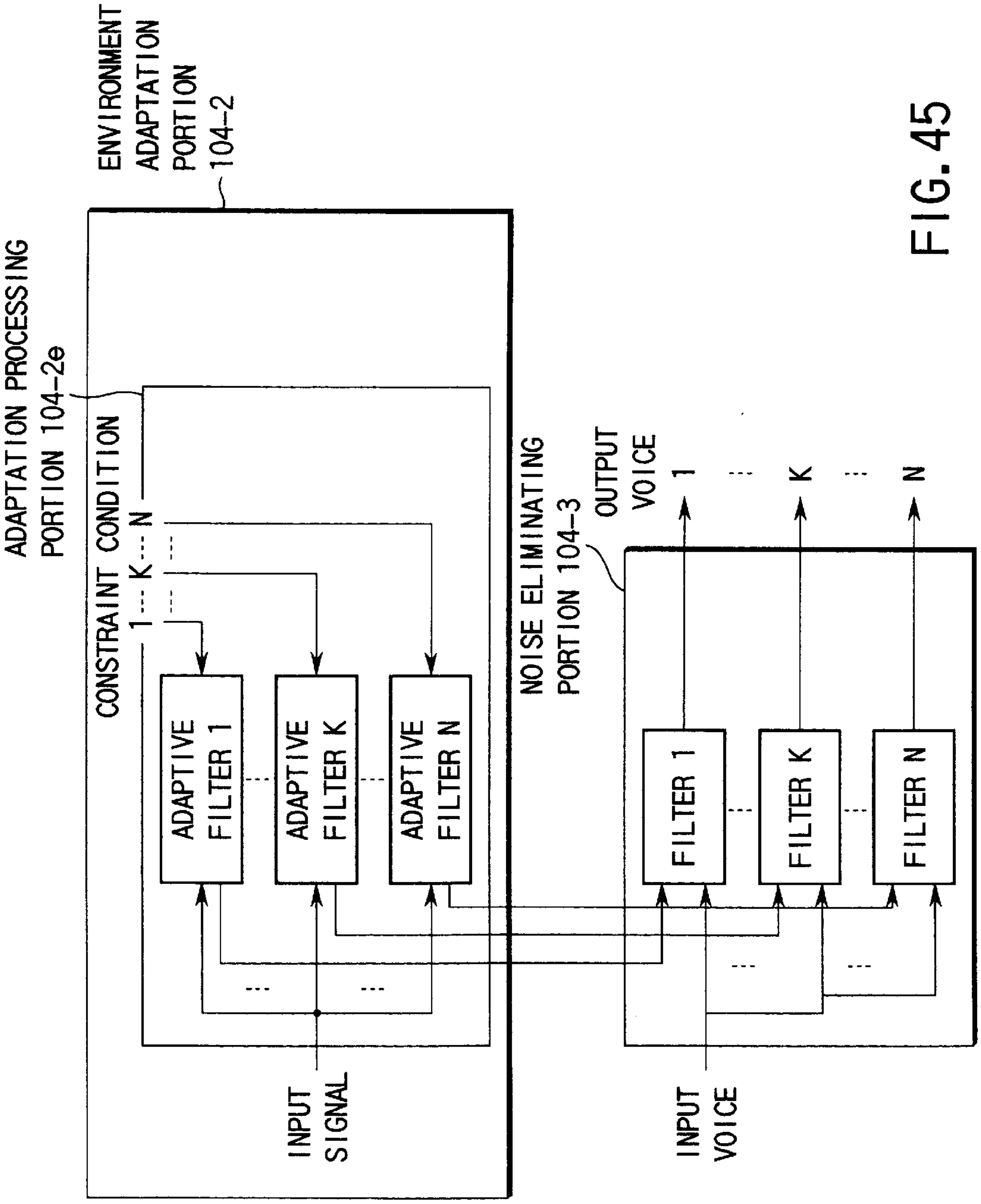
FIG. 45 is a diagram showing the structures of a noise eliminating portion and an environment adaptation portion according to a fourteenth embodiment of the present invention.

Referring to FIG. 45, N, for example, three, adaptive filters are provided for each of the adaptation processing portion 104-2*e* and the environment adapting portion 104-2. The coefficient of the adaptive filter determined by the adaptation processing portion 104-2*e* is supplied to the noise eliminating portion 104-3. Each of the adaptive filters in the adaptation processing portion 104-2*e* is arranged to commonly receive the input signal generated by the input signal generating portion 104-2*a*. Moreover, individual constraint conditions are provided for the respective adaptive filters.

The constraint conditions are set by the constraint condition setting portion 104-5. Thus, the k-th adaptive filter is provided with the constraint condition under which the sensitivity is raised with respect to sound wave transmitted from the position of the k-th person selected by the person position selection portion 104-1. The method of setting the constraint conditions are the same as that described in the thirteenth embodiment. Also the method of generating the input signal to the adaptive filter is the same as that according to the thirteenth embodiment.

As described above, the adaptation process is performed by the plural filters in the case where the adaptive filters each having constraint conditions and the pilot signal method are combined. Therefore, sound transmitted from each position of the person can separately be extracted. Moreover, the quantity of process for generating the learning signal required for the pilot signal method can be reduced. In addition, deterioration in the performance occurring due to unsatisfactory degree of freedom of the adaptive filter having the constraint condition in the case where the number of the constraint conditions is large can be prevented. As a result, the process for suppressing noise can accurately be performed to be adaptable to the actual environment with a small quantity of process.

The above-mentioned process for determining the position of a person, the process for selecting the position of the person, the process for determining the filter coefficient and the process for extracting voice may be formed into computer programs which can be stored in a storage medium, such as a hard disk, a floppy disk or a CD-ROM which is loaded into an appropriate computer.

According to the sixth to fourteenth embodiments, all of voices transmitted from plural positions of persons can simultaneously be extracted such that background noise is suppressed or only voice from a specific person can be extracted.

A fifteenth embodiment of the present invention will now be described. The fifteenth embodiment is structured in such a manner that the constraint condition is not set with the complex number indicating the phase rotation. As an alternative to this, a plurality of input signals supplied from a microphone array or the like are processed by the adaptive filters each having the constraint condition in such a manner that the constraint condition relating to a plurality of directions is set with a real umber so as to calculate the filter with a small quantity of calculations. Moreover, the filter process is performed without the phasing process with respect to the object direction.

Figure 46:
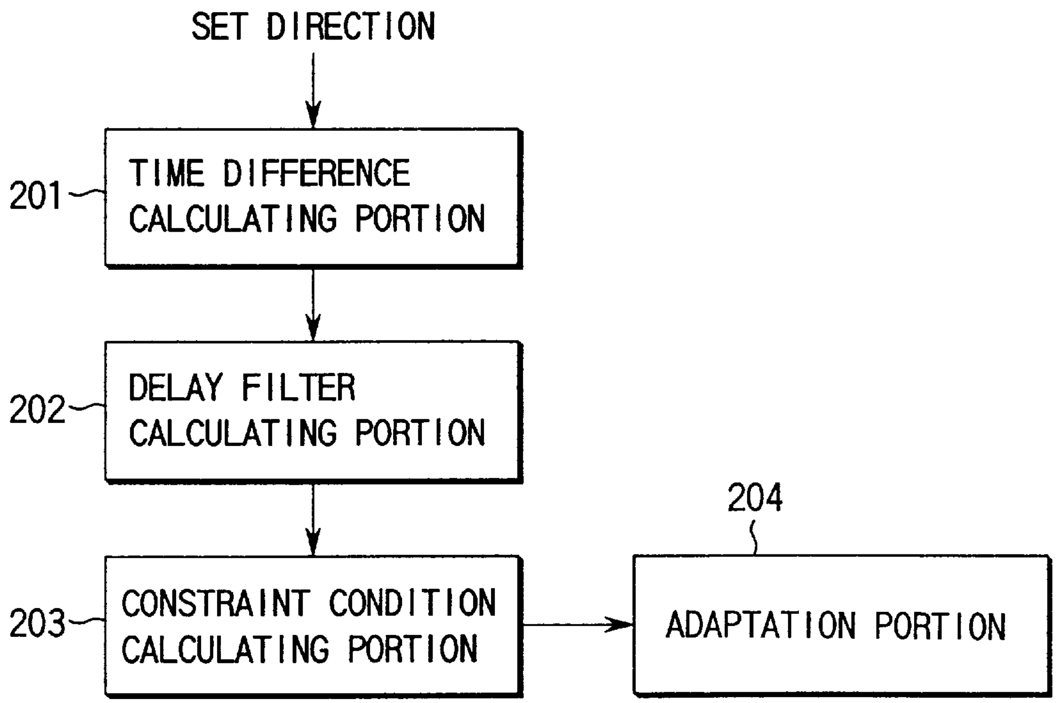
FIG. 46 is a diagram showing the structure of an apparatus for calculating a filter according to a fifteenth embodiment of the present invention.
Figure 47:
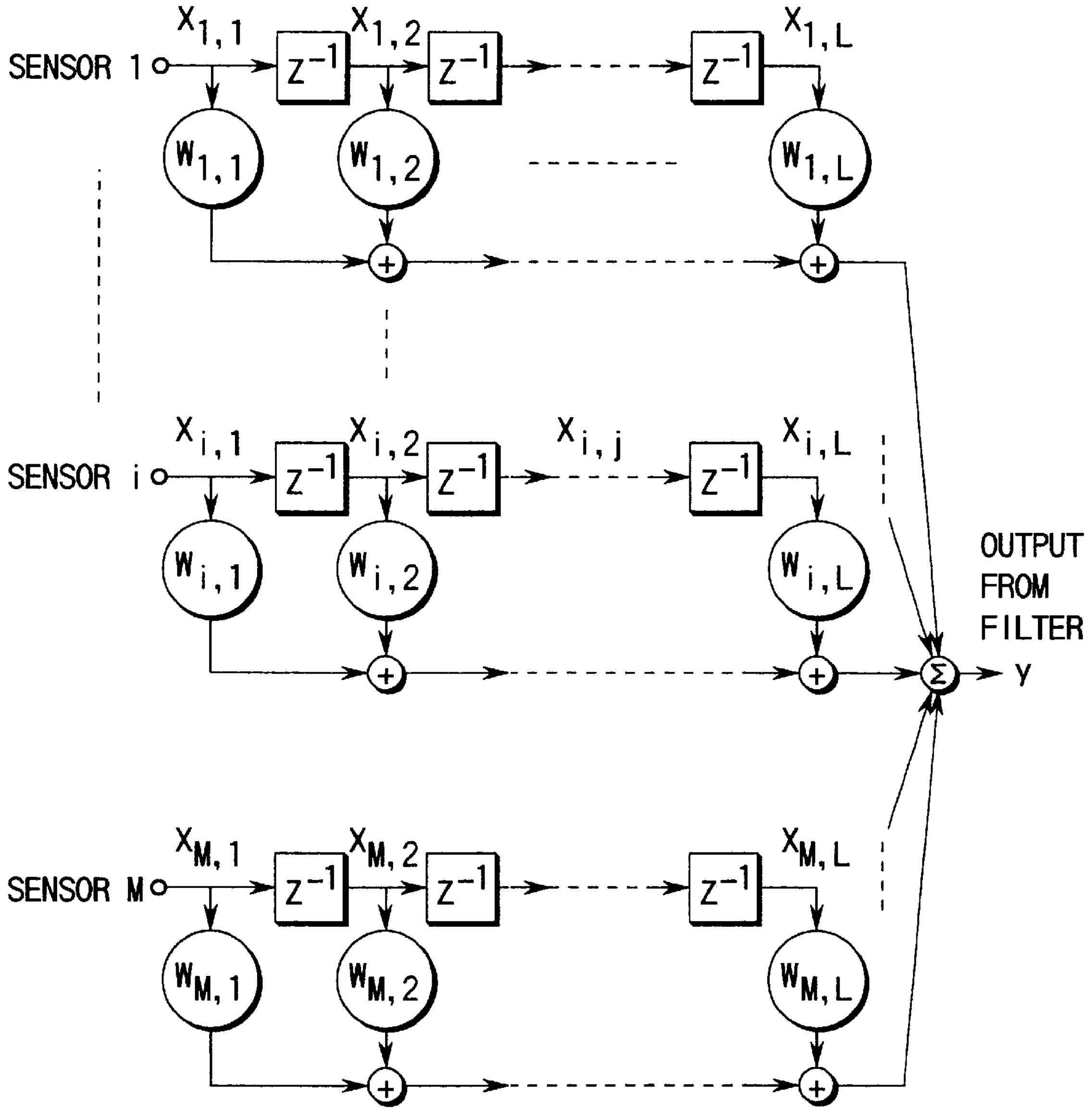
FIG. 47 is a diagram showing the structures of a plurality of delay filters.

FIG. 46 is a diagram showing the structure of a filter calculation apparatus according to the fifteenth embodiment and comprising a time difference calculating portion 201, a delay filter calculating portion 202, a constraint condition calculating portion 203 and an adaptation portion 204. Initially, the difference in time of the signals in respective channels in the case where the signals are transmitted from directions set under the constraint conditions is detected by the time difference calculating portion 201. A delay filter capable of realizing the detected time difference among the channels is obtained by the delay filter calculating portion 202. In accordance with the filter coefficient of the delay filter, the constraint condition is set by the constraint condition calculating portion 203. Under the set constraint condition, the adaptation portion 204 obtains an optimum filter coefficient.

The operation of each of the processing portions shown in FIG. 46 will now be described.

Figure 48:
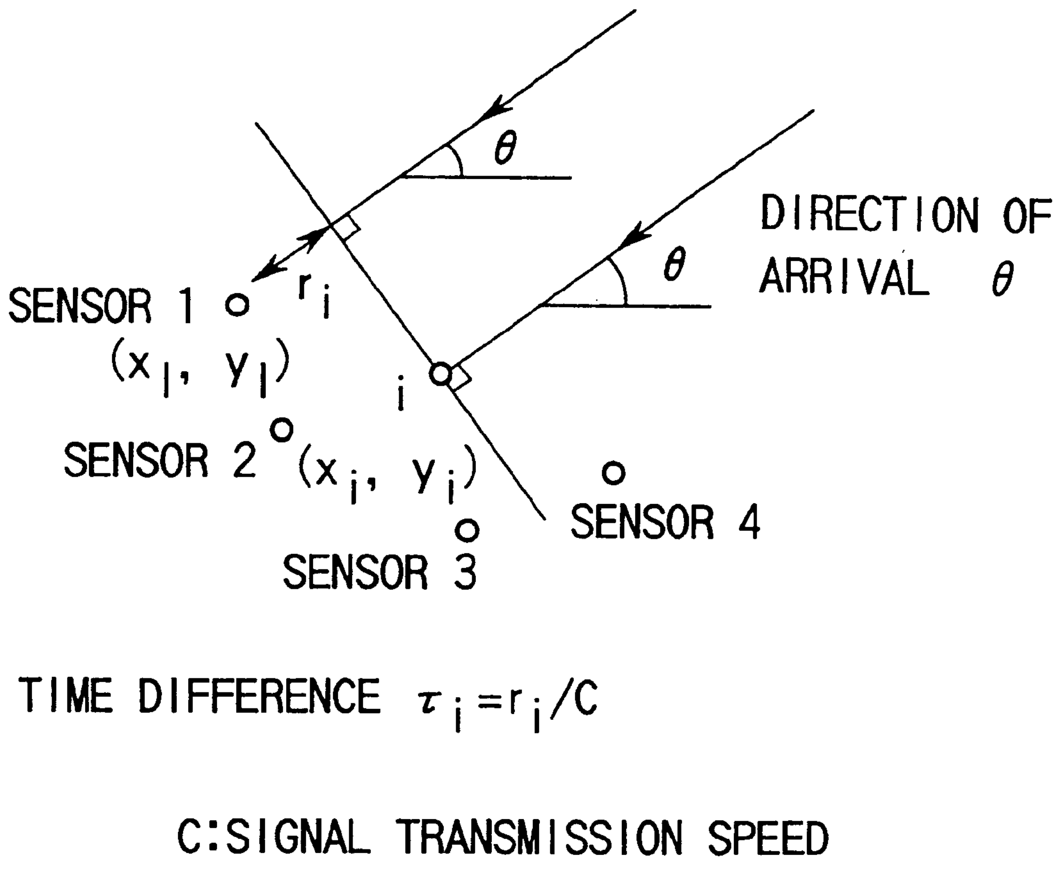
FIG. 48 is a diagram showing the relationship between sensors and directions in which signals arriving.

Initially, the time difference calculating portion 201 calculates the time difference among signals received by the channels on the assumption that signals are transmitted from a given direction. The time difference can be obtained in accordance with the positions of the sensors to which signals are supplied and the directions in which signals are assumed to be transmitted. If the sensor array and the direction of arrival is set as shown in FIG. 48 in a case where the coordinates of a first sensor are $(x_1, y_1)$, those of an i-th sensor are $(x_i, y_i)$ and the transmission direction is θ, the time difference $\tau_i = r_i/c$ of signals when the signals are made incident upon the i-th sensor and the first sensor can be obtained in accordance with the following equation:

$$\tau_1(\theta) = ((x_1 - x_1)^2 + (y_i - y_1)^2)^{1/2} \times \cos(\theta - \tan^{-1}((y_i - y_1)/(x_i - x_1))) \quad (8'')$$

where c is the transmission speed of the signal. Although the description is described about the space on a 2D plane for convenience, development to a 3D space can easily be performed. Then, the delay filter calculating portion 202 shifts sinc function on the time axis and then provides a window to make the same to have finite-length as described in, for example, the document (pp. 215, "Acoustic System and Digital Processing") so as to generate a digital filter capable of delaying the above-mentioned time difference $t_i$. Assuming that the length of the filter per channel is L, the delay filter $h_i(n)$ can be obtained by the following calculates:

$$h_i(n) = (0.54 - 0.46\cos(2\pi n/L)) * \sin(\pi(n - T_o - \tau_i/T_s))/(\pi(n - T_o - \tau_i/T_s)) \quad (9'')$$

where n=1, . . . , L

In the above-mentioned equation, $T_0$ is delay which is inserted to reduce an error of the filter when the length of the filter is made to be finite. Thus, the point of the maximum amplitude of the filter is shifted into an intermediate portion of the filter. For example, determination as $T_0=L/2$ and L=50 is employed. In the equation above, $T_s$ is the sampling period of the input signal, which is, for example, 0.125 msec.

The filter coefficient calculating portion sets the constraint condition in accordance with the obtained contents of the delay filter $h_1(n)$, and then obtains projection matrix P for use in projection LMS and parallel translation vector F from the partial space to the space satisfying the constraint condition.

The process for setting the constraint condition is a process for determining matrices A and G in Equation (2") which is performed such that the delay filter hi(n) is employed in this case to generate a matrix having, for example, the following column vector:

$$H_{L-K} = (h_1(L-K), h_1(L-K-1), \cdots, h_1(1), 0, \cdots, 0, h_2(L-K), h_2(L-K-1), \cdots, h_2(1), 0, \cdots, 0, \vdots \vdots h_M(L-K), h_M(L-K-1), \cdots, h_M(1), 0, \cdots, 0)^T \quad (10'')$$

$$H_{L-K+1} = (h_1(L-K+1), h_1(L-K), \cdots, h_1(1), 0, \cdots, 0, \vdots \vdots h_M(L-K+1), h_M(L-K), \cdots, h_1(1), 0, \cdots, 0,$$

$$\vdots$$
$$\vdots$$

-continued $$H_L = (h_1(L), h_1(L-1), \cdots, h_1(1), \vdots h_M(L), h_M(L-1), \cdots, h_M(1))^T$$

$$H_{L+1} = (0, h_1(L), \cdots, h_1(3), h_1(2), \vdots 0, h_M(L), \cdots, h_M(3), h_M(2))^T$$

$$\vdots$$
$$\vdots$$

$$H_{L+K} = (0, \cdots, 0, h_1(L), \cdots, h(k+1), \vdots 0, \cdots, 0, h_M(L), \cdots, h(k+1))^T$$

The matrix is determined as follows:

$$A = [H_{L-K}, \ldots, H_L, \ldots, H_{L+K}] \quad (11'')$$

The column vector is formed such that vector $H_L$ including the overall body of the delay filter is made to be the middle column and vectors each of which is shifted by one point are disposed on both sides of the middle vector. Although the number K of the constraint conditions is made to be 2K+1, the number is not limited to this. For example, a simple form may be employed in which column vectors from $H_{L-K}$ to $H_L$ in Equation (10') are used and they are expressed as a conditional equation in the form of K=K+1 as follows:

$$A = [H_{L-K}, H_{L-K+1}, \ldots, H_L] \quad (12'')$$

A variety of simplifying methods may be employed, for example, a method in which L of $H_L$ is removed alternately. The quantity of required calculation can be reduced in proportion to the number of K.

The foregoing equation expresses a constraint for one direction. The constraint conditions for plural directions may be obtained by simply adding column vector composed of coefficients of a delay filter relating to another direction as another element of the matrix A in Equation (11"). When a constraint condition for another direction is added to, for example, Equation (11"), matrix A can be formed as follows:

$$A = [H_{L-K}, \cdots, H_L, \cdots, H_{L+K}, H'_{L-K}, \cdots, H'_L, \cdots, H'_{L+K} \quad (13'')$$

where H' is column vector by a delay filter in another direction. In this case, the number of the constraint conditions is made to be 2×(2K+1).

Then, the response of the array with respect to the direction in which the constraint condition is set is set to matrix G. Matrix G has size K×1. In a case where the matrix for the constraint condition is the matrix in Equation (11"), it is defined as follows:

$$G = [\underbrace{0, \ldots, 0}_{\text{number is K}}, g_1, \underbrace{\ldots, 0, \ldots, 0}_{\text{number is K}}]^T \quad (14'')$$

In the case of Equation (13), it is defined as follows: number is K number is K number is K $$G = [0, \ldots, 0, g_1, 0, \ldots, 0, 0, \ldots, 0, 0_2, 0, \ldots, 0, ]^T \tag{15''}$$

(number is K) (number is K) (number is K) (number is K)

where $g_1$ and $g_2$ are responses of the array in the direction for setting the constraint conditions. When the sensitivity is retained to a high level, $g_1$ and $g_2$ are made to be 1. When the sensitivity is lowered to make the direction to be a dead space, they are made to be 0.

If a contents of, for example, a band pass filter is substituted for the contents of the column vector of matrix A and matrix G of the constraint conditions, the frequency response with respect to the response in the direction can be set.

Projection matrix P and parallel translation vector Filter are calculated from matrices A and G expressing the above-mentioned constraint conditions in accordance with Equations (6") and (7").

Then, the adaptation calculating portion 204 uses projection matrix P and the parallel translation vector F to calculate the adaptive filter. That is, Equation (5") is used to obtain filter coefficient $W_n$. The adaptive filter is not limited to the usual LMS. A normalized LMS filter or a recursive least square (RLS) filter may be employed. Although the adaptive filter is updated for each sample of the usual input, a great quantity of calculation is required in this case. Therefore, a block adaptive filter may be employed with which the operation expressed in Equation (5") is executed N times, for example, once in 50 times of calculations and mean vector of 50 samples of the term $my_nX$ in Equation (5") is calculated so as to be used in the updating operation.

Figure 49:
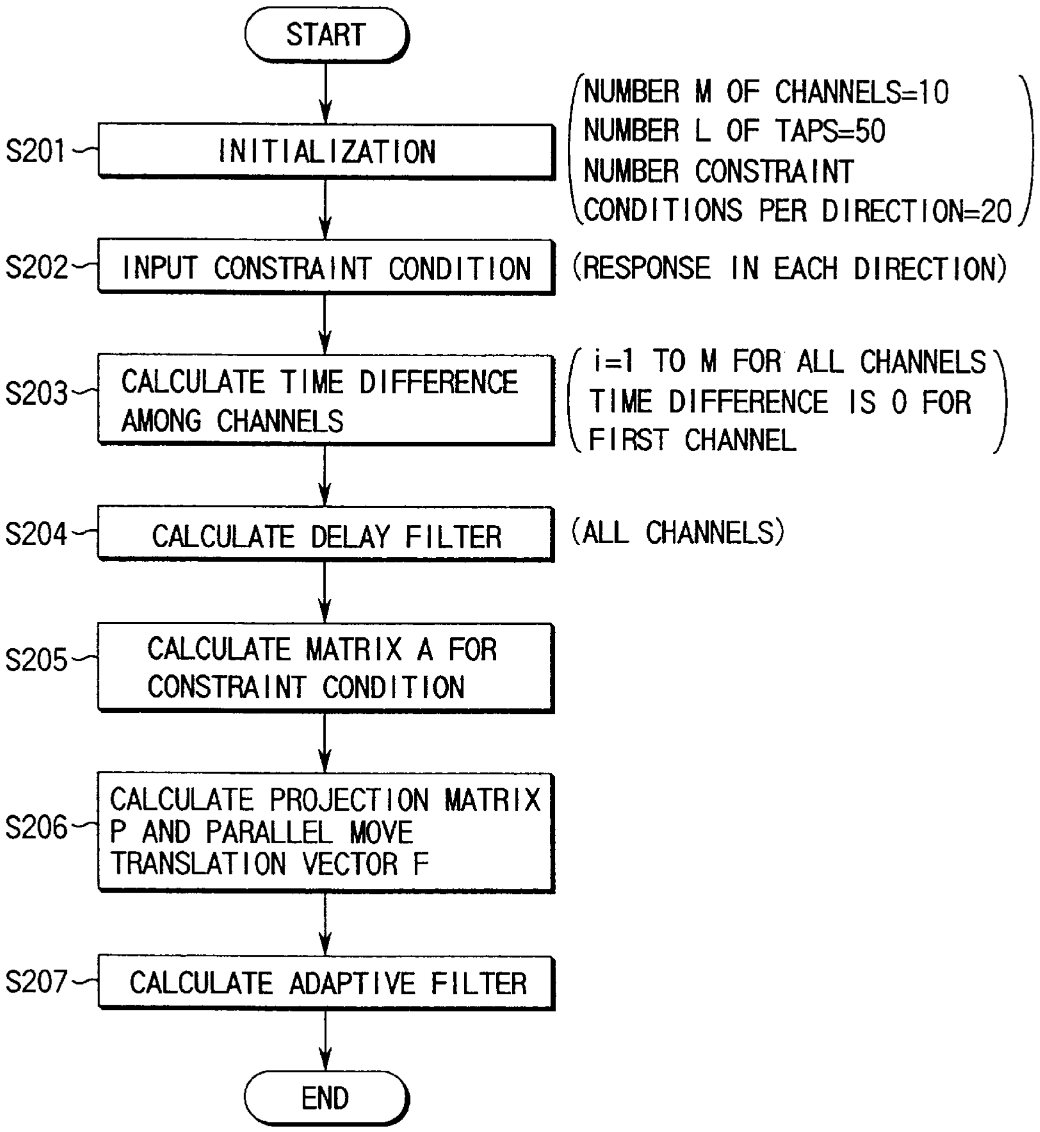
FIG. 49 is a flow chart showing a filter process according to a fifteenth embodiment of the present invention.

A flow of the above-mentioned filter process will now be described with reference to a flow chart shown in FIG. 49.

As the initialization, the number M of channels, the number L of taps and the number of constraint conditions per a direction which is constrained are input (step S201). Then, the number of directions which are constrained, the values of the directions and responses in the directions are input (step S202). Then, the time difference among signals in the channels is calculated from the supplied value of the directions of the constraint conditions in accordance with Equation (8"). The time difference is calculated for all of the channels (step S203). Then, the contents of the delay filter for each channel is obtained from the time difference calculated in step S203 in accordance with Equation (9")(step S204). Then, the value of the delay filter is used to obtain matrix A of the constraint condition is obtained in accordance with Equations (10") to (13")(step S205).

Then, projection matrix P and parallel move translation vector F are obtained from matrix A in accordance with Equations (6") and (7") (step S206). By using thus-obtained A, P and F, the adaptive filter is calculate in accordance with Equation (5")(step S207). The processes in steps S202 to S207 may be repeated whenever the direction which is set as the constraint condition is changed.

As described above, a small number of vectors obtained by shifting voices composed of delay filters having the coefficients in the form of a real number are used to set the constraint conditions for the adaptive filter having the constraint conditions. Therefore, the necessity of performing compression of the dimension by means of development of an eigenvalue is not required to set the constraint conditions with a small number of vectors. Moreover, also the constraint constraint conditions relating to plural directions can easily be set by using a real number with a small number of conditional expressions.

The process for calculating the time difference, the process for calculating the delay filter, the process for calculating the constraint conditions and the process for calculating the filter coefficient may be formed into computer programs which can be stored in a storage medium, such as a hard disk, a floppy disk or a CD-ROM which is loaded into an appropriate computer.

According to the fifteenth embodiment having the structure formed in such a manner that the constraint conditions for the plural directions are set by using a vector having a great amplitude among vectors composed of delay filters with priority, constraint conditions can accurately be set with a small quantity of calculations.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An apparatus for collecting voices, comprising:

image input means for inputting an image obtained by photographing a plurality of persons;

person position detection means for processing image information supplied from said image input means to obtain the positions of a plurality of persons;

person position selection means for selecting the position of at least one person which is a subject to be processed from the positions of the plural persons detected by said person position detection means;

voice input means for individually inputting voices through a plurality of channels;

filter constraint setting means for making one of person positions to be an object position among at least person positions selected by said person position selection means, and setting constraint for raising a sensitivity with respect to a voice from the object position as compared with other sensitivities with respect to voices from person positions which have not been selected;

input signal generating means for generating an input signal which can be observed on the assumption that a sound source signal, which has been arbitrarily generated, is disposed at a person position except for the object position;

filter determining means for determining a filter for lowering the sensitivity with respect to voices from person positions except for the object portion under the constraint set by said filter constraint setting means and in accordance with the input signal generated by said input signal generating means; and voice extracting means for subjecting the voice input by said voice input means to a filter process by using a filter coefficient obtained by said filter determining means so as to extract the voice.

2. An apparatus for collecting voices according to claim 1, wherein said filter constraint setting means sets, as the constraint for the filter process, constraint for raising the sensitivity with respect to one voice from one of plural object positions as compared with the sensitivity with respect to voices from person positions which have not been selected in a case where the plural object positions among the selected person positions are set, and a plurality of filter setting means for setting the filter for lowering the sensitivity with respect to the voice from the person position except for the object position as compared with the sensitivity with respect to the voice from the person position which has not been selected in accordance with an input signal which is observed on the assumption that a sound source exists at the person except for the object position and a plurality of said voice extracting means to correspond to change in the object position so that voices from plurality person positions are separately extracted.

3. A method of collecting voices, comprising the steps of:

inputting an image obtained by photographing at least portions of a plurality of persons;

individually inputting voices through a plurality of channels;

processing image information supplied in said step of inputting the image to obtain the positions of a plurality of persons;

selecting the position of at least one person which is a subject to be processed from the positions of the plural persons detected in said step of detecting the person position;

determining a filter coefficient in accordance with a first signal which can be obtained owning to an observation performed on the assumption that a sound source signal, which has been generated arbitrarily, is disposed at the position of the person selected by said person position selection means and a second signal which is generated from the sound source signal in accordance with a mode selected from two modes consisting of a mode in which other sensitivities with respect to all voices from the selected person positions are simultaneously raised as compared with the sensitivities with respect to voices from person positions which have not been selected and a mode in which the sensitivity of only a voice from a specified object position is raised as compared with the sensitivities with respect to voices from person positions which have not been selected; and extracting only the voices corresponding to the selected mode from voices input by said voice input means, said extraction being performed by using the filter coefficient determined in said step of determining the filter coefficient.

* * * * *